(12) United States Patent
Steen et al.

(10) Patent No.: US 12,474,073 B2
(45) Date of Patent: Nov. 18, 2025

(54) SAFETY SYSTEM AND METHOD FOR CONSTRUCTING AIR CONDITIONING SYSTEM

(71) Applicants: DAIKIN INDUSTRIES, LTD., Osaka (JP); DAIKIN EUROPE N.V., Ostend (BE)

(72) Inventors: David Steen, Ostend (BE); Kevin Cornelis, Ostend (BE); Arne Degrande, Ostend (BE); Yuusuke Nakagawa, Ostend (BE); Harshit Tanwar, Ostend (BE)

(73) Assignees: DAIKIN INDUSTRIES, LTD., Osaka (JP); DAIKIN EUROPE N.V., Ostend (BE)

(*) Notice: Subject to any disclaimer, the term of this patent is extended or adjusted under 35 U.S.C. 154(b) by 268 days.

(21) Appl. No.: 18/021,305

(22) PCT Filed: Sep. 15, 2021

(86) PCT No.: PCT/JP2021/034004
§ 371 (c)(1),
(2) Date: Feb. 14, 2023

(87) PCT Pub. No.: WO2022/059723
PCT Pub. Date: Mar. 24, 2022

(65) Prior Publication Data
US 2023/0221024 A1 Jul. 13, 2023

(30) Foreign Application Priority Data
Sep. 15, 2020 (EP) .................... 20196177
Sep. 14, 2021 (EP) .................... 21196531

(51) Int. Cl.
F24F 11/36 (2018.01)
F24F 1/0068 (2019.01)
F24F 11/84 (2018.01)

(52) U.S. Cl.
CPC ............ F24F 11/36 (2018.01); F24F 1/0068 (2019.02); F24F 11/84 (2018.01)

(58) Field of Classification Search
CPC .. B60H 1/00278; B60H 1/00485; B60H 1/32; B60H 1/32284; B60H 2001/00307; B60H 2001/3286
See application file for complete search history.

(56) References Cited

U.S. PATENT DOCUMENTS

2012/0292006 A1 11/2012 Yamashita et al.
2013/0192283 A1 8/2013 Yamashita et al.
(Continued)

FOREIGN PATENT DOCUMENTS

AU 2018372281 B2 3/2022
CN 209084999 U 7/2019
(Continued)

OTHER PUBLICATIONS

International Search Report, issued in PCT/JP2021/034003, PCT/ISA/210, dated Dec. 10, 2021.
(Continued)

Primary Examiner — Henry T Crenshaw
(74) Attorney, Agent, or Firm — Birch, Stewart, Kolasch & Birch, LLP

(57) ABSTRACT

A safety system for a heat pump system includes a plurality of valve units each having refrigerant pipe portions with control valves, a refrigerant leakage detector, and a casing accommodating the valves and the refrigerant leakage detector and formed with first and second openings. The safety system further includes a connection structure connecting
(Continued)

the internal spaces of the casings via the first and second openings, and a discharge structure connected to the connection structure or one of the casings and configured to discharge air from the internal space of the casing in which a refrigerant leakage has occurred. The casing has first and second lateral faces facing different directions, and the first opening is formed in the first lateral face and the second opening is formed in the second lateral face.

26 Claims, 24 Drawing Sheets

(56) References Cited

U.S. PATENT DOCUMENTS

| | | | |
|---|---|---|---|
| 2017/0036515 A1* | 2/2017 | Ko | B60H 1/00514 |
| 2019/0234660 A1* | 8/2019 | Yamada | F25B 41/20 |
| 2020/0318875 A1 | 10/2020 | Yamada et al. | |
| 2021/0356154 A1 | 11/2021 | Kobayashi et al. | |
| 2022/0090833 A1 | 3/2022 | Yajima | |

FOREIGN PATENT DOCUMENTS

| | | |
|---|---|---|
| DE | 202018006480 U1 | 9/2020 |
| EP | 2937647 A1 | 10/2015 |
| EP | 3091314 A1 | 11/2016 |
| EP | 3153784 A1 | 4/2017 |
| EP | 3270069 A2 | 1/2018 |
| EP | 3 282 203 * | 2/2018 |
| EP | 3282203 A1 | 2/2018 |
| EP | 3521731 A1 | 8/2019 |
| JP | 2-195124 A | 8/1990 |
| JP | 6-88638 A | 3/1994 |
| JP | 8-166160 A | 6/1996 |
| JP | 2014-163657 A | 9/2014 |
| JP | 2016-196996 A | 11/2016 |
| JP | 2019-113258 A | 7/2019 |
| JP | 2020-51736 A | 4/2020 |
| JP | 2020-122645 A | 8/2020 |
| WO | WO 2011/099065 A1 | 8/2011 |
| WO | WO 2013/038599 A1 | 3/2013 |
| WO | WO 2019/064566 A1 | 4/2019 |

OTHER PUBLICATIONS

International Search Report, issued in PCT/JP2021/034004, PCT/ISA/210, dated Dec. 10, 2021.
Search Report issued in European priority application 20196177.8, dated Feb. 26, 2021.
Search Report issued in European priority application 21196531.4, dated Jan. 25, 2022.
Search Report issued in European priority application 21196536.3, dated Jan. 25, 2022.
Search Report issued in European priority application 21197533.9, dated Dec. 22, 2021.
Search Report issued in European priority application 22189328.2, dated Oct. 25, 2022.
Search Report issued in European priority application 22189336.5, dated Oct. 28, 2022.
Written Opinion of the International Searching Authority, issued in PCT/JP2021/034003, PCT/ISA/237, dated Dec. 10, 2021.
Written Opinion of the International Searching Authority, issued in PCT/JP2021/034004, PCT/ISA/237, dated Dec. 10, 2021.
International Preliminary Report on Patentability and Written Opinion of the International Searching Authority, issued in PCT/JP2021/034004, dated Mar. 30, 2023.

* cited by examiner

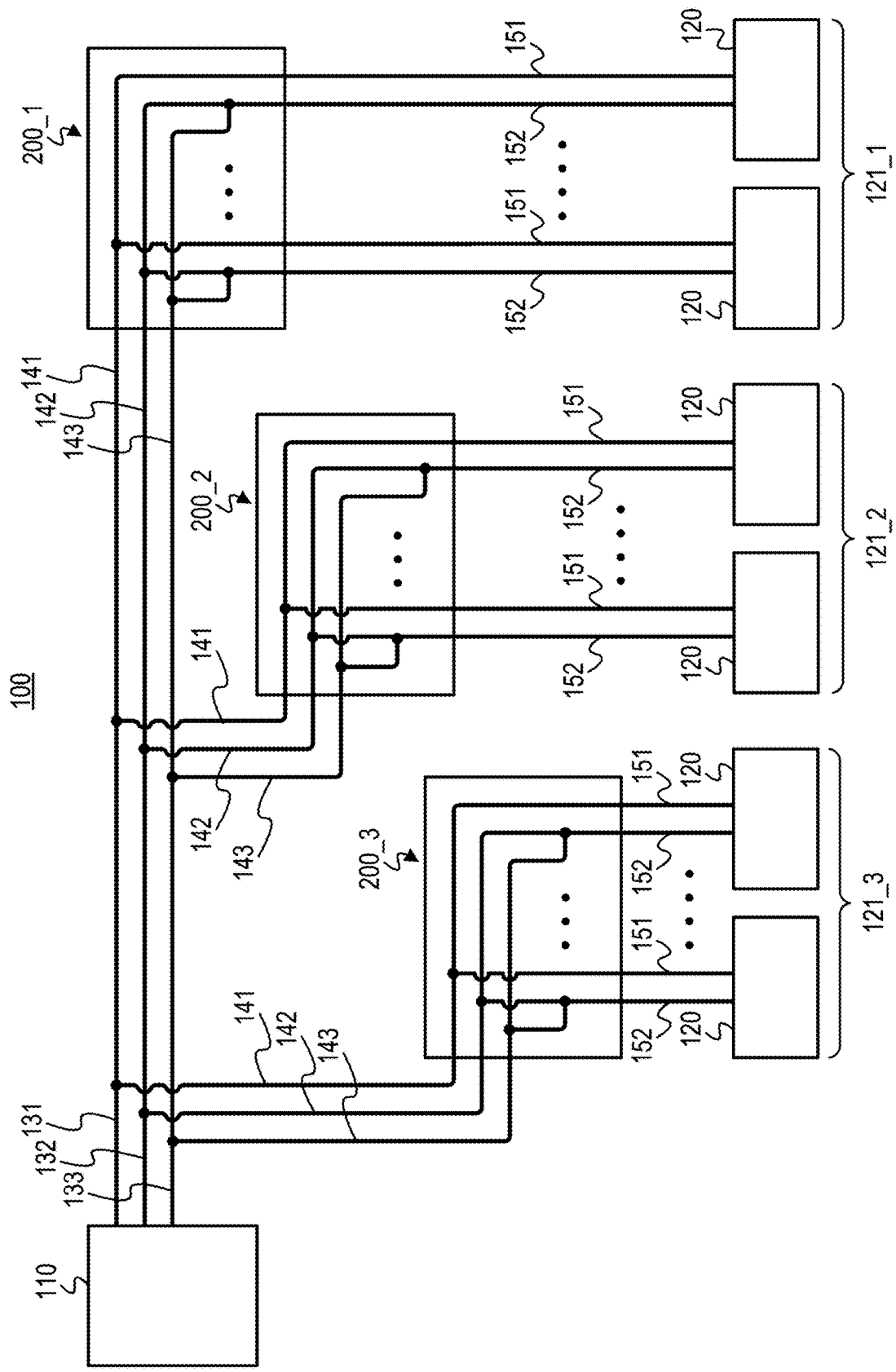

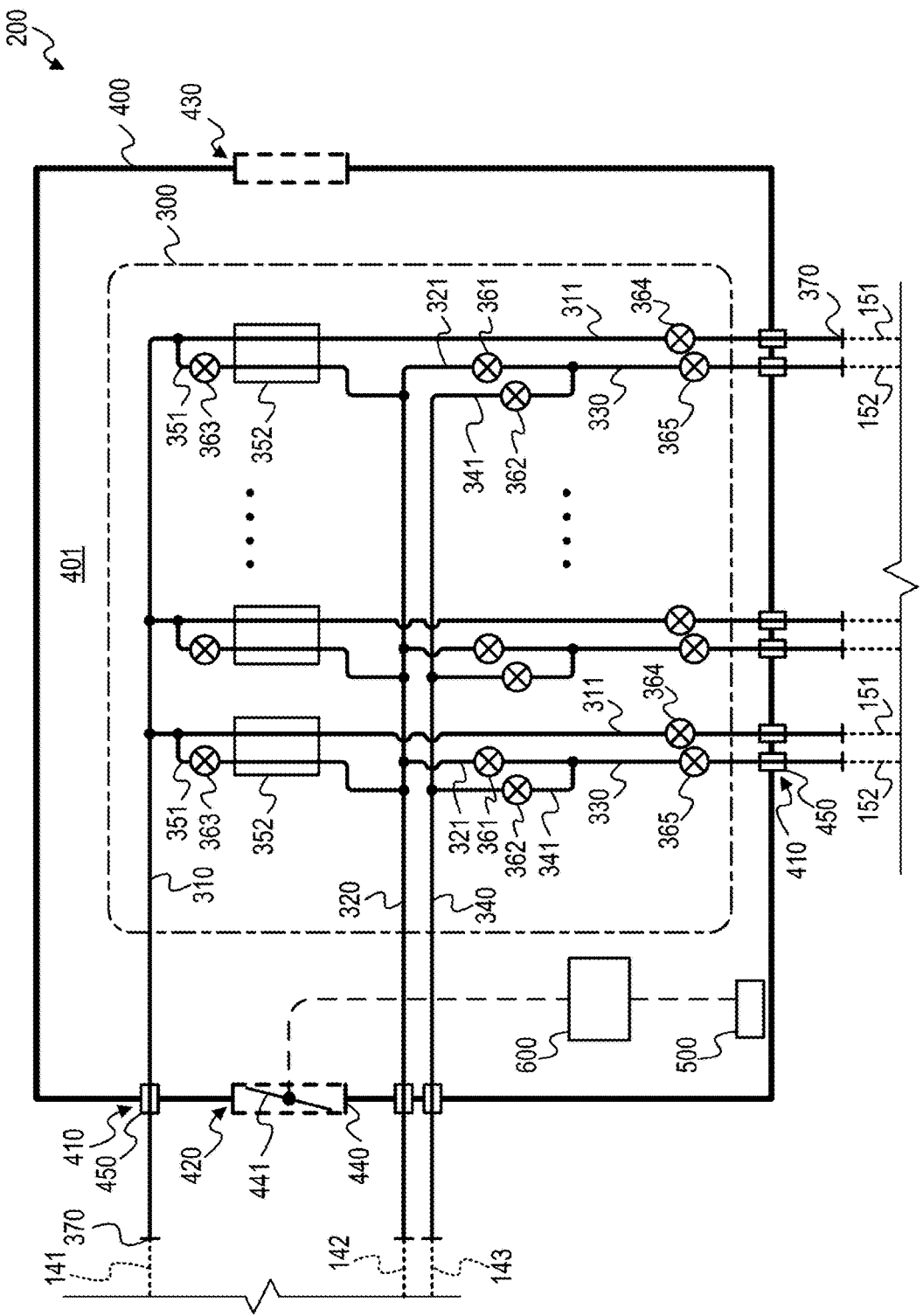

[Fig. 3]
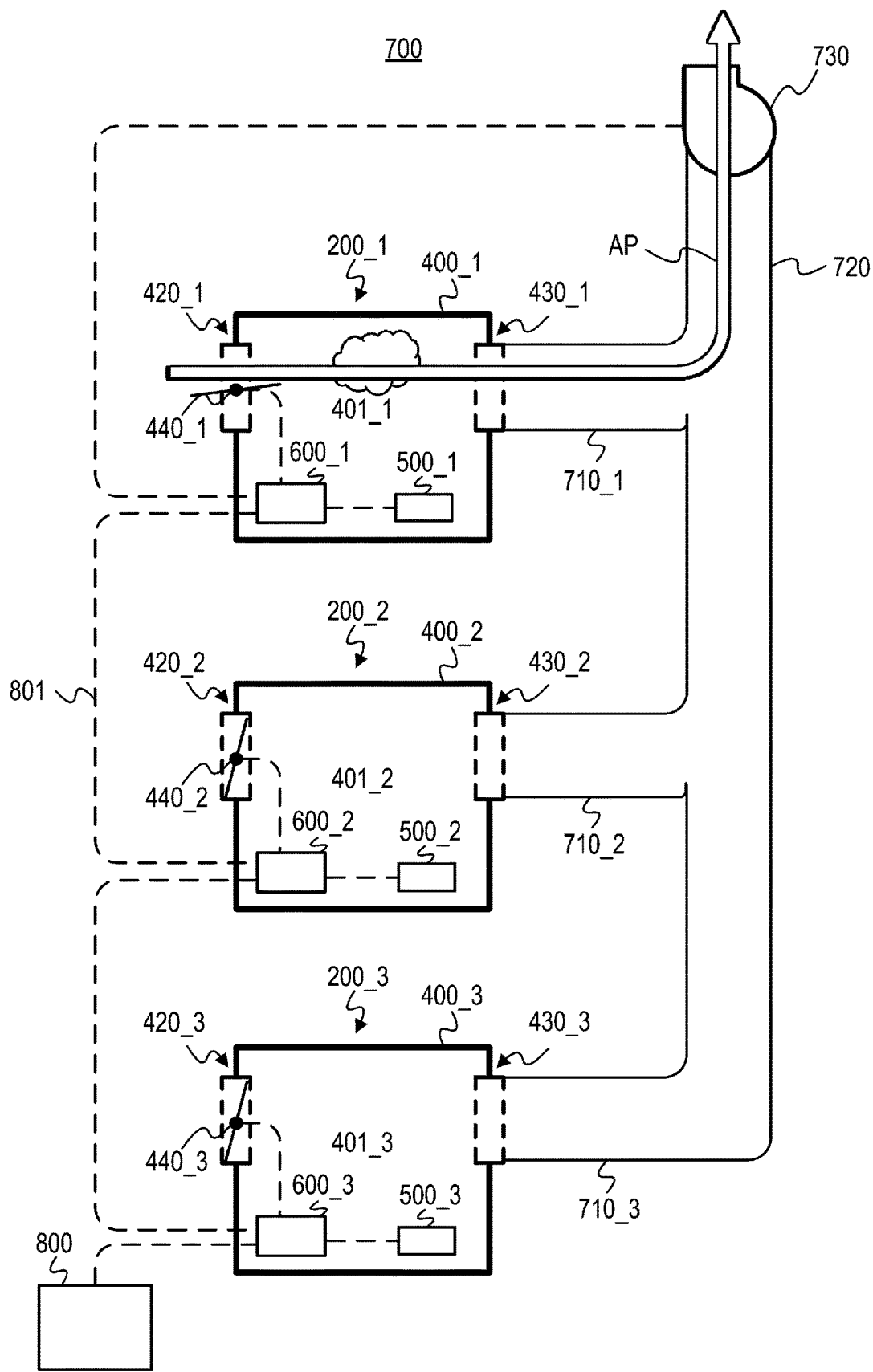

[Fig. 4]
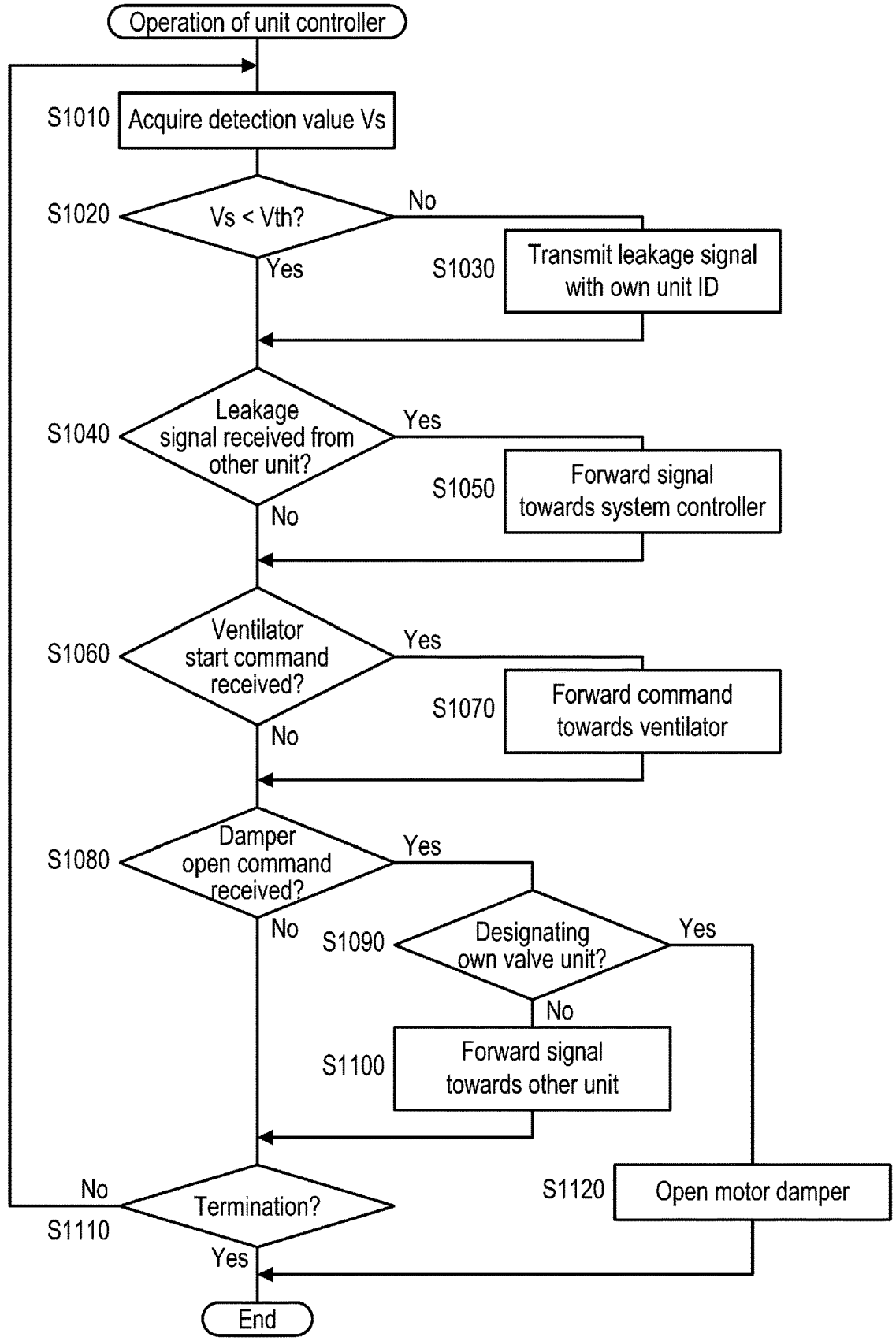

[Fig. 5]
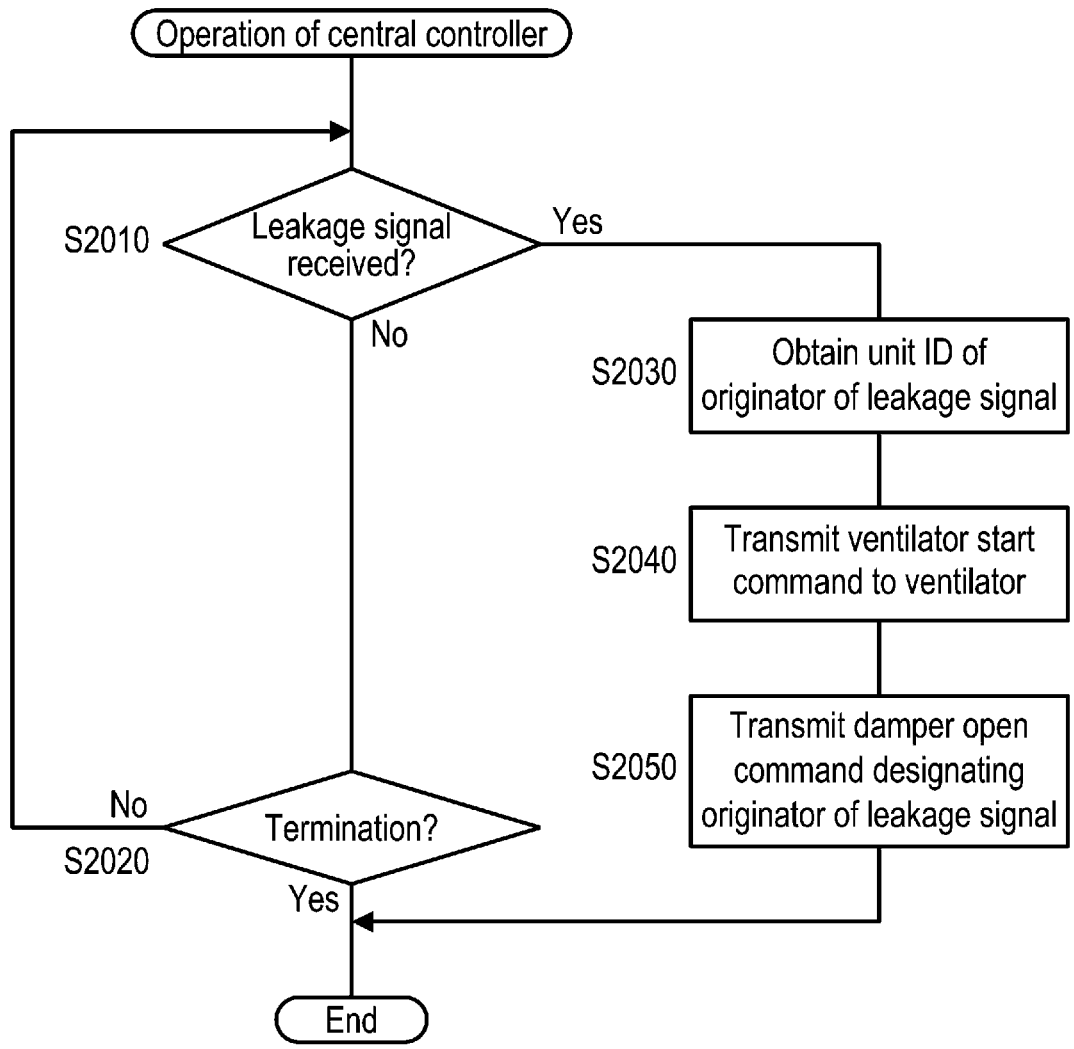

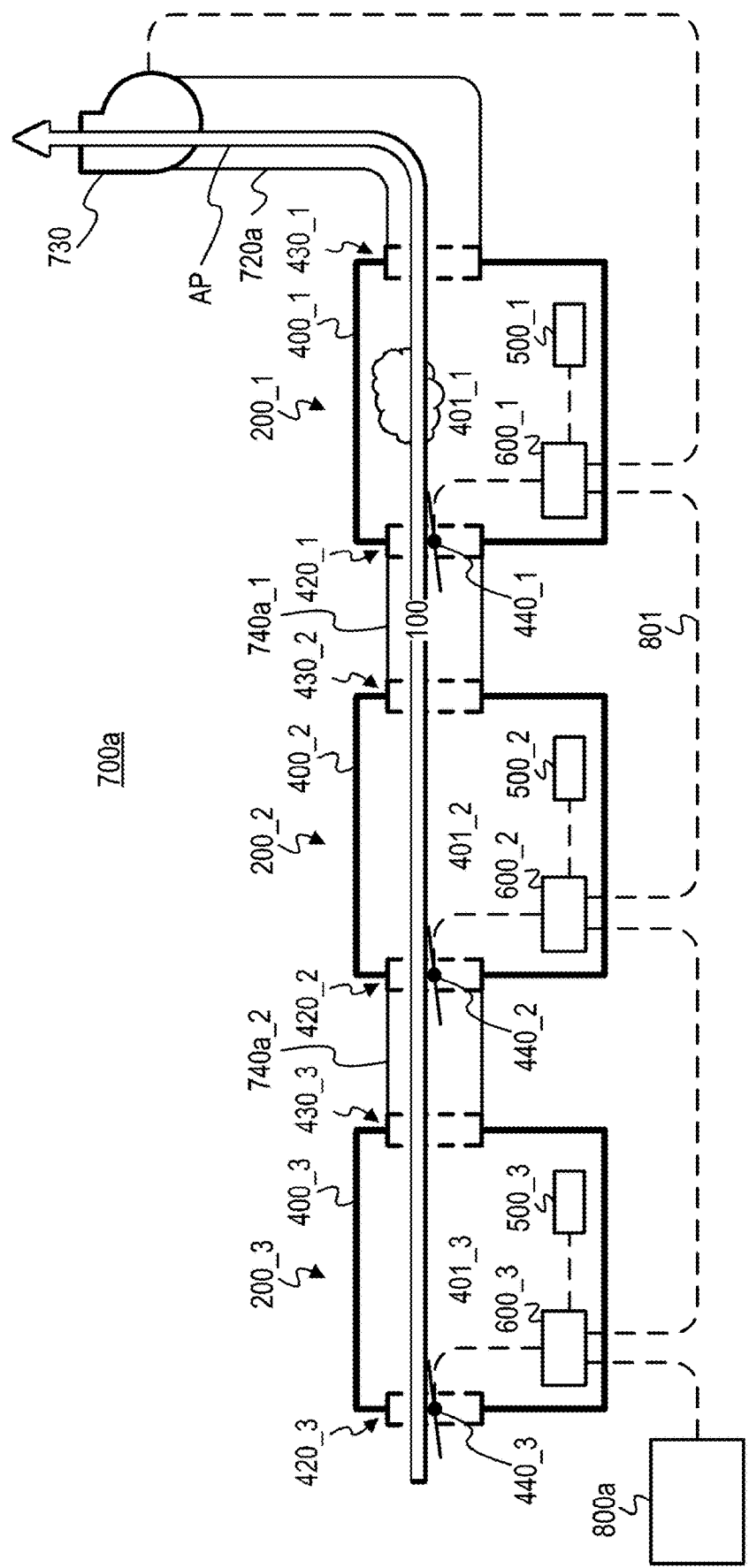
[Fig. 6]

[Fig. 7]
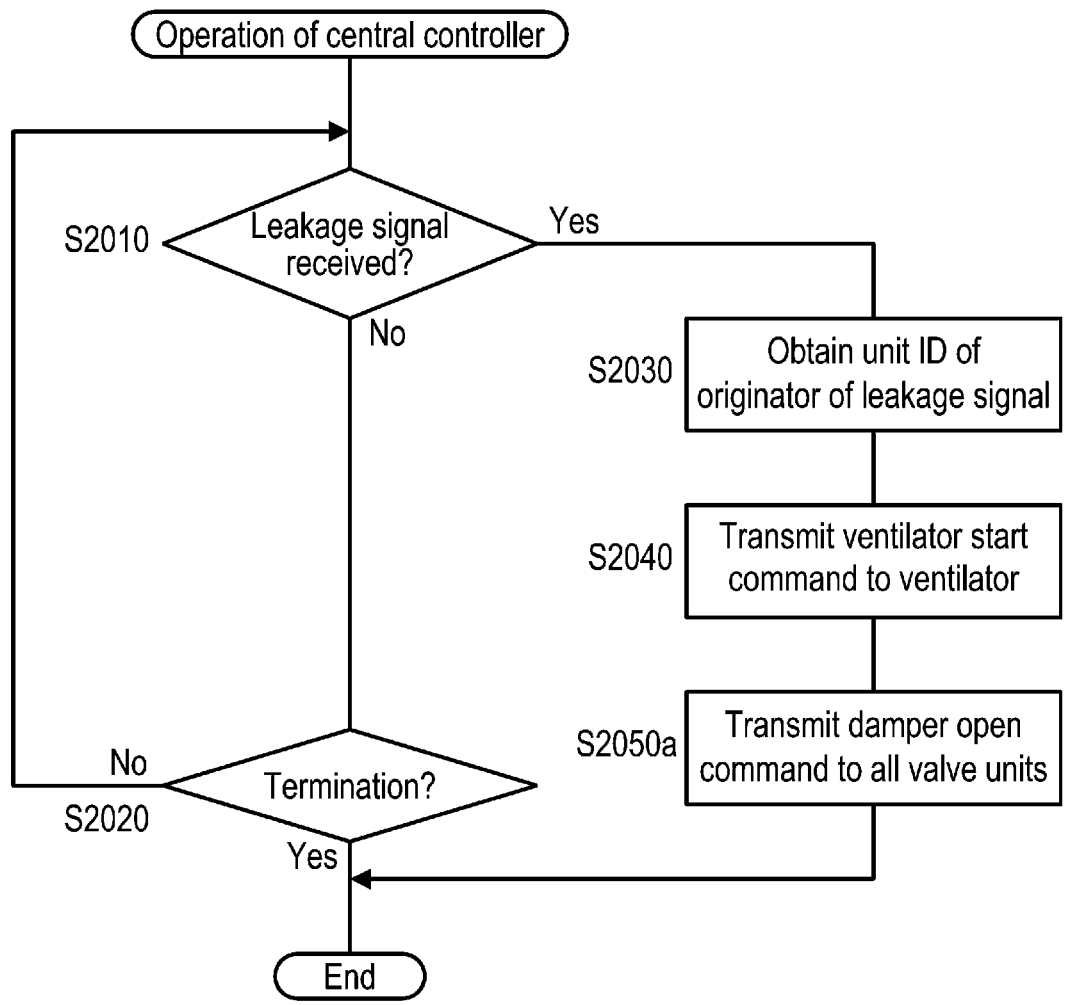

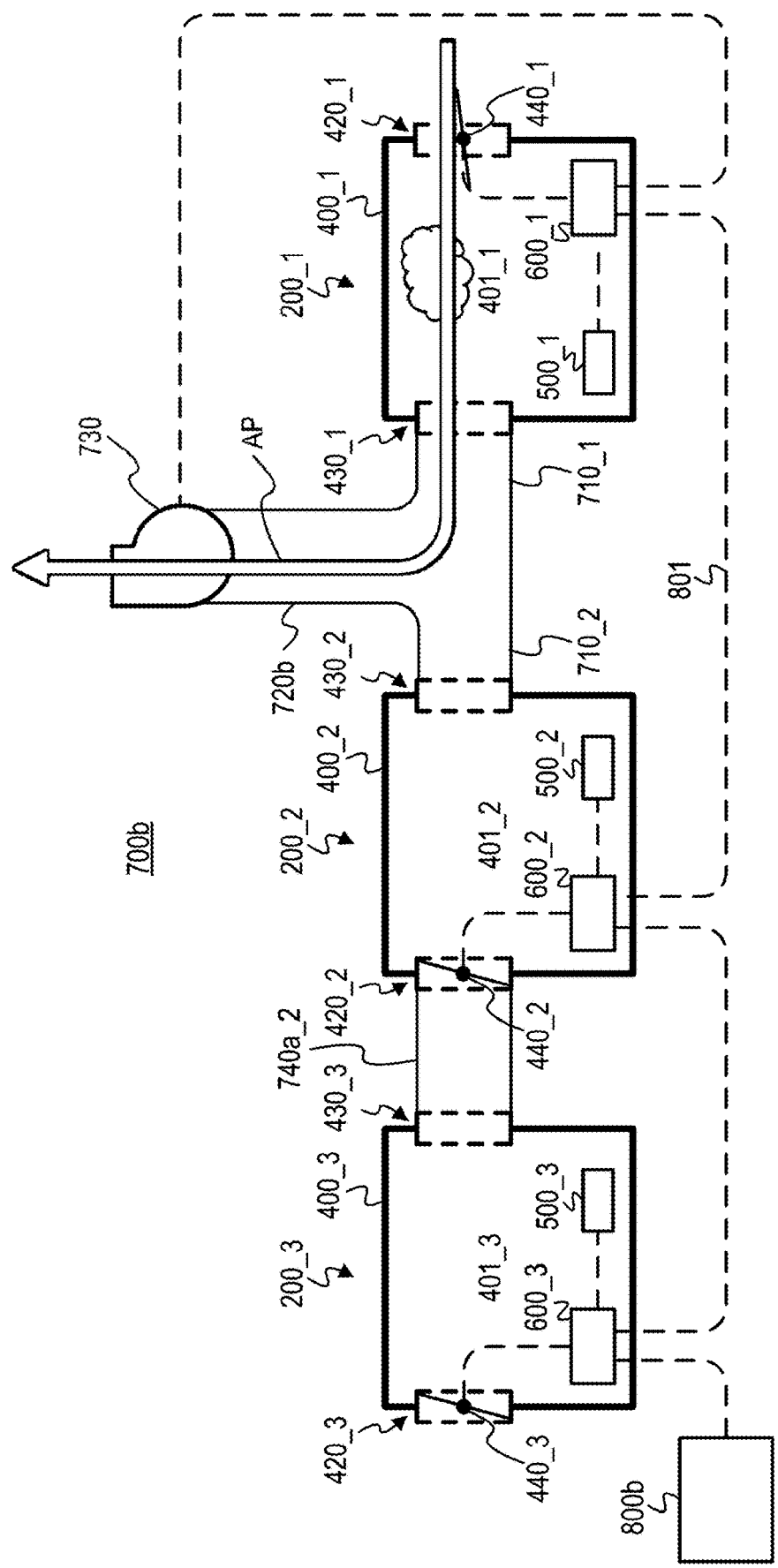
[Fig. 8]

[Fig. 9]
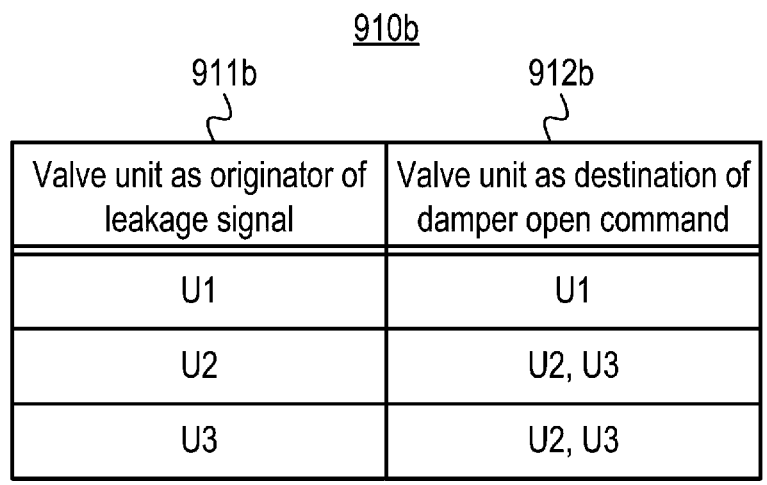
| Valve unit as originator of leakage signal | Valve unit as destination of damper open command |
|---|---|
| U1 | U1 |
| U2 | U2, U3 |
| U3 | U2, U3 |

[Fig. 10]
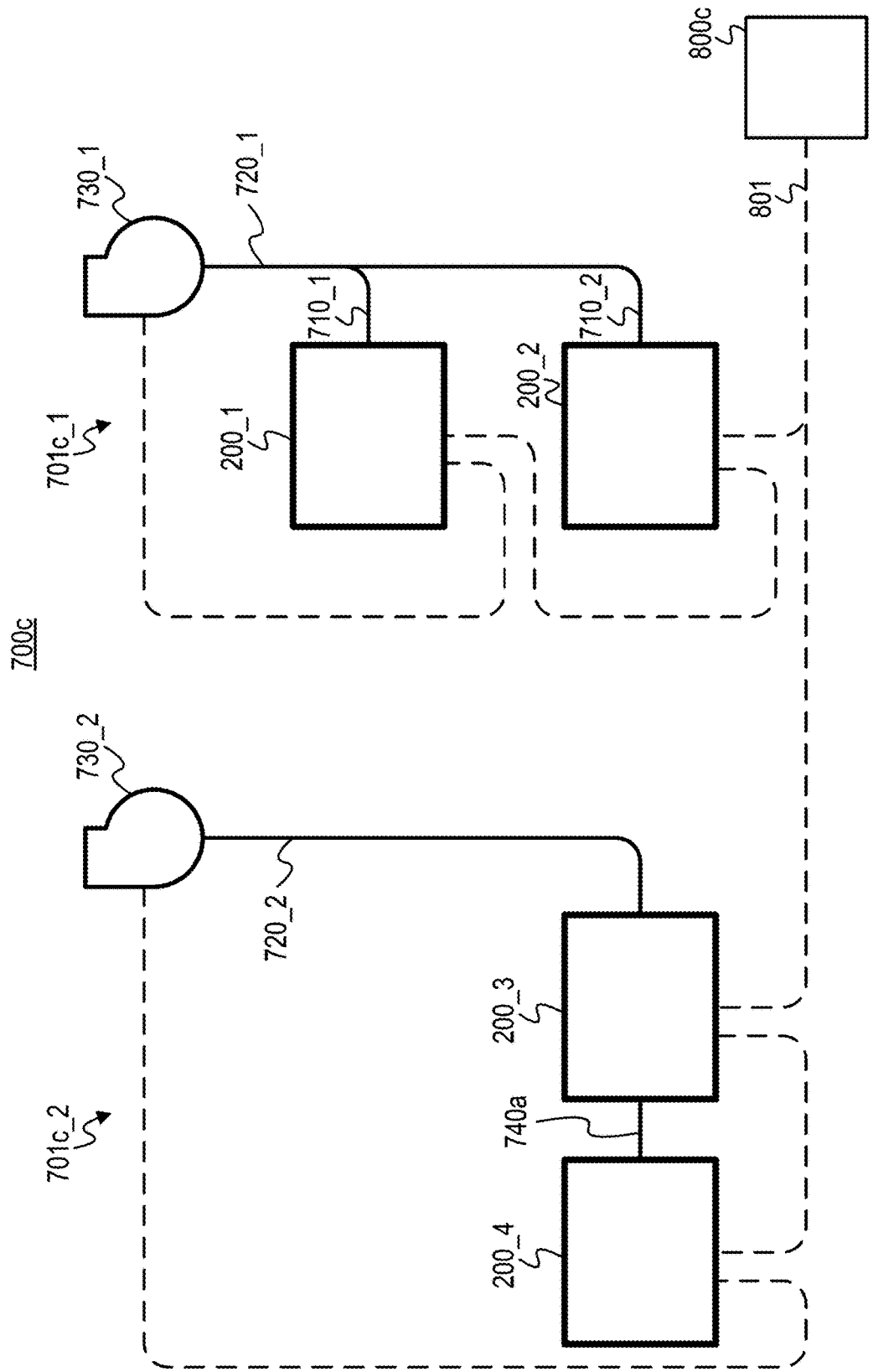

| Valve unit as originator of leakage signal (911b) | Valve unit as destination of damper open command (912b) | Ventilator to operate (913c) |
| --- | --- | --- |
| U1 | U1 | F1 |
| U2 | U2 | F1 |
| U3 | U3, U4 | F2 |
| U4 | U3, U4 | F2 |

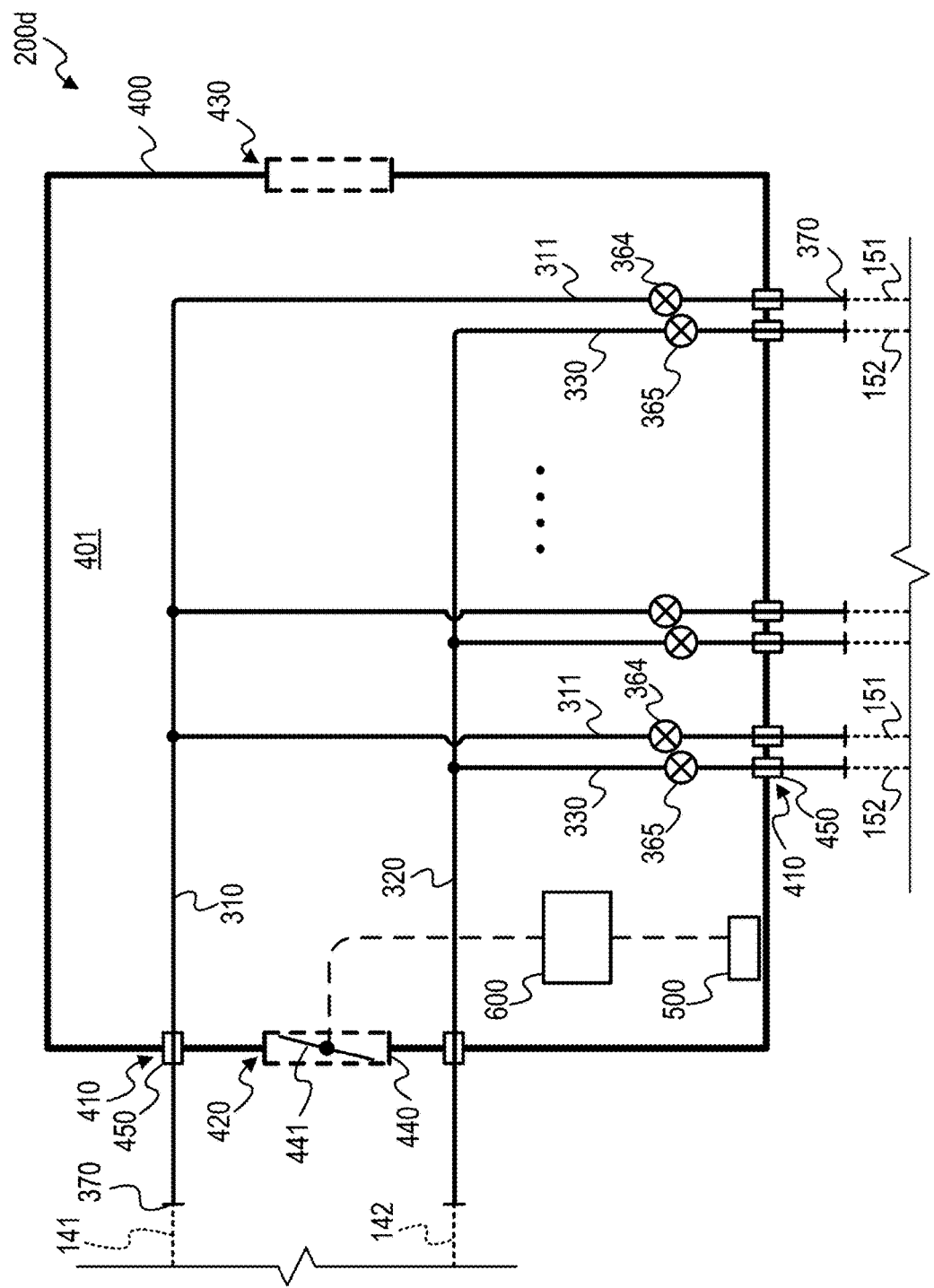

[Fig. 13]
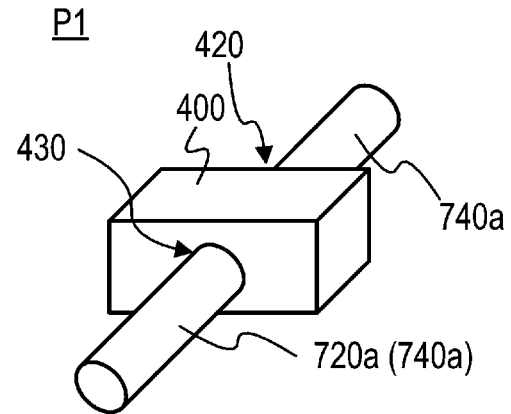
[Fig. 14]
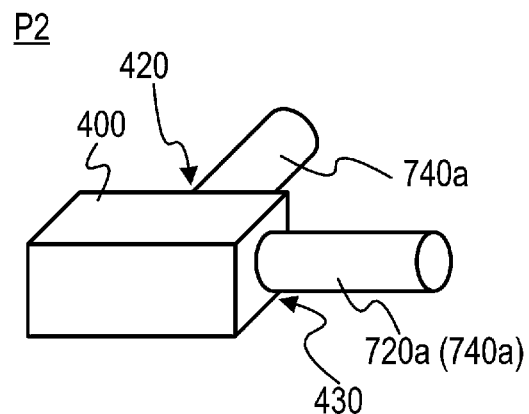
[Fig. 15]
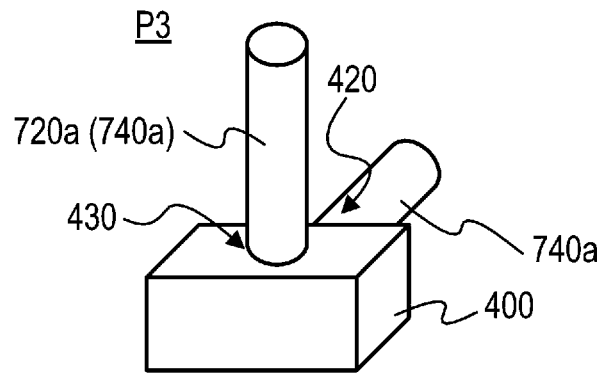

[Fig. 16]
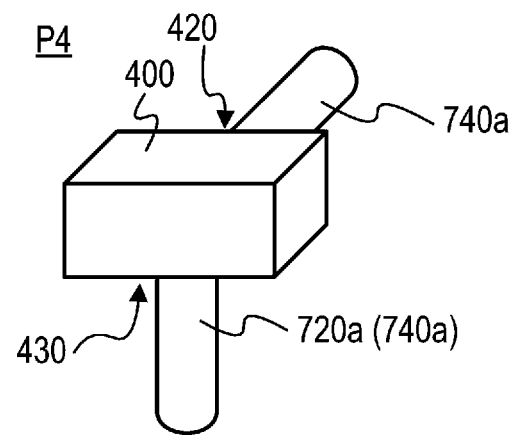

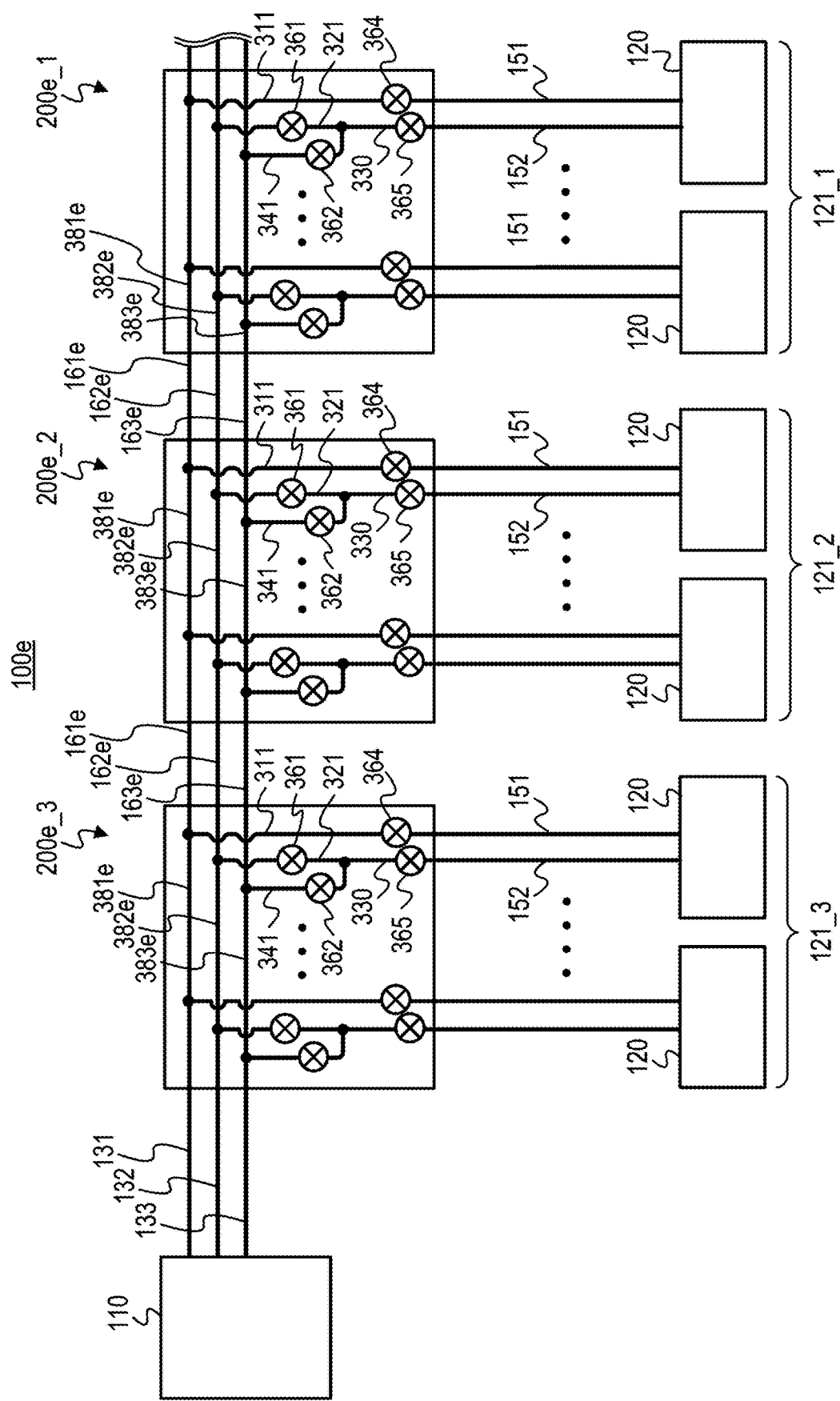
[Fig. 17]

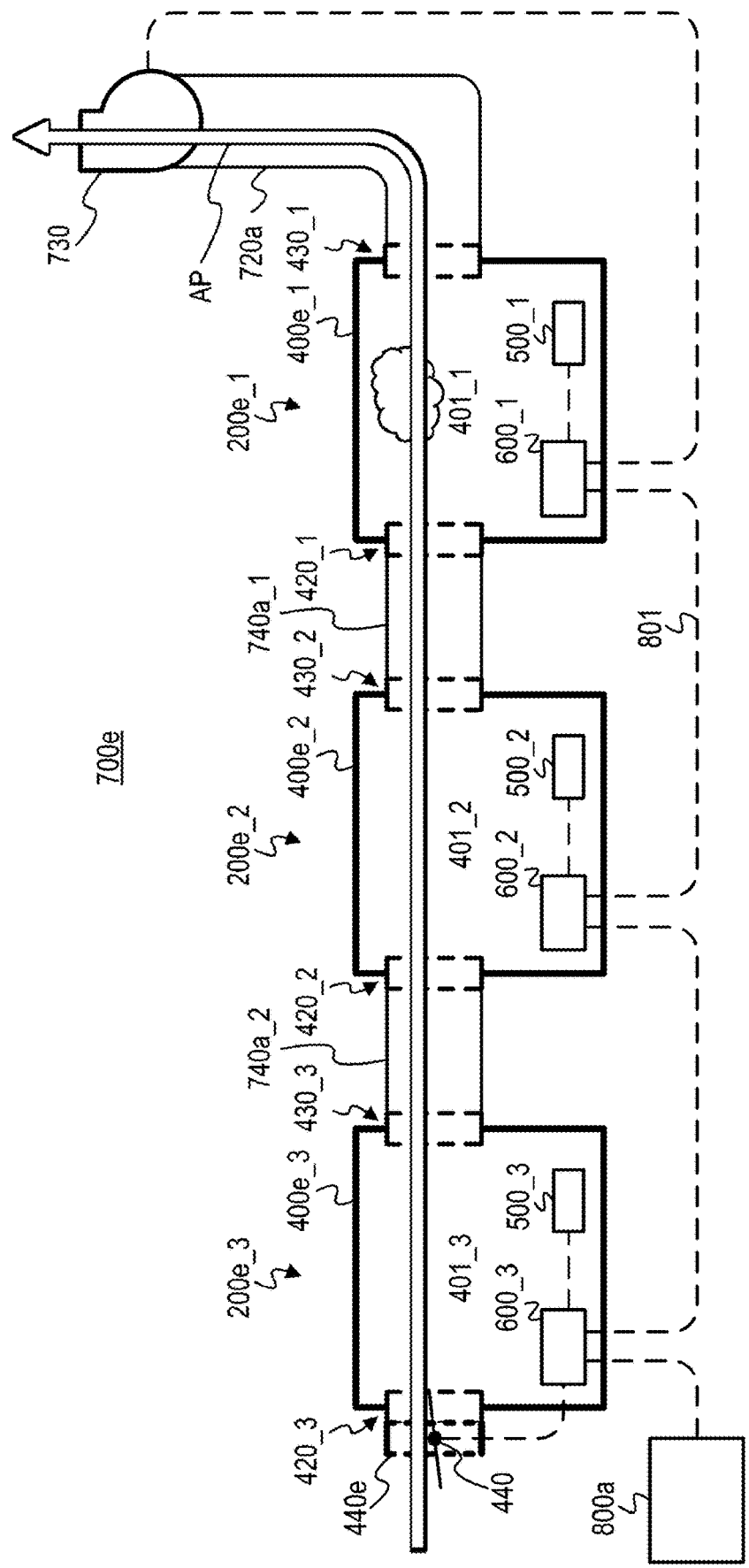

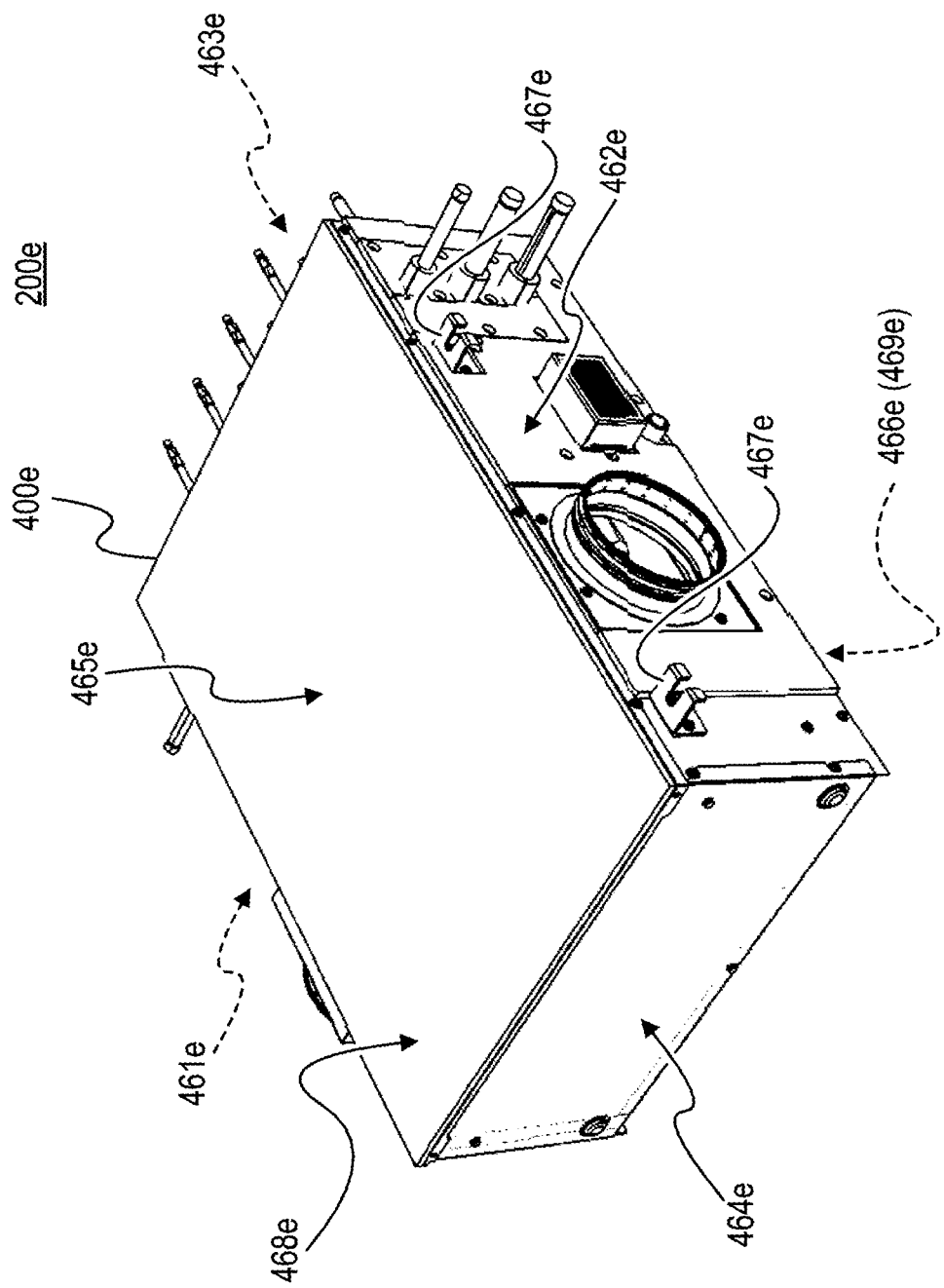
[Fig. 19]

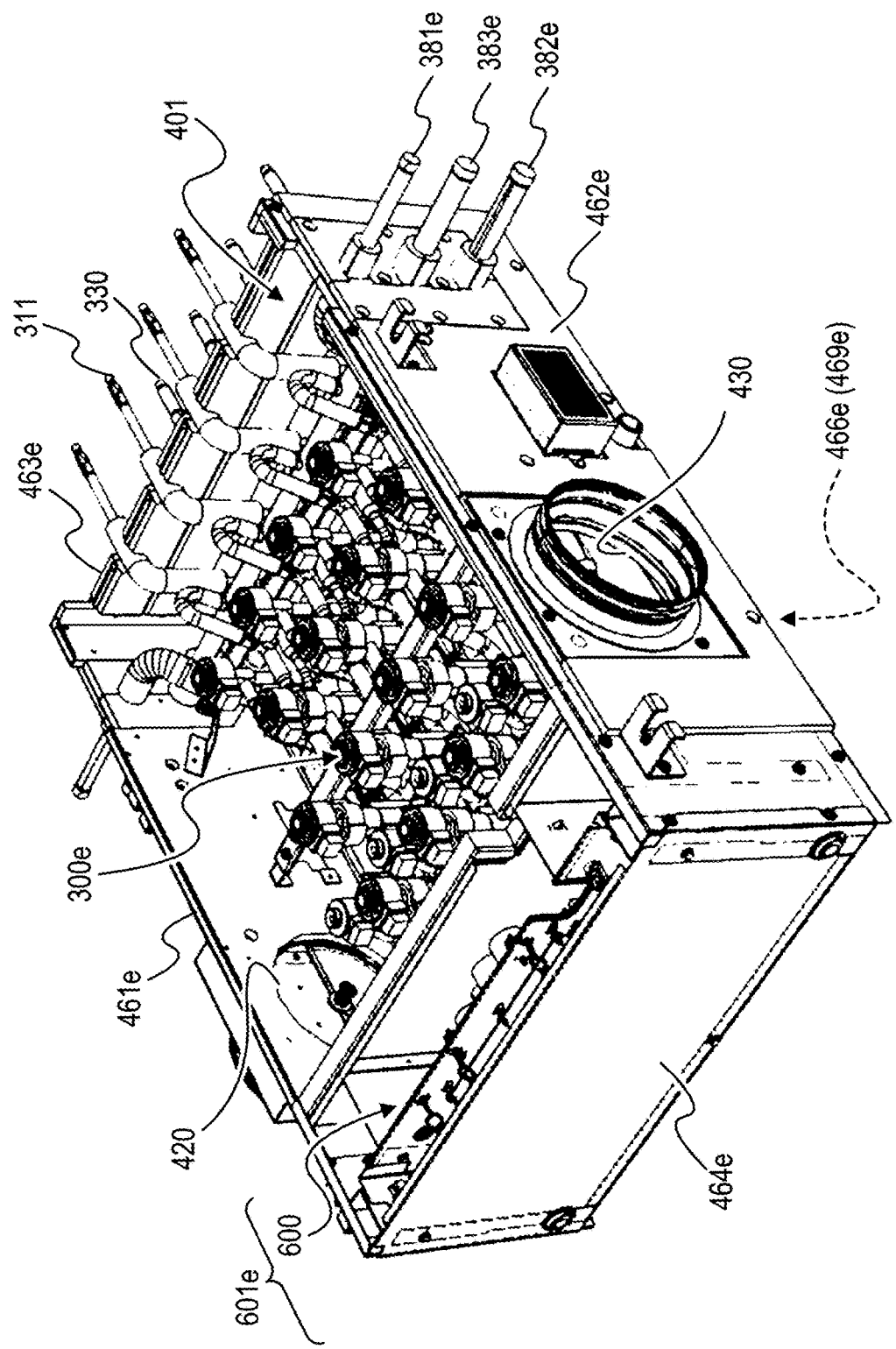
[Fig. 20]

[Fig. 21]
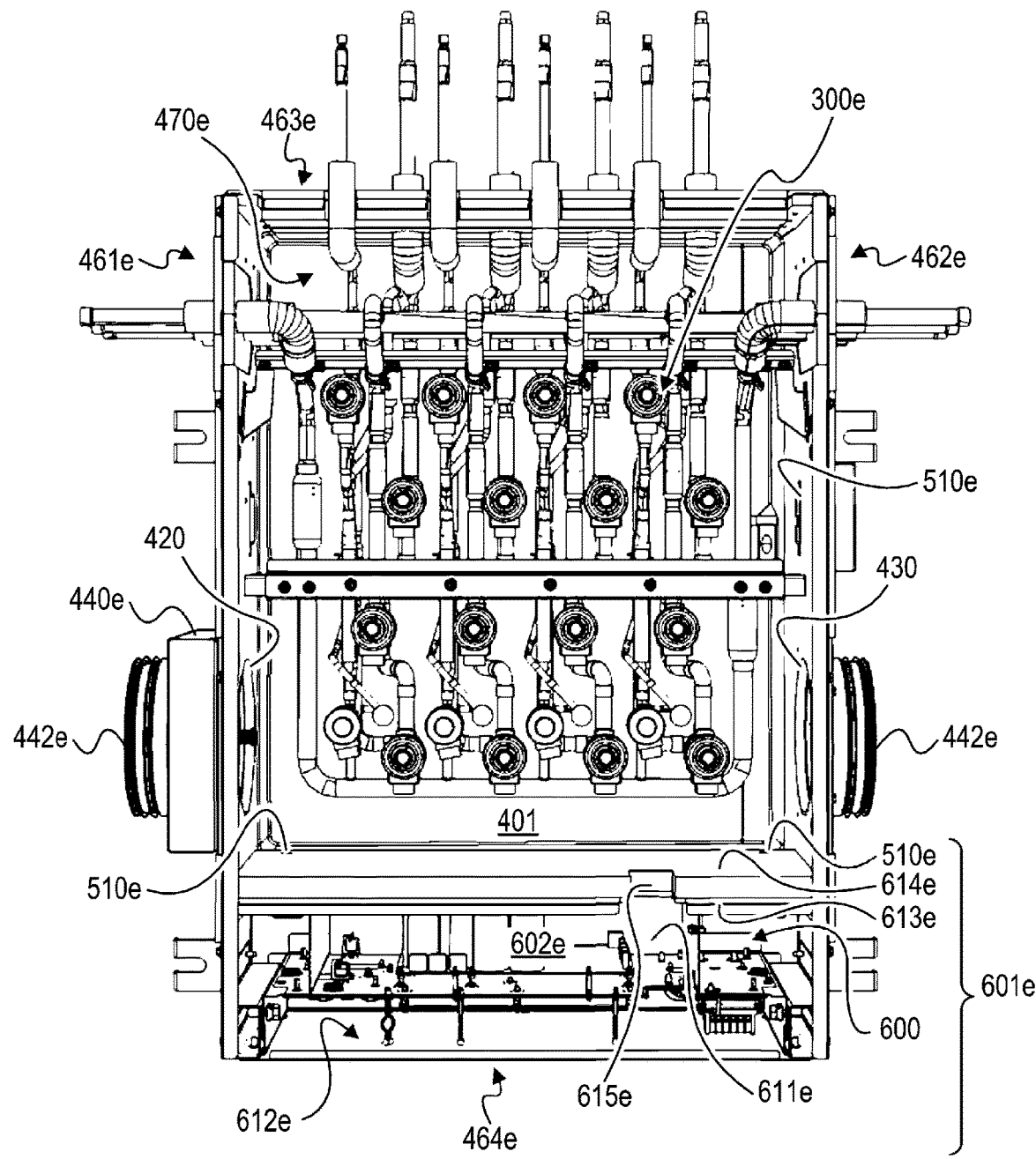

[Fig. 22]
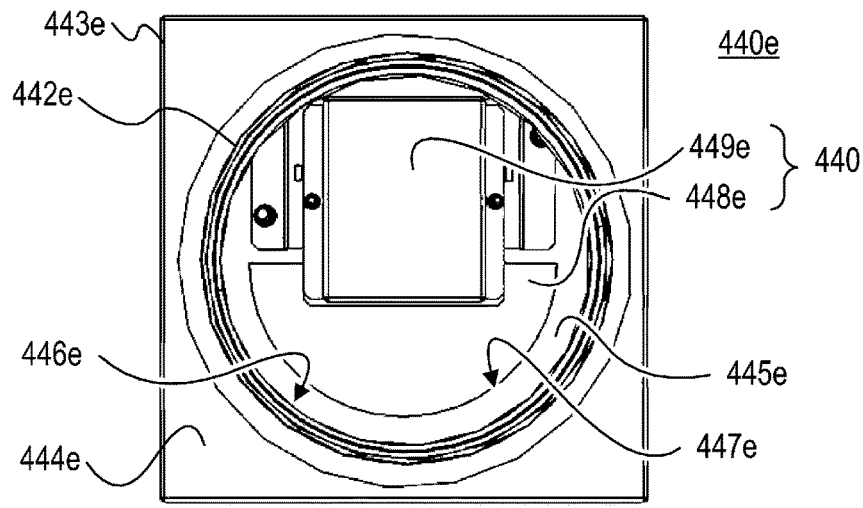
[Fig. 23]
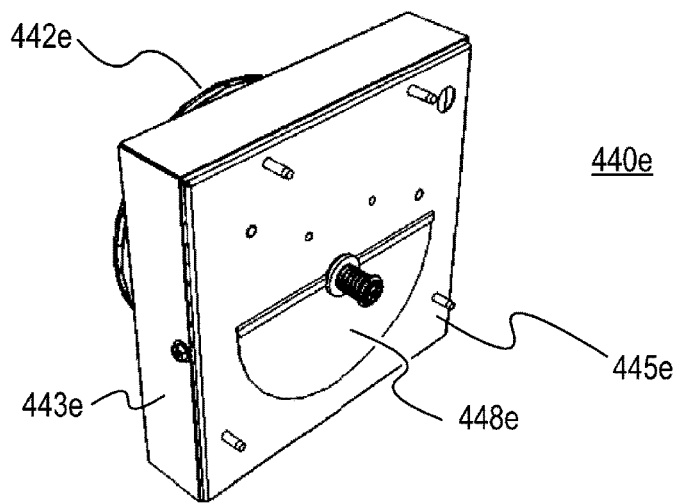
[Fig. 24]
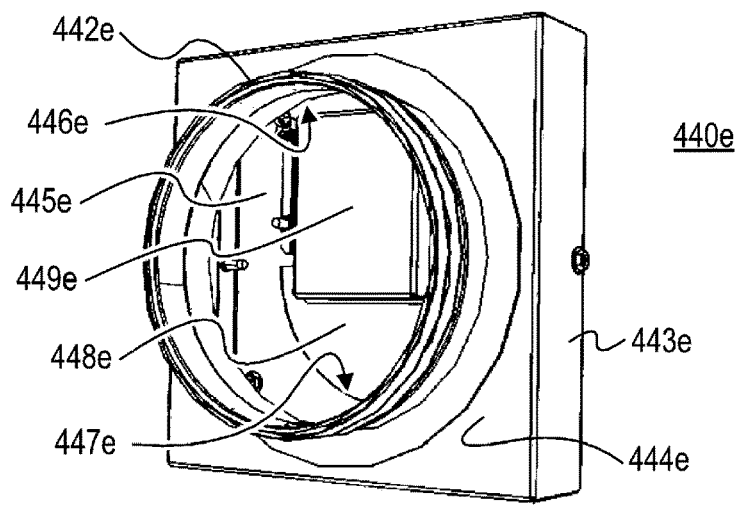

[Fig. 25]
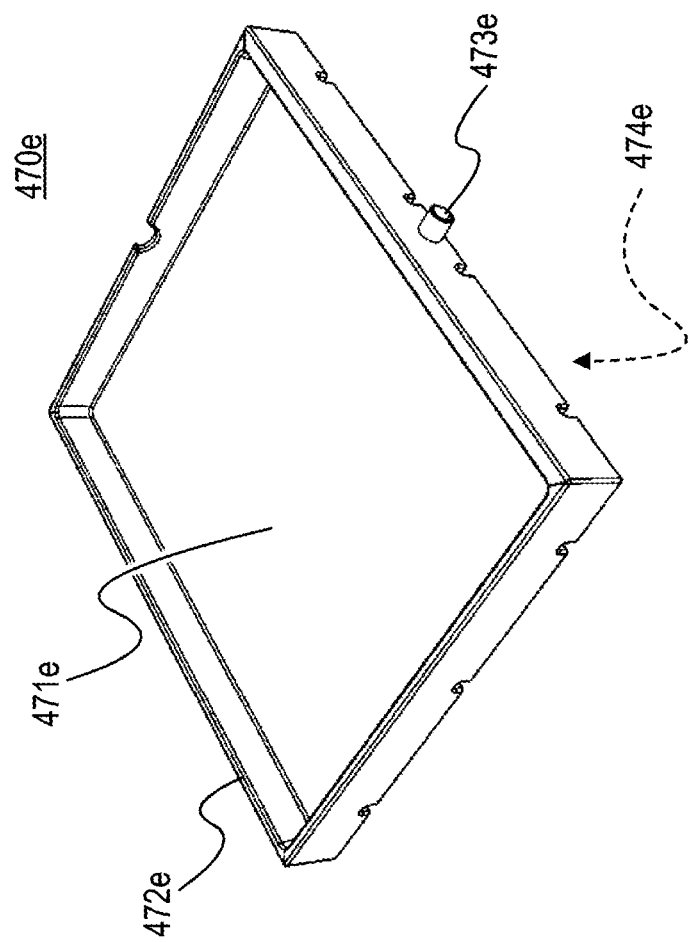

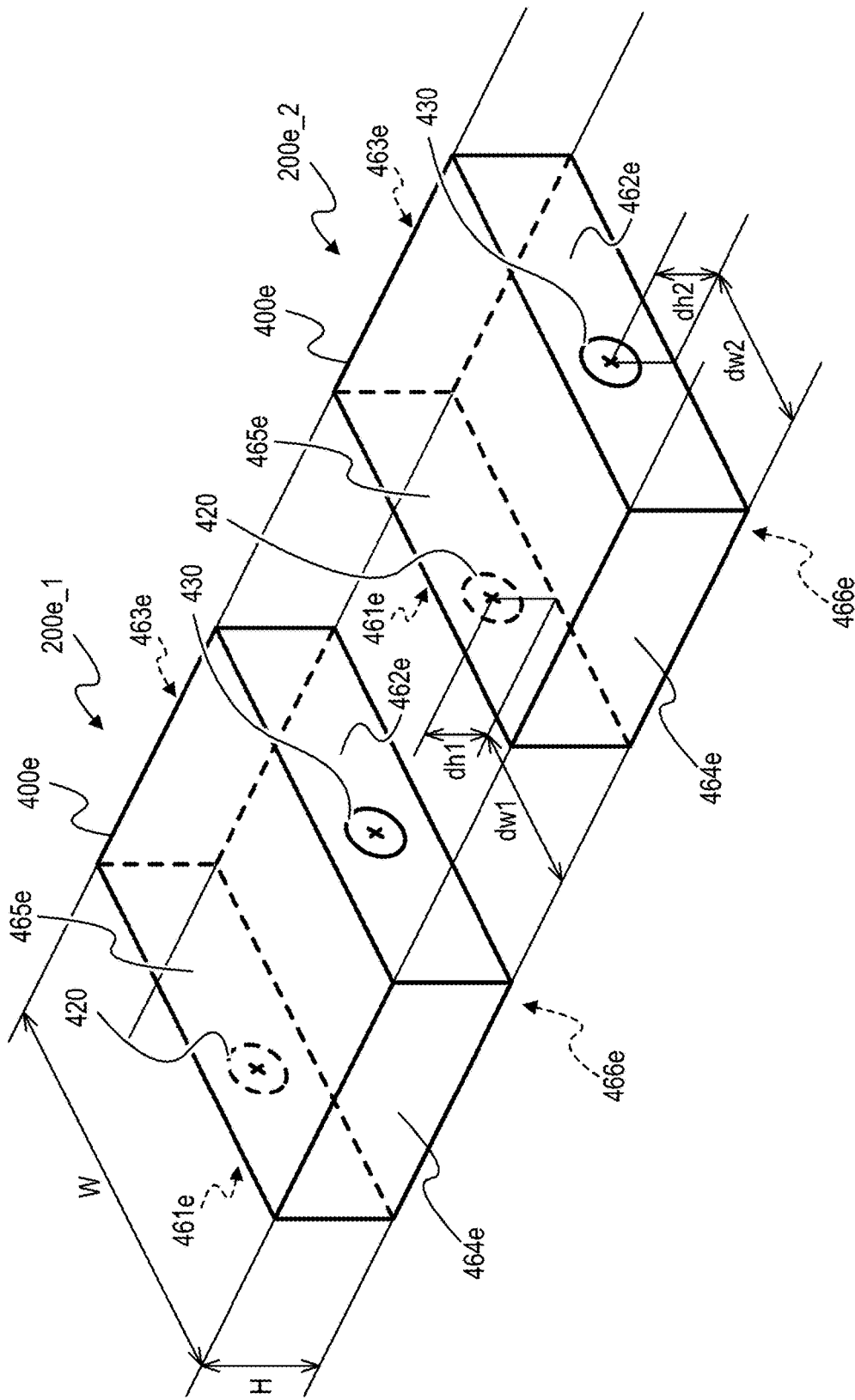
[Fig. 26]

[Fig. 27]
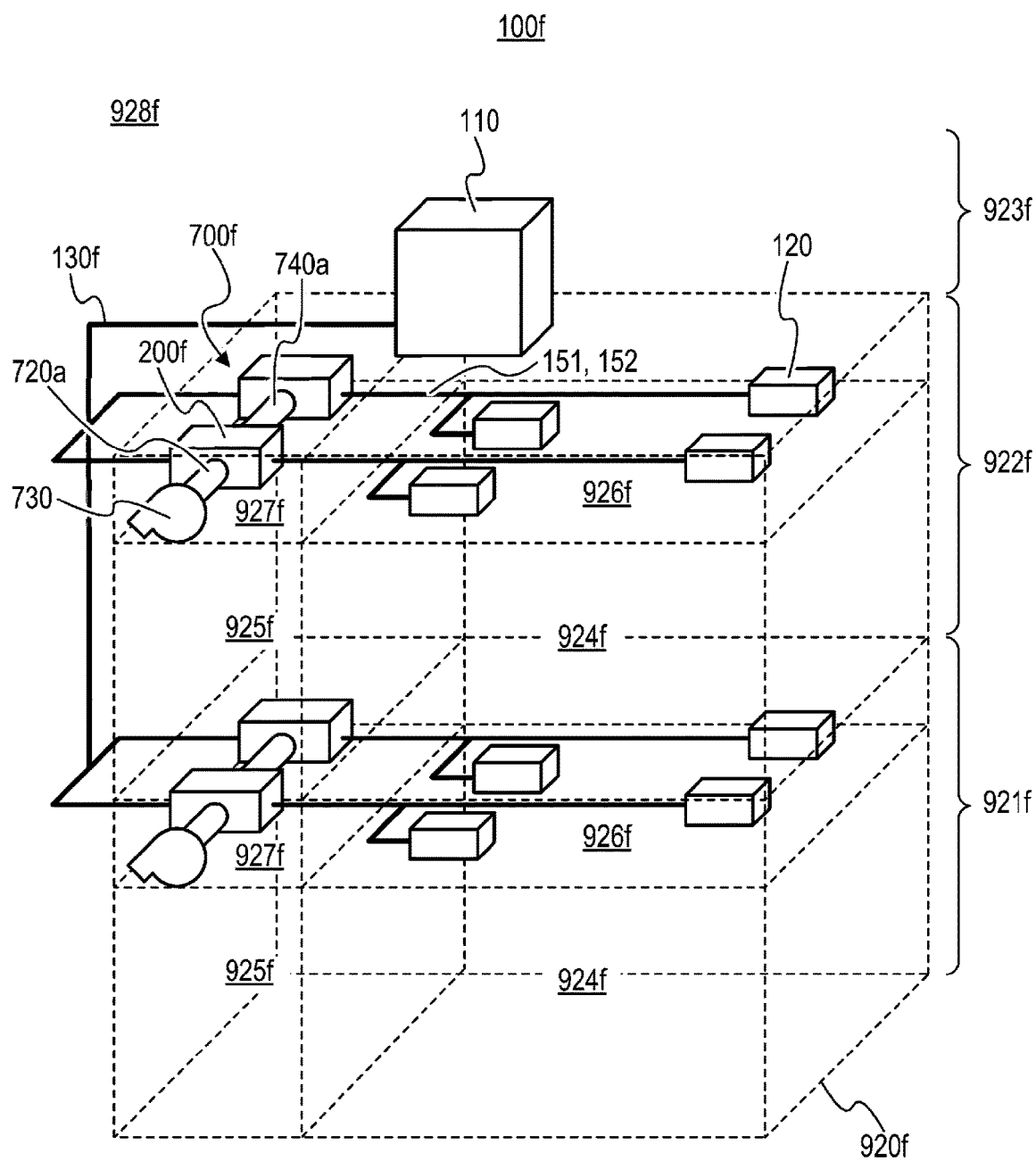

[Fig. 28]
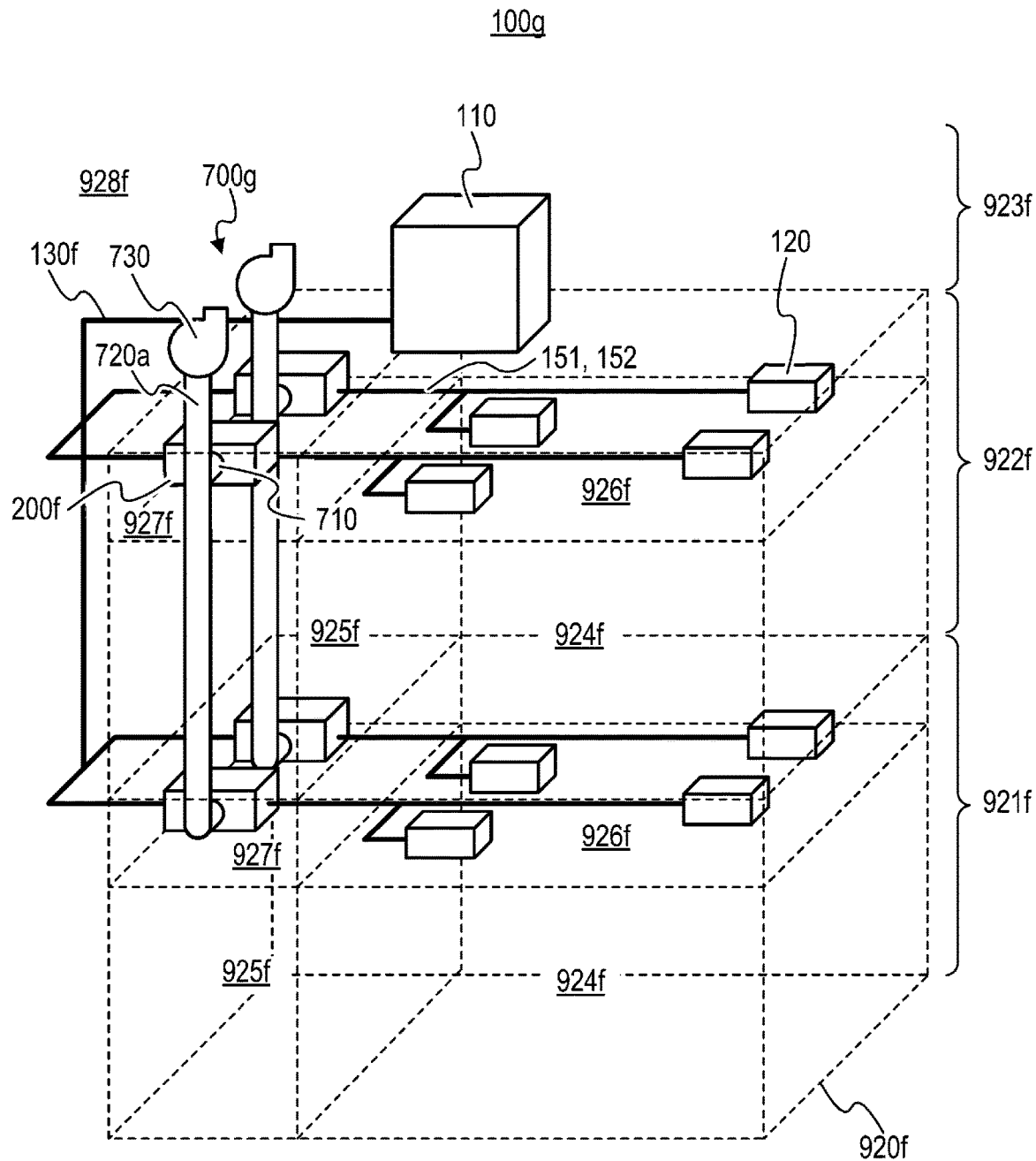

SAFETY SYSTEM AND METHOD FOR CONSTRUCTING AIR CONDITIONING SYSTEM

TECHNICAL FIELD

The present invention relates to a safety system for a heat pump system and a method for constructing an air conditioning system including the safety system.

BACKGROUND ART

In heat pump systems such as an air conditioning system for a plurality of target spaces, each of a liquid refrigerant pipe and a gas refrigerant pipe of a heat pump circuit is branched into a plurality of sub piping systems. The branched sub pipes in the sub piping systems are often provided with valves to zone the sub piping systems.

Meanwhile, each valve used in the heat pump system tends to become a leakage point of refrigerant, and thus needs to be regularly checked and repaired as necessary. Hence, for the convenience of monitoring and maintenance, it is common to design a piping of a heat pump system so as to arrange a plurality of valves in one place. For example, EP 3 091 314 A1 proposes to integrate a plurality of valves of the refrigerant sub pipes within a single casing to form a valve unit. Thereby, it is possible to not only ease the burden of monitoring/maintenance but also prevent refrigerant leaked at any valve from spreading to the surrounding area.

However, it is sometimes difficult to accommodate all the valves into a single casing, due to the number of the valves, arrangement of the piping, a spatial limitation, or the like. If the valves are separated into a plurality of separate casings, it is burdensome and takes time to open each of the casings to check whether a refrigerant leakage has occurred at any valve. Moreover, if a refrigerant leakage has occurred at any valve, the internal space of the casing accommodating the valve would have already been permeated with a significant amount of leaked refrigerant when the monitoring/maintenance person arrives to open the casing. For instance, some refrigerants used are flammable or slightly flammable. Thus, opening such a casing is undesirable from safety perspective.

SUMMARY OF INVENTION

The object of the present invention is to provide a safety system and a method for constructing an air conditioning system that can improve safety of a heat pump system regarding refrigerant leakage from valves even in a case where a plurality of valve units should be arranged in separate locations.

A first aspect of the present invention provides a safety system comprising: a plurality of valve units used for a heat pump system, each of the valve units having at least one liquid refrigerant pipe portion, at least one gas refrigerant pipe portion, at least one liquid control valve disposed in the liquid refrigerant pipe portion, at least one gas control valve disposed in the gas refrigerant pipe portion, a casing accommodating at least the liquid control valve and the gas control valve and formed with at least two openings, and a refrigerant leakage detector configured to detect an occurrence of a refrigerant leakage in an internal space of the casing; a connection structure connecting the internal spaces of the casings via the openings; and a discharge structure connected to the connection structure or one of the casings, and configured to discharge air from the internal space of the casing in which a refrigerant leakage has occurred.

With the above configuration, even if a refrigerant leakage has occurred at a valve in any one of the valve units, the casing accommodating the valve can prevent or restrain the leaked refrigerant from spreading to the surrounding area. Moreover, concentration of the leaked refrigerant in the internal space of the casing can be decreased by discharging the air from the internal space to an external space of the casings. Furthermore, the casings can be substantially closed during a normal operation of the heat pump system, and a refrigerant leakage detection can be made based on concentration of refrigerant in this substantially closed space.

Thus, it is possible to swiftly detect an occurrence of a refrigerant leakage in the valve unit and start operation of the discharge structure at an early stage. Thereby, it is possible to prevent concentration of the leaked refrigerant in both the casing in which the refrigerant leakage has occurred and the surrounding area of the casing from becoming high in a more secure manner. This allows the monitoring/maintenance person to safely monitor, maintain, or repair the valves. Accordingly, it is possible to improve safety of the heat pump system regarding refrigerant leakage.

In addition, the discharge structure is used in common for the plurality of valve units. Hence, the safety of the heat pump system can be improved while preventing an increase in the installation cost of the system even in a case where the valves are arranged in separate casings. This also reduces a space required for arranging the safety system.

Here, the external space to which the air is discharged by the discharge structure is preferably not an outer space directly surrounding any casing or an indoor space where a human or animal could come or reside. The external space is preferably an outdoor space. The heat pump system to which a plurality of the valve units belong may include a plurality of separate heat pump circuits. In other words, the pipings of the valve units need not necessary be connected to each other. In each of the valve units, the pipe portions, the valves, and the casing may be manufactured together. Thereby, it becomes easier to design the valve unit so as to enhance its performance such as airtightness of the casing. It also becomes easier to optimize the dimension of the valve unit, and a position of a maintenance door of the casing. Hence, it is possible to improve not only safety but also maintainability and functionality of the valve unit. Alternatively, the casing may be a retrofitted casing which is to be assembled around existing valves.

According to a preferred embodiment of the safety system mentioned above, the casing of each valve units has first and second lateral faces facing different directions, and in each of the valve units, a first opening as one of the openings is formed in the first lateral face and a second opening as another one of the openings is formed in the second lateral face.

With the above configuration, the first and second openings are formed in the lateral faces. It is thereby possible to prevent the connection structure from protruding upward or downward from the casing. This can reduce the height range of an arrangement of the valve units and the connection structure connecting these valve units. Here, the term "arrangement space" of elements means a cuboid space which can accommodate the elements, for instance.

Moreover, the lateral faces with the first and second openings face different directions. Thereby, it is possible to prevent a situation where a plurality of elements of the connection structure (e.g. ducts) protrude from the same face of the same casing, and thus avoid a congestion of the elements. In other words, the connection structure can be easily arranged along a single plane to reduce the height range of the arrangement space. This is advantageous especially when two valve units (hereinafter referred to as "the adjacent valve units") which are directly connected to each other by the connection structure are closely arranged side by side. Hence, the safety system according to the present invention can be easily installed even in a limited space (e.g. a relatively small space).

Here, the "lateral face" of the casing means an outer face of the casing that faces in a substantially horizontal direction in use (i.e. in a state where the valve unit is installed to be used). The lateral face may be defined by at least one plate which forms a part of the casing. The lateral face may be a face substantially orthogonal to a reference plane which defines a space in which the valve units are installed. Such a reference plane may be a floor of a space, or, when the valve units are installed in a ceiling space, an upper surface of a ceiling. Thus, when the space is slanted with respect to a horizontal plane due to a sloping ceiling for instance, the reference plane may be also slanted, and the lateral face may also be a face slanted according as the slant of the reference plane. The "different directions" of the first and second lateral faces may be orthogonal directions or opposite directions, but are not limited to these directions.

According to a preferred embodiment of the safety system mentioned above, the casing of each valve unit has a substantially box shape, and the first and second lateral faces are opposite faces of the casing.

With the above configuration, a plurality of the valve units and the connection structure connecting these valve units can easily be arranged in line. Thus, the width of the arrangement space of the valve units can be minimized. Here, the "width of the arrangement space" is length of the arrangement space in a direction which is orthogonal to the direction in which the valve units align, for instance. This is advantageous especially when three or more valve units are arranged in series.

According to another preferred embodiment of the safety system mentioned above in which the first and second lateral faces are the opposite faces, when viewed from a direction substantially perpendicular to the first and second lateral faces, the first opening and the second opening at least partially overlap with each other.

With the above configuration, when the adjacent valve units are arranged such that the first lateral face of one of the adjacent valve units and the second lateral face of the other one face each other, it is possible to easily make the first opening of the first lateral face and the second opening of the second lateral face overlap with each other when viewed from a direction substantially perpendicular to the first and second lateral faces. More specifically, such a positional relationship of the first and second openings can be achieved just by arranging the adjacent valve units such that the first and second lateral faces are parallel to each other and the peripheries of the first and second lateral faces coincide when viewed from a direction substantially perpendicular to the first and second lateral faces.

Thereby, the adjacent first and second openings to be connected by the connection structure can be positioned closer, and there is no need to greatly wind the connection structure. This allows the adjacent valve units to be arranged closer. As a result, it is possible to reduce the area of the arrangement space of the adjacent valve units and the connection structure therebetween.

According to further another preferred embodiment of any one of the safety systems mentioned above, the casing of each valve unit has a bottom face perpendicular to the first and second lateral faces; and the casing is configured such that the centers, the ends closer to the bottom face, and/or the ends farther from the bottom face of the first and second openings are at the same distance from the bottom face.

With the above configuration, it is possible to easily arrange the first opening of one of the valve units and the second opening of another one of the valve units at the same distance from a specific plane just by arranging the two valve units such that the bottom faces thereof are at the same distance from the specific plane. With such an arrangement, it is possible to arrange the connection structure along the specific plane. Moreover, since the height positions of the first and second openings can be standardized for all the valve units, it is possible to reduce the production cost of the safety system.

Here, the "bottom face" means an outer face of the casing that faces downward in use. The bottom face may be defined by at least one plate which forms a part of the casing. The "specific plane" may be a horizontal plane or the above-mentioned reference plane. Thus, when the space in which the valve units are installed is slanted with respect to the horizontal plane, the "bottom face" may also be slanted according as the slant of the space.

According to further another preferred embodiment of any one of the safety systems mentioned above in which the centers, the ends closer to the bottom face, and/or the ends farther from the bottom face of the first and second openings are at the same distance from the bottom face, at least a first valve unit and a second valve unit which are two of the valve units are arranged next to each other such that the bottom faces of the first and second valve units are flush with each other.

With the above configuration, there is no need to wind the connection structure against the above-mentioned specific plane in order to bridge the positional difference of the first and second openings of the first and second valve units with respect to the specific plane. This allows the adjacent valve units to be arranged closer. As a result, it is possible to reduce the area of the arrangement space of the adjacent valve units and the connection structure therebetween. In addition, since the bottom faces of the first and second valve units are aligned, it is also possible to reduce height range of the arrangement space of the adjacent valve units.

According to further another preferred embodiment of any one of the safety systems mentioned above in which the first and second lateral faces are opposite faces of the casing, the casing of each valve unit has a third lateral face perpendicular to the first and second lateral faces; and the casing is configured such that the centers, the ends closer to the third lateral face, and/or the ends farther from the third lateral face of the first and second openings are at the same distance from the third lateral face.

With the above configuration, it is possible to easily arrange the first opening of one of the valve units and the second opening of another one of the valve units at the same distance from a specific lateral plane just by arranging the two valve units such that the third lateral faces thereof are at the same distance from the specific lateral plane. With such an arrangement, it is possible to arrange the connection structure along the specific lateral plane. Moreover, since the height positions of the first and second openings can be standardized for all the valve units, it is possible to reduce the production cost of the safety system. Here, the "specific lateral plane" may be a vertical plane or a wall plane defining the space in which the valve units are to be installed, but is not limited to these planes.

According to further another preferred embodiment of any one of the safety systems mentioned above in which the centers, the ends closer to the third lateral face, and/or the ends farther from the third lateral face of the first and second openings are at the same distance from the third lateral face, at least a first valve unit and a second valve unit which are two of the valve units are arranged next to each other such that the third faces of the first and second valve units are flush with each other.

With the above configuration, there is no need to wind the connection structure against the above-mentioned specific lateral plane in order to bridge the positional difference of the first and second openings of the first and second valve units with respect to the specific lateral plane. This allows the adjacent valve units to be arranged closer. As a result, it is possible to reduce the area of the arrangement space of the adjacent valve units and the connection structure therebetween. In addition, since the third faces of the first and second valve units are aligned, it is also possible to reduce the width range of the arrangement space of the valve units.

According to further another preferred embodiment of any one of the safety systems mentioned above, each of the valve units further has a main liquid refrigerant pipe portion from which the liquid refrigerant pipe portion branches, and a main gas refrigerant pipe portion from which the gas refrigerant pipe portion branches; in each of the valve units, an end of the main liquid refrigerant pipe portion and an end of the main gas refrigerant pipe portion protrude from the first lateral face, and the other end of the main liquid refrigerant pipe portion and the other end of the main gas refrigerant pipe portion protrude from the second lateral face; and the safety system further comprises at least one liquid refrigerant connection pipe connecting the main liquid refrigerant pipe portion of a first valve unit and the main liquid refrigerant pipe portion of a second valve unit, the first and second valve units being two of the valve units, and at least one gas refrigerant connection pipe connecting the main gas refrigerant pipe portion of the first valve unit and the main gas refrigerant pipe portion of the second valve unit.

With the above configuration, the main liquid refrigerant pipe portions and the main gas refrigerant pipe portions (hereinafter referred to as "the main pipe portions") of the two adjacent valve units are connected in series by the liquid refrigerant connection pipe and the gas refrigerant connection pipe (hereinafter referred to as "the connection pipes"). The ends of the main pipe portions protrude from the lateral faces in which the first and second openings are formed. Thus, when the two valve units are arranged such that the first lateral face of one of the adjacent valve units and the second lateral face of the other one face each other, both the connection pipes and the connection structure can be arranged within a space between the two valve units. Thus, it is possible to reduce the width of the arrangement space of the valve units, the connection pipes, and the connection structure. Moreover, since the connection pipes and the connection structure connecting the two adjacent valve units can be arranged in parallel, the structures of connections between the valve units can be simplified.

According to further another preferred embodiment of any one of the safety systems mentioned above in which the ends of the main liquid refrigerant pipe portion and the main gas refrigerant pipe portion protrude from the first and second lateral faces, the casing of each valve unit has a pipe outlet face different from the first and second lateral faces; and an end of the liquid refrigerant pipe portion and an end of the gas refrigerant pipe portion protrude from the pipe outlet face.

With the above configuration, the ends of the liquid refrigerant pipe portion and the gas refrigerant pipe portion (hereinafter referred to as "the sub pipe portions") protrude from a face other than the first and second lateral faces. Thereby, a congestion of the protruding pipe portions and the connection structure in a space between the two adjacent valve units can be avoided. This allows the adjacent valve units to be arranged closer. Moreover, since the sub pipe portions protrude from one of the lateral faces, it is possible to prevent the sub pipe portions from protruding upward or downward from the casing. This can reduce height range of the arrangement space of the valve units.

According to further another preferred embodiment of any one of the safety systems, the casing of each valve unit has a drain pan which is provided with a drain outlet protruding from an edge of the drain pan; and the casing is configured such that the drain pan is switchable between at least two states in which the drain outlet protrudes towards different directions.

With the above configuration, it is possible to easily switch the position of the drain outlet between at least two different positions. This is advantageous when a position of a drainpipe with which the drain outlet is to be connected is limited. By setting the position of the drain outlet closer to the position of the drainpipe, it is easy to connect them. The drain pan and the lower part of the casing (herein after referred to as "the lower casing part") to which the drain pan is attached have corresponding shapes, and provided with fixing structures for detachably fixing the drain pan with respect to the lower casing part. The shapes of the drain pan and the lower casing part and the arrangement and configuration of the fixing structures may be point-symmetrical.

According to a preferred modification of the safety system mentioned above, the discharge structure includes a shared duct connected to the connection structure or one of the casings, and a ventilator disposed to the shared duct.

With the above configuration, it is possible to effectively discharge the air from the internal space of the casing when a refrigerant leakage in the casing has occurred. Here, the ventilator may be configured to blow air to push the air within the casing out, or suck air to draw the air in the casing out. The shared duct may be extended to the outdoor space, and the ventilator may be disposed in or attached to the shared duct. The ventilator may be configured to further discharge air surrounding at least one of the casings, e.g. air in a ceiling or a pipe shaft.

According to another preferred modification of the safety system mentioned above with the shared duct and the ventilator, the shared duct has a first end and a second end; the ventilator is disposed to the shared duct at or close to the second end, and configured to draw air in the shared duct towards the second end; and the shared duct is connected to the connection structure or one of the casings on a side of the first end with respect to the ventilator.

With the above configuration, the internal spaces of the casings, the connection structure, and the most part of the shared duct are kept in under pressure when the air is discharged. Thus, it is possible to prevent the air containing refrigerant from leaking to the surrounding area.

According to further another preferred modification of the safety system mentioned above with the second end of the shared duct, the second end of the shared duct is open to an outdoor space.

With the above configuration, the air containing refrigerant can be discharged to the outdoor space. Thus, the safety of the heat pump system can be further improved.

According to further another preferred modification of any one of the safety systems mentioned above with the shared duct and the ventilator, the safety system further includes: a first controller configured to control the ventilator to start operating when a refrigerant leakage in any one of the valve units has occurred.

With the above configuration, it is possible to discharge the air containing refrigerant in a more secure manner when the refrigerant leakage has occurred.

According to further another preferred modification of any one of the safety systems mentioned above with the first controller, each of the refrigerant leakage detectors are configured to output detection result information; and the first controller is configured to receive the detection result information outputted from any one of the refrigerant leakage detectors, and identify in which of the valve units a refrigerant leakage has occurred based on the received detection result information.

With the above configuration, it is possible to identify the valve unit in which a refrigerant leakage has occurred, and perform a control of the ventilator based on the determination result. Here, the detection result information indicates whether or not a refrigerant leakage in the corresponding valve unit has occurred, and may indicate an identification of the valve unit in which the refrigerant leakage has occurred (hereinafter referred to as "the valve unit of refrigerant leakage").

According to further another preferred modification of any one of the safety systems mentioned above, the connection structure includes a plurality of individual ducts connected to the second openings of the casings, respectively, and further connected to the shared duct in common.

With the above configuration, the internal spaces of the casings are connected to each other in parallel. In other words, each of the internal spaces communicates with the discharge structure without being interposed by any other casing. Hence, it is possible to reduce static pressure capacity required of the ventilator.

According to further another preferred modification of any one of the safety systems mentioned above with the individual ducts, each of the valve units further has a damper configured to block air to pass through the first opening when the damper is closed, and allow air to pass through the first opening when the damper is open; and the first controller is configured to control the dampers such that, when the ventilator operates due to the occurrence of the refrigerant leakage, the damper of the valve unit in which the refrigerant leakage has occurred is open while the damper of the valve unit in which no refrigerant leakage has occurred is closed.

It is preferable that all the dampers are closed during a normal operation of the heat pump system to swiftly detect a refrigerant leakage and prevent the leaked refrigerant from spreading out towards the surrounding area. Meanwhile, if the damper is closed, the first opening cannot work as an intake port of an external air or an exhaust port of the internal air, and it is difficult to replace air in the internal space of the casing even if the ventilator operates. In this regard, the above configuration opens the damper of the valve unit of refrigerant leakage to effectively discharge air while achieving a swift detection of a refrigerant leakage. Moreover, the other damper or dampers are kept closed, and thereby the valve unit subject to the air discharge can be limited to the valve unit of refrigerant leakage. In general, it is rare that refrigerant leakages occur in different valve units at a time. Hence, it is possible to reduce air volume capacity required of the ventilator. Each of the dampers may be directly attached to the first opening or arranged away from the first opening and connected to the first opening via a duct.

According to further another preferred modification of any one of the safety systems mentioned above with the individual ducts and the dampers, the first controller includes a plurality of unit controllers disposed in the valve units, respectively, and a central controller configured to communicate with the unit controllers; each of the refrigerant leakage detectors is configured to transmit detection result information to the central controller via the corresponding unit controller; and the central controller is configured to determine whether a refrigerant leakage in any one of the valve units has occurred based on the detection result information received from the valve unit, and, when the refrigerant leakage has occurred in any one of the valve units, transmit a damper open command to the damper of the valve unit in which the refrigerant leakage has occurred via the corresponding unit controller and control the ventilator to start operating.

With the above configuration, it is possible to identify the valve unit of refrigerant leakage, and perform a centralized control of the ventilator and the dampers based on the determination result in a more secure manner. Here, the detection result information indicates whether or not a refrigerant leakage in the valve unit has occurred, and may indicate an identification of the valve unit of refrigerant leakage. The damper open command instructs the damper to open, and may designate an identification of the valve unit of which the damper should open.

According to further another preferred embodiment of any one of the safety systems mentioned above, the connection structure includes at least one connecting duct connecting the first opening of a first valve unit and the second opening of a second valve unit, the first and second valve units being two of the valve units; and the discharge structure is connected to the second opening of the first valve unit.

With the above configuration, the internal spaces of the casings are connected to the discharge structure in series. In other words, at least one of the internal spaces communicates with the discharge structure via one or more of the other casings. Thereby, it is possible to reduce the total length of ducts for connecting the casings to the discharge structure, and thus reduce the installation cost of the system. The shared duct and the ventilator may be integrated as a single element. If one of the casings has a part exposed to the outdoor space, such a single element may be disposed in this part. In addition, because the valve units are connected in series, the width of the arrangement space of the valve units and the connection structure can be minimized.

According to further another preferred embodiment of any one of the safety systems mentioned above with the connecting duct, the first valve unit and the second valve unit are arranged such that the first lateral face of the first valve unit and the second lateral face of the second valve unit face each other.

With the above configuration, it is easy to connect the first opening of the first valve unit and the second opening of the second lateral face. Thereby, the connection structure connecting the first and second openings can be arranged within a space between the first and second valve units. Thus, it is possible to reduce the width of the arrangement space of the valve units and the connection structure. It is preferable that the first lateral face and the second lateral face are substantially in parallel. In this case, it is also preferable that the centers and/or the edges on the same direction of the first and second openings are at substantially the same position in a plane parallel to the first and second lateral faces. Thereby, there is no need to wind the connection structure, and thus the first and second valve units can be arranged closer.

According to further another preferred embodiment of any one of the safety systems mentioned above which has the shared duct, the connecting duct, and the ventilator, the safety system further comprises: a damper configured to block air to pass through a terminal first opening when the damper is closed, and allow air to pass through the terminal first opening when the damper is open, the terminal first opening being the first opening which is of one of the valve units connected by the at least one connecting duct in series with respect to the ventilator and connected to no connecting duct, a second controller configured to control the damper to open when the ventilator operates due to the occurrence of the refrigerant leakage in any of the valve units connected in series.

It is preferable that the damper is closed during a normal operation of the heat pump system in order to swiftly detect a refrigerant leakage and prevent the leaked refrigerant from spreading out towards the surrounding area. Meanwhile, if the damper is closed, the terminal first opening cannot work as an intake port of an external air or an exhaust port of the internal air, and it is difficult to replace air in the internal spaces of the casings even if the ventilator operates. In this regard, the above configuration opens the damper when a refrigerant leakage has occurred to effectively discharge air of all the valve units continuing in series while achieving a swift detection of a refrigerant leakage. The damper may be directly attached to the first opening or arranged away from the first opening and connected to the first opening via a duct or the like.

According to further another preferred embodiment of any one of the safety systems mentioned above which has the shared duct, the connecting duct, the ventilator, and the controller, the safety system further comprises a damper unit configured to be attachable to the first opening of any of the valve units, and, in a state where the damper unit is attached to the first opening, block air to pass through the first opening when the damper is closed, and allow air to pass through the first opening when the damper is open.

With the above configuration, the damper can be mounted to any of the valve units depending on the connection order of the valve units by the connection structure. In other words, all the valve units can be produced in the same configuration, and thereby the production cost of the safety system can be reduced. The damper unit may have a box formed with two opposite openings, and the damper may be attached to one of the openings. The box may be provided with a fixing structure such as screw fasteners for detachably fixing the box of the damper unit with respect to the first face of the casing such that the opening of the box coincides with the first opening.

A second aspect of the present invention provides an air conditioning system comprising: any one of the safety systems mentioned above, a heatsource-side unit including a compressor and a heatsource-side heat exchanger; a plurality of utilization-side units each including a utilization-side heat exchanger; a liquid refrigerant piping extending between the heatsource-side unit and the utilization-side units, and including the liquid refrigerant pipe portions; a gas refrigerant piping extending between the heatsource-side unit and the utilization-side units, and including the gas refrigerant pipe portions; and an expansion mechanism disposed in the liquid refrigerant piping.

With the above configuration, it is possible to obtain air conditioning system with high safety regarding refrigerant leakage at valves.

A third aspect of the present invention provides a method for constructing an air conditioning system, the air conditioning system comprising: any one of the safety systems mentioned above; a heatsource-side unit including a compressor and a heatsource-side heat exchanger; a plurality of utilization-side units each including a utilization-side heat exchanger; a liquid refrigerant piping extending between the heatsource-side unit and the utilization-side units, and including the liquid refrigerant pipe portions; a gas refrigerant piping extending between the heatsource-side unit and the utilization-side units, and including the gas refrigerant pipe portions; and an expansion mechanism disposed in the liquid refrigerant piping, the method comprising: installing the valve units, the connection structure, the discharge structure, and the utilization-side units in the same floor of a building; and connecting the valve units by the connection structure, and connecting the discharge structure to the connection structure or one of the casings.

By the above method, it is possible to obtain an air conditioning system that comprises: any one of the safety systems mentioned above; a heatsource-side unit including a compressor and a heatsource-side heat exchanger; a plurality of utilization-side units each including a utilization-side heat exchanger; a liquid refrigerant piping extending between the heatsource-side unit and the utilization-side units, and including the liquid refrigerant pipe portions; a gas refrigerant piping extending between the heatsource-side unit and the utilization-side units and including the gas refrigerant pipe portions; and an expansion mechanism disposed in the liquid refrigerant piping, wherein the valve units, the connection structure, and the utilization-side units are installed in the same floor of a building.

As mentioned above, the valve units, which improve safety regarding refrigerant leakage in an air conditioning system, can be closely arranged side by side. Thus, the length of the connection structure such as a connecting duct can be shortened. Also, the valve units can be arranged in a limited space of the building, such as a space which is in the same floor as a target space which is to be air-conditioned by the utilization-side units of the air conditioning system. When the valve units are arranged close to the utilization-side units, it is possible to reduce total length of refrigerant pipings between each valve unit and the utilization-side unit connected to the valve unit. Moreover, when the valve units and the utilization-side units are arranged substantially in the same level, the arrangement of the refrigerant pipings between the valve units and the utilization-side units can be simplified. For instance, the number of venting portions of the refrigerant piping can be reduced. Furthermore, because the discharge structure is also arranged substantially in the same level, the total length of the ducts used in the safety system can be shortened. Hence, it is possible to obtain the air conditioning system which improves safety regarding refrigerant leakage at a low cost.

According to a preferred embodiment of the method for constructing the air conditioning system mentioned above, the installing includes: installing the utilization-side units in a first space which is to be air-conditioned by the utilization-side units; and installing the valve units, the connection structure, and the discharge structure of the safety system in a second space which is adjacent to the first space.

In the air conditioning system resulting from the above method, the utilization-side units are installed in the first space which is to be air-conditioned by the utilization-side units, and the valve units and the connection structure of the safety system are installed in the second space which is adjacent to the first space. The valve units can be arranged in a limited space of the building, such as a space adjacent to the target space. Thus, it is possible to further reduce the total length and the number of venting portions of refrigerant pipings. Moreover, because the discharge structure is also arranged in the same space as the valve units, the total length of the ducts used in the safety system can be shortened. Hence, it is possible to further reduce the installation cost of the air conditioning system.

A fourth aspect of the present invention provides a method for constructing an air conditioning system, the air conditioning system comprising: any one of the safety systems mentioned above; a heatsource-side unit including a compressor and a heatsource-side heat exchanger; a plurality of utilization-side units each including a utilization-side heat exchanger; a liquid refrigerant piping extending between the heatsource-side unit and the utilization-side units, and including the liquid refrigerant pipe portions; a gas refrigerant piping extending between the heatsource-side unit and the utilization-side units, and including the gas refrigerant pipe portions; and an expansion mechanism disposed in the liquid refrigerant piping, the method comprising: installing the valve units in different floors of a building; arranging the connection structure to connect the valve units over the different floors; and connecting the discharge structure to the connection structure.

By the above method, it is possible to obtain an air conditioning system that comprises any one of the safety systems mentioned above; a heatsource-side unit including a compressor and a heatsource-side heat exchanger; a plurality of utilization-side units each including a utilization-side heat exchanger; a liquid refrigerant piping extending between the heatsource-side unit and the utilization-side units, and including the liquid refrigerant pipe portions; a gas refrigerant piping extending between the heatsource-side unit and the utilization-side units, and including the gas refrigerant pipe portions; and an expansion mechanism disposed in the liquid refrigerant piping, wherein the valve units are installed in different floors of a building, the connection connects the valve units over the different floors, and the discharge structure is connected to the connection structure.

As mentioned above, the valve units, which improve safety regarding refrigerant leakage in an air conditioning system, can prevent the connection structure from protruding upward or downward from the casing. Thus, it is possible to reduce height range of the arrangement space of the valve unit. In addition, a common discharge structure can be used for different floors. Hence, it is possible obtain the air conditioning system which improves safety regarding refrigerant leakage at a low cost.

A reference example of a safety system comprises: a plurality of valve units used for a heat pump system, each of the valve units having at least one liquid refrigerant pipe portion, at least one gas refrigerant pipe portion, at least one liquid control valve disposed in the liquid refrigerant pipe portion, at least one gas control valve disposed in the gas refrigerant pipe portion, a casing accommodating at least the liquid control valve and the gas control valve and formed with at least two openings, and a refrigerant leakage detector configured to detect an occurrence of a refrigerant leakage in an internal space of the casing; a connection structure connecting the internal spaces of the casings via the openings; and a discharge structure connected to the connection structure or one of the casings, and configured to discharge air from the internal space of the casing in which a refrigerant leakage has occurred.

With the above configuration, even if a refrigerant leakage has occurred at a valve in any one of the valve units, the casing accommodating the valve can prevent or restrain the leaked refrigerant from spreading to the surrounding area. Moreover, concentration of the leaked refrigerant in the internal space of the casing can be decreased by discharging the air from the internal space to an external space of the casings. Furthermore, each casing can be substantially closed during a normal operation of the heat pump system, and a refrigerant leakage detection can be made based on concentration of refrigerant in this substantially closed space.

Thus, it is possible to swiftly detect an occurrence of a refrigerant leakage in the valve unit and start operation of the discharge structure at an early stage. Thereby, it is possible to prevent concentration of the leaked refrigerant in both the casing in which the refrigerant leakage has occurred and the surrounding area of the casing from becoming high in a more secure manner. This allows the monitoring/maintenance person to safely monitor, maintain, or repair the valves. Accordingly, it is possible to improve safety of the heat pump system regarding refrigerant leakage.

In addition, the discharge structure is used in common for the plurality of valve units. Hence, the safety of the heat pump system can be improved while preventing an increase in the installation cost of the system even in a case where the valves are arranged in separate locations.

Here, the external space to which the air is discharged by the discharge structure is preferably not an outer space directly surrounding any casing or an indoor space where a human or animal could come or reside. The external space is preferably an outdoor space. The heat pump system to which a plurality of the valve units belong may include a plurality of separate heat pump circuits. In other words, the pipings of the valve units need not necessary be connected to each other. In each of the valve units, the pipe portions, the valves, and the casing may be manufactured together. Thereby, it becomes easier to design the valve unit so as to enhance its performance such as airtightness of the casing. It also becomes easier to optimize the dimension of the valve unit, and a position of a maintenance door of the casing. Hence, it is possible to improve not only safety but also maintainability and functionality of the valve unit. Alternatively, the casing may be a retrofitted casing which is to be assembled around existing valves.

BRIEF DESCRIPTION OF DRAWINGS

FIG. 1 is a schematic configuration diagram of an air conditioning system with valve units according to a first embodiment of the present invention.

FIG. 2 is a schematic configuration diagram of a valve unit shown in FIG. 1.

FIG. 3 is a schematic configuration diagram of a safety system according to the first embodiment.

FIG. 4 is a flow chart indicating an operation performed by a unit controller shown in FIG. 3.

FIG. 5 is a flow chart indicating an operation performed by a central controller shown in FIG. 3.

FIG. 6 is a schematic configuration diagram of the safety system according to a second embodiment of the present invention.

FIG. 7 is a flow chart indicating an operation performed by a central controller shown in FIG. 6.

FIG. 8 is a schematic configuration diagram of the safety system according to a third embodiment of the present invention.

FIG. 9 is a grouping table used by a central controller shown in FIG. 9.

FIG. 10 is a schematic configuration diagram of the safety system according to a fourth embodiment of the present invention.

FIG. 11 is a grouping table used by the central controller according to a fourth embodiment of the present invention.

FIG. 12 is a schematic configuration diagram of a valve unit according to a modification of the present embodiment.

FIG. 13 is a schematic configuration diagram showing a first arrangement pattern of first and second openings shown in FIG. 2.

FIG. 14 is a schematic configuration diagram showing a second arrangement pattern of the first and second openings.

FIG. 15 is a schematic configuration diagram showing a third arrangement pattern of the first and second openings.

FIG. 16 is a schematic configuration diagram showing a fourth arrangement pattern of the first and second openings.

FIG. 17 is a schematic configuration diagram of an air conditioning system with valve units according to a fifth embodiment of the present invention.

FIG. 18 is a schematic configuration diagram of the safety system according to the fifth embodiment.

FIG. 19 is a perspective view of a valve unit according to the fifth embodiment.

FIG. 20 is a perspective view of a valve unit according to the fifth embodiment, with a top plate removed.

FIG. 21 is a top perspective view of a valve unit according to the fifth embodiment, with a top plate removed.

FIG. 22 is a front plan view of a damper unit shown in FIG. 21.

FIG. 23 is a rear perspective view of the damper unit.

FIG. 24 is a front perspective view of the damper unit.

FIG. 25 is a perspective view of a drain pan of the valve unit.

FIG. 26 is a schematic diagram showing an arrangement of the adjacent valve units.

FIG. 27 is a schematic configuration diagram of an air conditioning system according to a first modification of the fifth embodiment.

FIG. 28 is a schematic configuration diagram of an air conditioning system according to a second modification of the fifth embodiment.

DESCRIPTION OF EMBODIMENTS

Preferred embodiments of an air conditioning system and a safety system according to the present invention will be described with reference to the drawings.

First Embodiment (Configuration of Air Conditioning System)

The air conditioning systems according to a first embodiment of the present embodiment is a multi air conditioning system with a so-called three-pipe configuration, which includes a heatsource-side unit and a plurality of utilization-side units.

FIG. 1 is a schematic configuration diagram of the air conditioning system according to the first embodiment.

As shown in FIG. 1, the air conditioning system 100 comprises a heatsource-side unit 110, and a plurality of utilization-side units 120 connected to the heatsource-side unit 110 via refrigerant pipes. The utilization-side units 120 are divided into a plurality of unit families 121, e.g. first to third unit families 121_1, 121_2, 121_3. Yet, the number of the unit families 121 is not limited to three, and may be two, four, or more. The number of the utilization-side unit 120 belonging to each of the unit families 121 is also not limited.

The heatsource-side unit 110 includes a compressor, and a condenser and an evaporator (heatsource-side heat exchangers) (not shown). The heatsource-side unit 110 also extends out a liquid refrigerant pipe 131, a low-pressure gas refrigerant pipe 132, and a high-pressure gas refrigerant pipe 133. The liquid refrigerant pipe 131 communicates with each of the condenser and the evaporator. The low-pressure gas refrigerant pipe 132 communicates with a suction port of the compressor. The high-pressure gas refrigerant pipe 133 communicates with a discharge port of the compressor.

The liquid refrigerant pipe 131 branches into a plurality of heatsource-side liquid pipes 141 towards the first to third unit families 121_1, 121_2, 121_3. The low-pressure gas refrigerant pipe 132 branches into a plurality of heatsource-side low-pressure gas pipes 142 towards the first to third unit families 121_1, 121_2, 121_3. The high-pressure gas refrigerant pipe 133 branches into a plurality of heatsource-side high-pressure gas pipes 143 towards the first to third unit families 121_1, 121_2, 121_3.

For each of the unit families 121, the heatsource-side liquid pipe 141 branches into a plurality of utilization-side liquid refrigerant pipes 151 towards the utilization-side units 120 which belong to the unit family 121. For each of the unit families 121, the heatsource-side low-pressure gas pipe 142 branches into a plurality of utilization-side gas refrigerant pipes 152 towards the utilization-side units 120 which belong to the unit family 121. For each of the unit families 121, the heatsource-side high-pressure gas pipe 143 branches towards the utilization-side units 120 which belong to the unit family 121, and each of the branched pipes merges with the corresponding utilization-side gas refrigerant pipe 152.

Each of the utilization-side units 120 includes a utilization-side heat exchanger (not shown). For each of the utilization-side units 120, the utilization-side heat exchanger communicates with the corresponding utilization-side liquid refrigerant pipe 151 and utilization-side gas refrigerant pipe 152.

In other words, in the air conditioning system 100, a liquid refrigerant piping and a gas refrigerant piping extends between the heatsource-side unit 110 and the utilization-side units 120, while branching towards the unit families 121 and then towards the utilization-side units 120 in each of the unit families 121, to form a heat pump circuit. Thereby, it is possible to supply hot/cold heat from the heatsource-side unit 110 to each of the utilization-side units 120 by circulating refrigerant.

The air conditioning system 100 further includes first to third valve units 200_1, 200_2, 200_3 for the first to third unit families 121_1, 121_2, 120_3, respectively. For each of the unit families 121, the branching points towards the corresponding utilization-side units 120 are disposed in the corresponding valve unit 200. The first to third valve units 200_1, 200_2, 200_3 have a substantially same configuration. Thus, in the following descriptions, the term "the valve unit 200" means any one of the first to third valve units 200_1, 200_2, 200_3. The details of the valve unit 200 are explained hereinafter.

The air conditioning system 100 includes a safety system for improving safety of the air conditioning system 100 (a heat pump system) regarding refrigerant leakage. The first to third valve units 200_1, 200_2, 200_3 are part of the safety system. The details of the safety system will be explained later.

(Configuration of Valve Unit)

FIG. 2 is a schematic configuration diagram of the valve unit 200.

As shown in FIG. 2, the valve unit 200 comprises a multi branch selector 300, a casing 400, a damper 440, a refrigerant leakage detector 500, and a unit controller 600. The casing 400 accommodates the multi branch selector 300 therein. The refrigerant leakage detector 500 and the unit controller 600 are disposed in an internal space 401 of the casing 400. Yet, the unit controller 600 may be disposed on or outside the casing 400.

The multi branch selector 300 includes a heatsource-side liquid pipe portion 310, a plurality of utilization-side liquid pipe portions 311, a low-pressure gas pipe portion 320, a plurality of low-pressure gas sub pipes 321, a plurality of utilization-side gas pipe portions 330, a high-pressure gas pipe portion 340, a plurality of high-pressure gas sub pipes 341, a plurality of bypass pipes 351, and a plurality of refrigerant heat exchangers 352. The multi branch selector 300 further includes a plurality of low-pressure gas control valves 361, a plurality of high-pressure gas control valves 362, a plurality of expansion mechanisms 363, a plurality of liquid shut-off valves 364, and a plurality of gas shut-off valves 365.

The numbers of the utilization-side liquid pipe portions 311, the low-pressure gas sub pipes 321, the utilization-side gas pipe portions 330, the high-pressure gas sub pipes 341, the bypass pipes 351, the refrigerant heat exchangers 352, the low-pressure gas control valves 361, the high-pressure gas control valves 362, the expansion mechanisms 363, the liquid shut-off valves 364, and the gas shut-off valves 365 may be the same as the number of the utilization-side units 120 which belong to the corresponding unit family 121 (see FIG. 1).

The heatsource-side liquid pipe portion 310, the low-pressure gas pipe portion 320, the high-pressure gas pipe portion 340 are parts of the corresponding heatsource-side liquid pipe 141, heatsource-side low-pressure gas pipe 142, and heatsource-side high-pressure gas pipe 143 (see FIG. 1). The utilization-side liquid pipe portions 311 are parts of the corresponding utilization-side liquid refrigerant pipes 151 (see FIG. 1). The low-pressure gas sub pipes 321, the high-pressure gas sub pipes 341, and the utilization-side gas pipe portions 330 are parts of the corresponding utilization-side gas refrigerant pipes 152 (see FIG. 1). One of the utilization-side liquid pipe portions 311 and one of the utilization-side gas pipe portions 330 communicate with the same utilization-side heat exchanger of one of the utilization-side units 120.

In the multi branch selector 300, the heatsource-side liquid pipe portion 310 branches into the utilization-side liquid pipe portions 311, the low-pressure gas pipe portion 320 branches into the low-pressure gas sub pipes 321, and the high-pressure gas pipe portion 340 branches into the high-pressure gas sub pipes 341. One of the low-pressure gas sub pipes 321 and one of the high-pressure gas sub pipes 341 are connected to one of the utilization-side gas pipe portions 330. It can also be said that each of the low-pressure gas pipe portion 320 branches into the utilization-side gas pipe portions 330 via the low-pressure gas sub pipes 321, and that the high-pressure gas pipe portion 340 branches into the utilization-side gas pipe portions 330 via the high-pressure gas sub pipes 341. It can also be said that each of the utilization-side gas pipe portions 330 branches into the low-pressure gas pipe portion 320 and the high-pressure gas pipe portion 340 via one of the low-pressure gas sub pipes 321 and one of the high-pressure gas sub pipes 341.

The bypass pipes 351 are connected to the utilization-side liquid pipe portions 311, respectively, and each connected to the low-pressure gas pipe portion 320. In other words, one of the bypass pipes 351 branches from one of the utilization-side liquid pipe portions 311 and merges with the low-pressure gas pipe portion 320.

The expansion mechanisms 363 are disposed in the bypass pipes 351, respectively. Each of the expansion mechanisms 363 is configured to decompress and expand refrigerant flowing from the corresponding utilization-side liquid pipe portion 311 in the bypass pipe 351. Each of the expansion mechanisms 363 may be an electric expansion valve.

The refrigerant heat exchangers 352 are provided to the bypass pipes 351, respectively. Each of the refrigerant heat exchangers 352 is configured to cause a heat-exchange between refrigerant flowing in one of the utilization-side liquid pipe portions 311 and refrigerant flowing in the corresponding bypass pipe 351 that has been decompressed and expanded by the corresponding expansion mechanism 363. In other words, each of the refrigerant heat exchangers 352 forms a subcooling system in combination with the corresponding utilization-side liquid pipe portion 311, bypass pipe 351, and expansion mechanism 363. Each of the refrigerant heat exchangers 352 may have two flow channels which form a part of the utilization-side liquid pipe portion 311 and a part of the bypass pipe 351, respectively, and have thermal conductance therebetween.

The low-pressure gas control valves 361 are disposed in the low-pressure gas sub pipes 321, respectively. Each of the low-pressure gas control valves 361 is configured to switch between an open state and a closed state, i.e. whether or not to allow refrigerant to flow between the low-pressure gas pipe portion 320 and the corresponding utilization-side gas pipe portion 330. The state of each of the low-pressure gas control valves 361 is controlled by the unit controller 600 in accordance with an operation mode desired for the corresponding utilization-side unit 120. Each of the low-pressure gas control valves 361 may be an electric valve.

The high-pressure gas control valves 362 are disposed in the high-pressure gas sub pipes 341, respectively. Each of the high-pressure gas control valves 362 is configured to switch between an open state and a closed state, i.e. whether or not to allow refrigerant to flow between the high-pressure gas pipe portion 340 and the corresponding utilization-side gas pipe portion 330. The state of each of the high-pressure gas control valves 362 is controlled by the unit controller 600 in accordance with an operation mode desired for the corresponding utilization-side unit 120. Each of the high-pressure gas control valves 362 may be an electric valve, and preferably formed with a minute channel.

The liquid shut-off valves 364 are disposed in the utilization-side liquid pipe portions 311, respectively. The gas shut-off valves 365 are disposed in the utilization-side gas pipe portions 330, respectively. The liquid shut-off valve 364 and the gas shut-off valve 365 disposed in the utilization-side liquid pipe portion 311 and the utilization-side gas pipe portion 330 which communicate with the same utilization-side heat exchanger define a utilization-side piping section which extends therebetween and includes at least the utilization-side heat exchanger. Each of the liquid shut-off valves 364 and the gas shut-off valves 365 may be an electric valve.

The casing 400 may have a substantially box shape, and is large enough to accommodate at least the multi branch selector 300 and the refrigerant leakage detector 500 therein. The casing 400 may be made of metal plates, carbon fibre plates, fire-retardant resin plates, or the like. The casing 400 is formed with a plurality of pipe apertures 410.

The plurality of pipe apertures 410 are configured to allow the pipes extending from the multi branch selector 300 (hereinafter referred to as "the extending pipes") to pass therethrough, respectively. In other words, the plurality of pipe apertures 410 are formed at positions corresponding to the positions of the extending pipes, and each have diameter greater than the diameter of the corresponding extending pipe. Here, such extending pipes include the heatsource-side liquid pipe portion 310, the low-pressure gas pipe portion 320, the high-pressure gas pipe portion 340, the utilization-side liquid pipe portions 311, and the utilization-side gas pipe portions 330.

Each of the extending pipes may have a pipe connection part 370 for being connected to the corresponding outer pipes, i.e. the other part of the corresponding heatsource-side liquid pipe 141, heatsource-side low-pressure gas pipe 142, heatsource-side high-pressure gas pipe 143, utilization-side liquid refrigerant pipe 151, or utilization-side gas refrigerant pipe 152 (see FIG. 1). It is preferable that the pipe connection parts 370 are arranged outside of the casing 400.

The casing 400 is further formed with a first opening 420, and a second opening 430. It is preferable that the first opening 420 and the second opening 430 are arranged on opposite sides of the casing 400 with respect to the center part of the internal space 401.

Especially when refrigerant heavier than atmospheric air such as R32 refrigerant is used, it is preferable that both the first opening 420 and the second opening 430 are arranged closer to the top part of the casing 400. Thereby, it is possible to prevent leaked refrigerant from spreading out to the surrounding area of the casing 400 in a more secure manner, and thereby swiftly detect an occurrence of a refrigerant leakage in the casing 400. Yet, it might also be an option to arrange the first opening 420 closer to the bottom part of the casing 400 while arranging the second opening 430 closer to the top part of the casing 400 such that refrigerant accumulated at the bottom can be effectively discharged. In any cases, the arrangement of the first opening 420 and the second opening 430 is not limited to the above.

The damper 440 is directly attached to the first opening 420. Alternatively, the damper 440 may be arranged away from the first opening 420 inside or outside the casing 400, and connected to the first opening 420 via a duct. The damper 440 is configured to block air to pass through the first opening 420 when the damper 440 is closed and allow air to pass through the first opening 420 when the damper 440 is open. More specifically, the damper 440 includes a flap 441, and an electric motor (not shown) for moving the flap to switch between a closed position in which the flap closes off the first opening 420 and an open position in which the flap does not close off the first opening 420. The motor is controlled by the unit controller 600 as explained later. As shown in FIG. 2. the damper 440 may be a normally closed damper which is closed during a normal operation of the air conditioning system 100, i.e. when no refrigerant leakage has occurred.

The second opening 430 is configured to allow air to pass therethrough between the internal space 401 and an external space outside the casing 400. As explained later, a duct is connected to second opening 430 on the outside of the casing 400. The second opening 430 may be provided with a damper which is controlled to move synchronously with the damper 440 of the first opening 420.

It is also preferable that the casing 400 has a maintenance door configured to allow a monitoring/maintenance person to check the states of the multi branch selector 300, the refrigerant leakage detector 500, and the unit controller 600, and/or repair them through the opened door, as necessary.

Insulators 450 are applied to the casing 400 such that the internal space 401 of the casing 400 is substantially isolated from the external space outside the casing 400 at the parts other than the first opening 420 and the second opening 430. The insulators 450 may include tubular insulators fitted into the gaps between outer surfaces of the extending pipes of the multi branch selector 300 and inner edges of the pipe apertures 410, respectively. Each insulator 450 may be a foam tube, a foam wrap, a foam filler, a caulk, a tape, or the like. The foam tube with a cut line extending in its axis direction is easy to fit into the gap. The thickness of the foam tube is preferably equal to or slightly greater than the clearance between the outer surface of the corresponding extending pipe and the inner surface of the corresponding pipe aperture 410. The insulators 450 may be attached to the extending pipes before assembling the casing 400.

The insulators 450 may also be applied to other gaps in the casing 400, such as the gap between the flap 441 in the closed position and a housing of the damper 440, the gap between the housing of the damper 440 and edges of first opening 420, and the gap between the maintenance door and a door frame of the casing 400.

The refrigerant leakage detector 500 is configured to detect an occurrence of a refrigerant leakage in the internal space 401 of the corresponding casing 400. The refrigerant leakage detector 500 is configured to detect a concentration of the refrigerant in an air surrounding the refrigerant leakage detector 500, and continuously or regularly output a detector signal indicating a detection value Vs which corresponds to the detected concentration to the unit controller 600. The refrigerant leakage detector 500 may be a semiconductor gas sensor reactive to the refrigerant used in the air conditioning system 100. In a case where refrigerant which is heavier than atmospheric air, such as R32 refrigerant, the refrigerant leakage detector 500 is preferably disposed in the internal space 401 at or close to an inner bottom surface of the casing 400.

As mentioned later, it is determined by the unit controller 600 whether a refrigerant leakage in the corresponding casing 400 (hereinafter referred to as "the refrigerant leakage") has occurred based on the detection value Vs of the refrigerant leakage detector 500. Thus, the detection value Vs is detection result information indicating whether the refrigerant leakage in the corresponding valve unit 200 has occurred.

The unit controller 600 is configured to control operation of the valve unit 200 via wired communication paths and/or wireless communication paths (partially not shown) between the unit controller 600 and the machineries in the valve unit 200. In particular, the unit controller 600 is configured to receive the detector signal from the refrigerant leakage detector 500 and determine whether the refrigerant leakage has occurred based on the detector signal. When it is determined that the refrigerant leakage has occurred, the unit controller 600 is configured to output a leakage signal to a later-mentioned central controller. A leakage signal indicates a unit ID (identification) of the valve unit 200 in which the leakage detector 500 is disposed, and indicates that the refrigerant leakage has occurred in the valve unit 200 of the unit ID indicated by the leakage signal. In other words, a leakage signal is detection result information indicating whether the refrigerant leakage in the corresponding valve unit 200 has occurred.

The unit controller 600 is also configured to receive a later mentioned damper open command from the central controller. When the unit controller 600 has received the damper open command designating the unit ID of the valve unit 200 to which the unit controller 600 belongs to, control the damper 440 to open.

The unit controller 600 may be further configured to switch the open/closed state of each of the low-pressure gas control valves 361 and high-pressure gas control valves 362, and/or control the opening degree of each of the expansion mechanisms 363 (see FIG. 2) such that desired cooling/heating operation can be performed in each of the utilization-side units 120 (see FIG. 1).

For instance, for the utilization-side unit 120 which should perform cooling operation, the corresponding low-pressure gas control valve 361 is opened and the corresponding high-pressure gas control valve 362 and expansion mechanism 363 are closed. For the utilization-side unit 120 which should perform heating operation, the corresponding high-pressure gas control valve 362 and expansion mechanism 363 are opened and the corresponding low-pressure gas control valve 361 is closed. The unit controller 600 may perform such an operation based on signals which indicate the desired operation modes of the corresponding utilization-side units 120. Such signals may be sent from the heatsource-side unit 110, the corresponding utilization-side units 120, and/or an information output device (not shown) used by the monitoring/maintenance person.

The unit controller 600 may be separated into a first controller having the functions for controlling the multi branch selector 300 and a second controller having the functions for determining the refrigerant leakage, controlling the damper 440. In this case, it is also preferable that the first and second controllers have different electricity sources.

The unit controller 600 includes an arithmetic circuit such as a CPU (Central Processing Unit), a work memory used by the CPU such as a RAM (Random Access Memory), and a recording medium storing control programs and information used by the CPU such as a ROM (Read Only Memory), although they are not shown. The unit controller 600 is configured to perform information processing and signal processing by the CPU executing the control programs to control the operation of the valve unit 200.

The casing 400, the first opening 420, the second opening 430, the damper 440, the insulators 450, the refrigerant leakage detector 500, and the unit controller 600 are part of the safety system of the air conditioning system 100.

(Configuration of Safety System)

FIG. 3 is a schematic configuration diagram of the safety system according to the first embodiment.

As shown in FIG. 3, the safety system 700 of the air conditioning system 100 according to the first embodiment comprises the first to third valve units 200_1, 200_2, 200_3, first to third individual ducts 710_1 to 710_3, a shared duct 720, a ventilator 730, and a central controller 800. The first to third valve units 200_1, 200_2, 200_3 have the first to third internal spaces 401_1, 401_2, 401_3 of the first to third casings 400_1, 400_2, 400_3, respectively. Here, the multi branch selectors 300 of the first to third valve units 200_1, 200_2, 200_3 (see FIG. 2) are omitted.

The first to third individual ducts 710_1 to 710_3 correspond to the first to third valve units 200_1, 200_2, 200_3, respectively. The first to third individual ducts 710_1 to 710_3 have a substantially same configuration with respect to the corresponding individual duct 710. Thus, in the following descriptions, the term "the individual duct 710" means any one of the first to third individual ducts 710_1 to 710_3. The individual duct 710 is connected to the second opening 430 of the casing 400 of the corresponding valve unit 200 at one end of the individual duct 710. The individual duct 710 is further connected to the shared duct 720 at another end of the individual duct 710. In other words, the first to third individual ducts 710_1 to 710_3 are connected to the shared duct 720 in common.

The ventilator 730 is disposed to the shared duct 720 at or close to one end (hereinafter referred to as "the second end") of the shared duct 720, and configured to draw air in the shared duct 720 towards the second end. It is preferable that the second end of the shared duct 720 is open to an outdoor space. It is also preferable that the ventilator 730 is disposed at the second end as shown in FIG. 3. The operation of the ventilator 730 is controlled by the central controller 800. For instance, the ventilator 730 starts operating when the ventilator 730 has received a ventilator start command from the central controller 800. The ventilator 730 may be a fan. The ventilator 730 may be provided with a check air damper which is configured to prevent an air from passing through the ventilator 730 when the ventilator 730 is not in operation.

The shared duct 720 is connected to the first to third individual ducts 710_1 to 710_3 on a side of another end (hereinafter referred to "the first end") of the shared duct 720 with respect to the ventilator 730. Thus, the whole structure of the first to third individual ducts 710_1 to 710_3 and the shared duct 720 forms a branching duct. Any one of the branching parts of this structure may be deemed as the first end of the shared duct 720. For instance, the part between the point branching towards the first valve unit 200_1 and the point branching towards the second valve unit 200_2 may be deemed as any one of a part of the shared duct 720, a part of second individual duct 710_2, and a part of third individual duct 710_3.

Hence, the first to third individual ducts 710_1 to 710_3 form a connection structure which connects the first to third internal spaces 401_1, 401_2, 401_3 via the first to third second openings 430_1, 430_2, 430_3, respectively. As for the first openings 420, an extension duct may be connected to each of all or part of the first openings 420 on the outer side of the corresponding casing 400.

When any one of the first to third dampers 440_1, 440_2, 440_3 is open, an air path AP can be formed that extends from an external space outside the corresponding casing 400 to the ventilator 730. This air path AP passes through the first opening 420 with the damper 440 open, the corresponding internal space 401, second opening 430 and individual duct 710, and the shared duct 720. If the ventilator 730 operates in this state, the air in the internal space 401 of the casing 400 with the damper 440 open is discharged by the suction force of the ventilator 730. Meanwhile, as for the casing 400 with the damper 440 closed, the above air path AP is not formed. Thus, even if the ventilator 730 operates, the air in the internal space 401 of the casing 400 with the damper 440 closed is not discharged by the suction force of the ventilator 730. FIG. 3 depicts a situation where only the first damper 440_1 is open.

Hence, the shared duct 720 and the ventilator 730 form a discharge structure which is connected to the connection structure mentioned above and configured to discharge air from the internal space 401 of the casing 400 with the damper 440 open.

The central controller 800 is disposed in the heatsource-side unit 110 (see FIG. 1), for instance. The central controller 800 may be a part of a system controller (not shown) for controlling an air conditioning operation of the air conditioning system 100.

The central controller 800 is connected to the first to third unit controllers 600_1, 600_2, 600_3 and the ventilator 730 via a communication path 801. The communication path 801 may serially connect the first to third unit controllers 600_1, 600_2, 600_3 and the ventilator 730 to the central controller 800 as shown in FIG. 3 by means of a wired and/or wireless communication.

When a refrigerant leakage has occurred in any one of the first to third valve units 200_1, 200_2, 200_3, the central controller 800 is configured to control the ventilator 730 to start operating (turn ON). Moreover, the central controller 800 is configured to, in cooperation with the first to third unit controllers 600_1, 600_2, 600_3, identify in which of the first to third valve units 200_1, 200_2, 200_3 the refrigerant leakage has occurred, and control the first to third dampers 440_1, 440_2, 440_3. More specifically, the central controller 800 is configured to control the first to third dampers 440_1, 440_2, 440_3 such that, when the ventilator 730 operates due to the occurrence of the refrigerant leakage, the damper 440 of the valve unit 200 of refrigerant leakage is open while the other dampers 440 are closed. Thereby, the discharge structure mentioned above can discharge air from the internal space 401 of the casing 400 with refrigerant leakage.

The central controller 800 includes an arithmetic circuit such as a CPU, a work memory used by the CPU such as a RAM, and a recording medium storing control programs and information used by the CPU such as a ROM, although they are not shown. The central controller 800 is configured to perform information processing and signal processing by the CPU executing the control programs to control at least the operation of the safety system of the air conditioning system 100.

(Operation of Unit Controller)

The unit controller 600 is configured to detect an occurrence of a refrigerant leakage in the corresponding casing 400. The unit controller 600 is further configured to, when the refrigerant leakage has occurred, inform of the detection result to the central controller 800 and control the corresponding damper 440 to open which is normally closed under control of the central controller 800. More specifically, the unit controller 600 is configured to perform the following operation.

FIG. 4 is a flow chart indicating an operation performed by the unit controller 600.

In step S1010, the unit controller 600 acquires the detection value Vs from the detector signal outputted from the refrigerant leakage detector 500. The unit controller 600 may passively receive the detector signal which is continuously or regularly outputted from the refrigerant leakage detector 500, or actively request the refrigerant leakage detector 500 to output the detector signal regularly. The obtained detection value Vs basically reflects the variation in the concentration of the refrigerant in the casing 400.

In step S1020, the unit controller 600 compares the detection value Vs acquired and a detection value threshold Vth, and determines whether the detection value Vs is less than the detection value threshold Vth. The unit controller 600 may obtain a moving average value of the detection values Vs in a certain time length to use the moving average value as the detection value Vs which is compared with the detection value threshold Vth.

The detection value threshold Vth is stored in the unit controller 600 in advance. The detection value threshold Vth may be a value determined by experiments or the like such that false detections and detection omissions of refrigerant leakages are avoided as much as possible. It is preferable that the detection value threshold Vth is set to a value less than a value corresponding to 25% of the Lower Flammability Limit (LFL) of the refrigerant used.

If the detection value Vs is equal to or greater than the detection value threshold Vth (S1020: No), the unit controller 600 proceeds to later-mentioned step S1030. If the detection value Vs is less than the detection value threshold Vth (S1020: Yes), the unit controller 600 proceeds to later-mentioned step S1040. It can be said that the refrigerant leakage detectors 500 transmits detection result information to the central controller 800 via the corresponding unit controller 600 by steps from S1010 to S1030.

In step S1030, the unit controller 600 transmits to the central controller 800 a leakage signal indicating the unit ID of the valve unit 200 to which the unit controller 600 belongs (hereinafter referred to as "the own unit ID"). The unit controller 600 may directly send a leakage signal to the central controller 800 or indirectly send a leakage signal to the central controller 800 via one or more of other unit controllers 600. In the latter case, the unit controllers 600 sends the leakage signal to the other unit controller 600, and the leakage signal is relayed in series by the unit controllers 600. For instance, when the communication path 801 is arranged as shown in FIG. 3, the unit controller 600_3 of the third valve unit 200_3 directly sends a leakage signal to the central controller 800, and the unit controller 600_2 of the second valve unit 200_2 sends a leakage signal to the central controller 800 via the unit controller 600_3 of the third valve unit 200_3.

The unit controller 600 may determine the controller to which the leakage signal should be sent based on network information regarding the communication path between the unit control 600 and the central controller 800. The network information may be stored in the unit controller 600 in advance, or acquired by making an inquiry to the other unit controller or controllers 600 and/or the central controller 800.

In step S1040, the unit controller 600 determines whether a leakage signal has been received at the unit controller 600 that was transmitted from the other unit controller 600. If a leakage signal has been received (S1040: Yes), the unit controller 600 proceeds to step S1050. If a leakage signal has not been received (S1040: No), the unit controller 600 proceeds to later-mentioned step S1060.

In step S1050, the unit controller 600 forwards the received leakage signal towards the central controller 800. The unit controller 600 may directly send the received leakage signal to the central controller 800 or indirectly send the received leakage signal to the central controller 800 via one or more of other unit controllers 600. The unit controller 600 may determine the controller to which the received leakage signal should be sent based on the network information mentioned above.

In step S1060, the unit controller 600 determines whether a ventilator start command has been received at the unit controller 600. As mentioned later, a ventilator start command is a command transmitted from the central controller 800. If a ventilator start command has been received (S1060: Yes), the unit controller 600 proceeds to step S1070. If a ventilator start command has not been received (S1060: No), the unit controller 600 proceeds to later-mentioned step S1080.

In step S1070, the unit controller 600 forwards the received ventilator start command towards the ventilator 730. The unit controller 600 may directly send the received ventilator start command to the ventilator 730 or indirectly send the received ventilator start command to the ventilator 730 via one or more of other unit controllers 600. The unit controller 600 may determine the unit controller 600 to which the ventilator start command should be sent based on the network information mentioned above.

In step S1080, the unit controller 600 determines whether a damper open command has been received at the unit controller 600 that was transmitted from the central controller 800. If a damper open command has been received (S1080: Yes), the unit controller 600 proceeds to step S1090. If a damper open command has not been received (S1080: No), the unit controller 600 proceeds to later-mentioned step S1110.

In step S1090, the unit controller 600 further determines whether the received damper open command designates the valve unit 200 to which the unit controller 600 belongs (hereinafter referred to as "the own valve unit") as the valve unit 200 which should open its damper 440. The unit controller 600 may make this determination based on whether the received damper open command designates the own unit ID. If the damper open command does not designate the own valve unit (S1090: No), the unit controller 600 proceeds to step S1100. If the damper open command designates the own valve unit (S1090: Yes), the unit controller 600 proceeds to later-mentioned step S1120.

In step S1100, the unit controller 600 forwards the received damper open command towards the other unit controller 600 which has not received the damper open command. The unit controller 600 may determine the unit controller 600 to which the received damper open command should be sent based on the network information mentioned above.

In step S1110, the unit controller 600 determines whether termination of operation has been designated. The designation may be made by a user operation, another device, or the unit controller 600 itself. If termination of the operation has not been designated (S1110: No), the unit controller 600 goes back to step S1010 to repeat the above acquisition and determination steps. If termination of the operation has been designated (S1110: Yes), the unit controller 600 terminates its operation.

In step S1120, the unit controller 600 controls the damper 440 of the own valve unit 200 to open, and then terminates its operation. For instance, the unit controller 600 controls the state of the damper 440 by controlling a supply of electricity thereto. The unit controller 600 may output alarm information by means of a sound, a light, a visual image, and/or a communication signal from a loudspeaker, an electric light, a display device, and/or a communication interface provided to the unit controller 600.

Steps S1040 and S1050 may be performed before steps S1010 to S1030. Steps S1080 to S1100 may also be performed before steps S1040 and S1050.

By the above operation, when a refrigerant leakage has occurred in the own valve unit 200, each of the unit controllers 600 can report to the central controller 800 the occurrence of the refrigerant leakage, and control the damper 440 of the own valve unit 200 to open when it has been instructed by the central controller 800.

(Operation of Central Controller)

The central controller 800 is configured to control the ventilator 730 to start operating when an occurrence of the refrigerant leakage in any one of the valve units 200 has been reported. The central controller 800 is further configured to control the damper 440 in the valve unit 200 of refrigerant leakage to open by instructing that to the corresponding unit controller 600. More specifically, the central controller 800 is configured to perform the following operation.

FIG. 5 is a flow chart indicating an operation performed by the central controller 800.

In step S2010, the central controller 800 determines whether a leakage signal has been received at the central controller 800 that was transmitted from one of the unit controllers 600. This leakage signal is a signal originated from the unit controller 600 in the step S1030 of FIG. 4. If a leakage signal has been received (S2010: Yes), the central controller 800 proceeds to later-mentioned step S2030. If a leakage signal has not been received (S2010: No), the central controller 800 proceeds to later-mentioned step S2020.

In step S2020, the central controller 800 determines whether termination of operation has been designated. The designation may be made by a user operation, another device, or the central controller 800 itself. If termination of the operation has not been designated (S2020: No), the central controller 800 goes back to step S2010 to repeat the above determination step. If termination of the operation has been designated (S2020: Yes), the central controller 800 terminates its operation.

In step S2030, the central controller 800 obtains the unit ID indicated by the received leakage signal from the leakage signal. This unit ID indicates the originator of the leakage signal, i.e. the valve unit 200 of refrigerant leakage. Thereby, the central controller 800 can identify the valve unit 200 of refrigerant leakage.

In step S2040, the central controller 800 transmits a ventilator start command to the ventilator 730 to control the ventilator 730 to start operating. The ventilator start command may be directly sent to the ventilator 730 or relayed to it by the unit controller or controllers 600. For instance, the central controller 800 controls the operation of the ventilator 730 by controlling a supply of electricity thereto.

In step S2050, the central controller 800 transmits, to at least the originator of the received leakage signal, a damper open command designating the originator as the valve unit 200 which should open its damper 440. The central controller 800 may make this designation by using the unit ID of the originator. The damper open command may be directly sent to the unit controller 600 of the valve unit 200 of refrigerant leakage or relayed to it in series by the unit controller or controllers 600. Then, the central controller 800 terminates its operation. It can be said that the central controller 800 transmits the damper open command to the damper 440 of the valve unit 200 of refrigerant leakage via the corresponding unit controllers 600 by step S2050 and step S1120 of FIG. 4.

The central controller 800 may output alarm information by means of a sound, a light, a visual image, and/or a communication signal from a loudspeaker, an electric light, a display device, and/or a communication interface provided to the central controller 800. In this case, it is preferable that the alarm information indicates the valve unit 200 of refrigerant leakage by outputting the unit ID of the valve unit 200 of refrigerant leakage or other information from which the valve unit 200 of refrigerant leakage can be identified, e.g. information indicating the location of the valve unit 200.

Step S2040 may be performed before step S2030, and step S2050 may also be performed before step S2040. Yet, it is preferable to start operation of the ventilator 730 before opening the corresponding damper 440. The central controller 800 may control the timing of transmission of the damper open command such that the corresponding damper 440 opens only when the performance of the ventilator 730 has reached a level high enough to prevent the internal air in the corresponding casing 400 from outflowing through the first opening 420 even if the damper 440 is opened.

By the above operation, when a refrigerant leakage in any one of the valve units 200 has occurred, the central controller 800 can control the ventilator 730 to start operating and control the damper 440 in the valve unit 200 of refrigerant leakage to open in cooperation with the unit controllers 600.

Advantageous Effect of First Embodiment

As described above, the air conditioning system 100 according to the first embodiment includes a plurality of the multi branch selectors 300 and has the safety system 700. The safety system 700 includes a plurality of the casings 400 accommodating the multi branch selectors 300, respectively, and each provided with the refrigerant leakage detector 500. The safety system 700 also includes a plurality of individual ducts 710 which function as the connection structure connecting the internal spaces 401 of the casings 400 via the second openings 430 thereof. The safety system 700 further includes the shared duct 720 and the ventilator 730 as the discharge structure connected to the connection structure. The discharge structure is configured to, when an occurrence of the refrigerant leakage has been detected, configured to discharge air from the internal space 401 of the casing 400 in which the refrigerant leakage has occurred.

Thereby, when a refrigerant leakage has occurred in any one of the multi branch selectors 300, the safety system 700 can properly and promptly detect this refrigerant leakage, and discharge the air in the casing 400 covering the multi branch selector to the external space to decrease the concentration of the leaked refrigerant in the internal space 401 of the casing 400. Thus, it is possible to improve safety of the air conditioning system 100 regarding refrigerant leakage in the multi branch selectors 300 which are arranged in separate locations. Moreover, the air in the other casing or casings 400 are not discharged. Hence, the air volume capacity required of the ventilator 730 can be decreased, and thereby the dimension of the ventilator 730 and/or the number of the ventilator 730 can be reduced.

Modifications of First Embodiment

In the first embodiment explained above, the unit controllers 600 are serially connected to the central controller 800. However, all or part of the unit controllers 600 may be individually connected to the central controller 800 via individual communication paths. Regarding the individually connected unit controller 600, the central controller 800 can distinguish the unit controller 600 from the other unit controller or controllers 600 by the individual communication path, and transmit the damper open command appropriately just by simply responding to the sender of the leakage signal.

In the first embodiment, a leakage signal indicates the unit ID of the valve unit 200 in which a refrigerant leakage has occurred. Yet, if the unit controller 600 is configured to record transmission of a leakage signal and identify a damper open command as a response to the transmitted leakage signal only when the damper open command has been received within a predetermined time of the transmission, a leakage signal need not necessarily indicate any unit ID. If the central controller 800 and the unit controllers 600 communicate with each other by using different timeslots allocated to the unit controllers 600, a leakage signal need not necessarily indicate any unit ID, either.

Alternatively, the unit controller 600 may control the damper 440 of the own valve unit 200 to open when the unit controller 600 has received detection result information indicating a refrigerant leakage in the own valve unit 200 has occurred. In this case, the central controller 800 need not transmit a damper open command to the unit controller 600. The unit controller 600 may control the damper 440 to open when a predetermined time has lapsed after transmitting the leakage signal, such that the damper 440 opens after the ventilator 730 started operating.

The connection route of the communication path 801 is not limited to the route shown FIG. 3. For instance, all or part of the unit controllers 600 and the ventilator 730 may be directly connected to the central controller 800 via individual wired/wireless communication paths.

Second Embodiment (Configuration of Safety System)
In the first embodiment of the present invention mentioned above, the internal spaces 401 of the casings 400 are connected to each other in parallel. On the other hand, in a second embodiment of the present invention explained hereinafter, the internal spaces 401 of the casings 400 are connected to each other in series.

A safety system according to the second embodiment may also be applied to an air conditioning system having the same configuration as the air conditioning system of the first embodiment. The configuration of each of the valve units of the safety system according to the second embodiment may be the same as that of the first embodiment. The same reference signs as the first embodiment are appended to elements and steps which are substantially the same as those of the first embodiment, and the explanations thereof are omitted.

FIG. 6 is a schematic configuration diagram of a safety system according to the second embodiment.

As shown in FIG. 6, the safety system 700a of the air conditioning system 100 (see FIG. 1) according to the second embodiment comprises the first to third valve units 200_1, 200_2, 200_3, first and second connecting ducts 740a_1, 740a_2, a shared duct 720a, the ventilator 730, and a central controller 800a. The safety system 700a does not have the individual ducts 710 of the first embodiment.

The first connecting duct 740a_1 is connected on one side to the second opening 430_2 of the casing 400_2 of the second valve unit 200_2, and connected on another side to the first opening 420_1 of the casing 400_1 of the first valve unit 200_1. The second connecting duct 740a_2 is connected on one side to the second opening 430_3 of the casing 400_3 of the third valve unit 200_3, and connected on another side to the first opening 420_2 of the casing 400_2 of the second valve unit 200_2.

Hence, the first and second connecting ducts 740a_1, 740a_2 form a connection structure which connects the first to third internal spaces 401_1, 401_2, 401_3 via the first openings 420_1, 420_2 and the second openings 430_2, 430_3.

To the second opening 430_1 of the casing 400_1 of the first valve unit 200_1, the shared duct 720a is connected. The ventilator 730 is disposed to the shared duct 720a at or close to one end (hereinafter referred to as "the second end") of the shared duct 720, and configured to draw air in the shared duct 720a towards the second end. It is preferable that the second end of the shared duct 720a is open to an outdoor space. It is also preferable that the ventilator 730 is disposed at the second end as shown in FIG. 6. The static pressure capacity of the ventilator 730 of the second embodiment may be different from the ventilator 730 of the first embodiment. To the first opening 420_3 of the third valve unit 200_3, which is the first opening 420 farthest from the ventilator 730 along the air path AP extending over the casings 400 and leading to the ventilator 730, an extension duct may be connected on the outer side of the corresponding casing 400_3.

Hence, the shared duct 720a and the ventilator 730 form a discharge structure which is connected to the connection structure mentioned above and configured to discharge air from the internal spaces 401 of the casings 400 when all the dampers 440 are open.

The position, the connection to the other elements, and the physical configuration of the central controller 800a may be the same as those of the central controller 800 according to the first embodiment. Yet, the operation of the central controller 800a is slightly different from that of the central controller 800 of the first embodiment. The central controller 800a is configured to control the dampers 440 of all the valve units 200 to be open when the ventilator 730 operates due to an occurrence of the refrigerant leakage.

(Operation of Central Controller)

When an occurrence of the refrigerant leakage in any one of the valve units 200 has been reported, the central controller 800a is configured to control the ventilator 730 to start operating similarly to the first embodiment. Meanwhile, the central controller 800a is configured to control the dampers 440 of all the valve units 200 to open.

FIG. 7 is a flow chart indicating an operation performed by the central controller 800a.

As shown in FIG. 7, the central controller 800a performs the same steps as steps S2010 to S2040 of FIG. 5. Yet, the central controller 800a perform step S2050a instead of step S2050 of FIG. 5.

In step S2050a, the central controller 800a transmits a damper open command to all the valve units 200. More specifically, the central controller 800a transmits a damper open command designating all the valve units 200 including the originator of the leakage signal and serially connected to this originator. The central controller 800a may make this designation by using the unit IDs of the valve units 200. Then, the central controller 800 terminates its operation. The central controller 800a may output alarm information and/or control the timing of transmission of the damper open command as mentioned in the first embodiment.

When all the first to third dampers 440_1, 440_2, 440_3 (see FIG. 6) are open, an air path AP can be formed that extends from an external space outside the casing 400_3 of the third valve unit 200_3 to the ventilator 730. This air path AP passes through the first opening 420_3, the internal space 401_3, and the second opening 430_3 of the third valve unit 200_3, the second connecting duct 740a_2, the first opening 420_2, the internal space 401_2, and the second opening 430_2 of the second valve unit 200_2, the first connecting duct 740a_1, the first opening 420_1, the internal space 401_1, and the second opening 430_1 of the first valve unit 200_1, and the shared duct 720a. If the ventilator 730 operates in this state, the air in the internal spaces 401 of the casings 400 of the first to third valve units 200_1, 200_2, 200_3 are discharged by the suction force of the ventilator 730.

Advantageous Effect of Second Embodiment

Accordingly, the air conditioning system 100 according to the second embodiment includes a plurality of the multi branch selectors 300 and has the safety system 700a. The safety system 700a includes a plurality of the casings 400 accommodating the multi branch selectors 300, respectively, and each provided with the refrigerant leakage detector 500. The safety system 700a also includes a plurality of connecting ducts 740a which function as the connection structure connecting the internal spaces 401 of the casings 400 via the first openings 420 and second openings 430 thereof. The safety system 700a further includes the shared duct 720a and the ventilator 730 as the discharge structure connected to the connection structure. The discharge structure is configured to, when an occurrence of the refrigerant leakage has been detected, discharge air from the internal spaces 401 of all the casings 400 including the casing 400 in which the refrigerant leakage has occurred.

Thereby, when a refrigerant leakage has occurred in any one of the multi branch selectors 300, the safety system 700a can properly and promptly detect this refrigerant leakage, and discharge the air in the casing 400 covering the multi branch selector 300 to the external space to decrease the concentration of the leaked refrigerant in the internal space 401 of the casing 400. Thus, it is possible to improve safety of the air conditioning system regarding refrigerant leakage from valves in the multi branch selectors 300 which are arranged in separate locations. Moreover, it is possible to reduce the total length of ducts for connecting the casings 400 to the ventilator 730 compared with the configuration of the first embodiment, and thereby reduce the installation cost of the system.

Modifications of Second Embodiment

In the second embodiment explained above, the ventilator 730 is connected to one of the casings 400 via the shared duct 720a. Yet, the shared duct 720a with short length and the ventilator 730 may be integrated as a single element. If one of the casings has a part exposed to the outdoor space, such a single element may be disposed in this part.

In the second embodiment, a leakage signal indicates the originator of leakage signal by the unit ID of the valve unit 200 in which a refrigerant leakage has occurred, and the central controller 800a identifies the valve unit 200 of refrigerant leakage. Yet, a leakage signal need not necessarily indicate the originator of leakage signal much less the unit ID, and the central controller 800a need not necessarily identify the valve unit 200 of refrigerant leakage.

The connection route of the communication path 801 is not limited to the route shown FIG. 6. For instance, all or part of the unit controllers 600 and the ventilator 730 may be directly connected to the central controller 800a via individual wired/wireless communication paths.

Third Embodiment

As a third embodiment of the present invention, a configuration is explained in which the configurations according to the first and second embodiments are combined. A safety system according to the third embodiment may be applied to an air conditioning system having the same configuration as the air conditioning systems of the first and second embodiments. The configuration of each of valve units of the safety system according to the third embodiment may be the same as that of the first and second embodiments. The same reference signs as the first and second embodiments are used to elements and steps which are substantially the same as those of the first and second embodiments, and the explanations thereof are omitted.

FIG. 8 is a schematic configuration diagram of the safety system according to the third embodiment.

As shown in FIG. 8, the safety system 700b of the air conditioning system 100 (see FIG. 1) according to the third embodiment comprises the first to third valve units 200_1, 200_2, 200_3, the first and second individual ducts 710_1, 710_2, the second connecting duct 740a_2, a shared duct 720b, the ventilator 730, and a central controller 800b. The safety system 700b does not have the third individual duct 710_3 of the first embodiment and the first connecting duct 740a_1 of the second embodiment.

The first individual duct 710_1 connects the second opening 430_1 of the casing 400_1 of the first valve unit 200_1 to the shared duct 720b. The second individual duct 710_2 connects the second opening 430_2 of the casing 400_2 of the second valve unit 200_2 to the shared duct 720b. The second connecting duct 740a_2 connects the second opening 430_3 of the casing 400_3 of the third valve unit 200_3 to the first opening 420_2 of the casing 400_2 of the second valve unit 200_2.

Hence, the first and second individual ducts 710_1, 710_2 and the second connecting duct 740a_2 form a connection structure which connects the first to third internal spaces 401_1, 401_2, 401_3 via the first opening 420_2 and the second openings 430_1, 430_2, 430_3.

The ventilator 730 is disposed to the shared duct 720b at or close to one end (hereinafter referred to as "the second end") of the shared duct 720b, and configured to draw air in the shared duct 720b towards the second end. It is preferable that the ventilator 730 is disposed at the second end as shown in FIG. 8. The static pressure capacity of the ventilator 730 may be different from the ventilators 730 according to the first and second embodiments.

Hence, the shared duct 720b and the ventilator 730 form a discharge structure which is connected to the connection structure mentioned above and configured to discharge air from the internal space 401_1 of the casing 400_1 of the first valve unit 200_1 when the damper 440_1 of the first valve unit 200_1 is open, and discharge air from the internal spaces 401_2, 401_3 of the casings 400_2, 400_3 of the second and third valve units 200_2, 200_3 when both the dampers 440_2, 440_3 of the second and third valve units 200_2, 200_3 are open.

The position, the connection to the other elements, and the physical configuration of the central controller 800b may be the same as those of the central controller 800 according to the first embodiment. The central controller 800b is also configured to perform basically the same operation as the central controller 800 according to the first embodiment. The central controller 800b controls the damper or dampers 440 of all or part of the valve units 200 to be open when the ventilator 730 operates due to an occurrence of the refrigerant leakage.

Yet, the operation of the central controller 800b is slightly different from that of the central controllers 800, 800a according to the first and second embodiments. The central controller 800b has a grouping table which defines the relationship between each of the valve units 200 and dampers 440 to be opened when a refrigerant leakage has occurred in the valve unit 200. The central controller 800b is configured to determine the valve unit 200 which should open its damper 440 based on the grouping table.

FIG. 9 is the grouping table used by the central controller 800b.

As shown in FIG. 9, the grouping table 910b associates a destination 912b of a damper open command with each of the valve units 200 as an originator 911b of a leakage signal with the valve unit or units 200. The destination 912b is the valve unit or units 200 in which the damper or dampers 440 should be opened when a refrigerant leakage has occurred in the valve unit 200 as the originator 911b.

In other words, the grouping table 910b indicates groups of the valve units 200. In the group including a plurality of the valve units 200, the internal spaces 401 of the casings 400 are connected to the ventilator 730 in series. Between the different groups, the internal spaces 401 of the casings 400 are connected to the ventilator 730 in parallel. The valve units 200 may be defined in the grouping table 910b by their unit IDs.

For instance, with the unit ID "U1" of the first valve unit 200_1 as the originator 911b, only the unit ID "U1" of the first valve unit 200_1 as the destination 912b is associated. With each of the unit IDs "U2" and "U3" of the second and third valve units 200_2, 200_3 as the originator 911b, the unit IDs "U2" and "U3" of the second and third valve units 200_2, 200_3 as the destination 912b are associated. The grouping table 910b is stored in the central controller 800b in advance. The central controller 800b may accept a manually setting of the grouping table 910b.

Yet, the structure of the grouping table 910b is not limited to that shown in FIG. 9. For instance, the grouping table 910b may simply define groups of the valve units 200 such that the valve units 200 connected to the ventilator 730 in series by the connection structure form a group. The single valve unit 200 to which no other valve unit 200 is connected in series with respect to the ventilator 730 by the connection structure may also form a group. Each group may be defined by using identifications of the unit controllers 600.

The central controller 800b performs substantially the same steps as steps S2010 to S2050 of FIG. 5. Yet, in step S2030 or S2050, the central controller 800b determines the valve unit 200 which should open its damper 440 based on the originator 911b of the received leakage signal and the grouping table 910b. Thus, when the refrigerant leakage has occurred in the first valve unit 200_1 for instance, the central controller 800b transmits a damper open command designating the first valve unit 200_1.

Thereby, as depicted in FIG. 8, only the damper 440_1 of the first valve unit 200_1 is opened to create an air path AP passing through the first opening 420_1, internal space 401_1, second opening 430_1 of the first valve unit 200_1, the first individual duct 710_1, and the shared duct 720b. The dampers 440_2, 440_3 of the second and third valve units 200_2, 200_3 are kept closed. Thus, the ventilator 730 draws air from the internal space 401_1 of the first valve unit 200_1, but not air from the internal spaces 401_2, 401_3 of the second and third valve units 200_2, 200_3.

Accordingly, the air conditioning system 100 according to the third embodiment includes the safety system 700b in which the casings 400 serially connected to each other are further connected to the other casing 400 in parallel. Even with such a connection structure with a complicated configuration, it is possible to discharge air from the internal space 401 of the casing 400 in which the refrigerant leakage has occurred, while reducing static pressure capacity required of the ventilator 730.

The modifications mentioned in the first and second embodiments may be applied to a safety system 700b according to the third embodiment. It should be noted that the grouping table 910b and the determination of the valve unit 200 to open its damper 440 based on the grouping table 910b mentioned above may also be applied to the first and second embodiments.

The connection route of the communication path 801 is not limited to the route shown FIG. 8. For instance, all or part of the unit controllers 600 and the ventilator 730 may be directly connected to the central controller 800b via individual wired/wireless communication paths.

Other patterns of combination of the configurations according to the first and second embodiments may also be considerable. For instance, to the first opening 420 of the first valve unit 200, the second openings 430_2, 430_3 of the second and third valve units 200_2, 200_3 may be connected in parallel by a branched duct. In such a configuration, the branched duct functions as both the individual ducts 710_2, 710_3 of the first embodiment and the connecting ducts 740a_1, 740a_2 of the second embodiment.

In any case, the central controller 800b is configured to open all the damper or dampers 440 existing on a line which extends from the ventilator 730, passes through the internal space 401 of the casing 400 with refrigerant leakage, and reaches the external space of the casing 400. It is preferable that the central controller 800b keeps the other damper or dampers closed.

Fourth Embodiment

As a fourth embodiment of the present invention, a configuration is explained in which there are a plurality of sets of the connection structure and the discharge structure. A safety system according to the fourth embodiment may be applied to an air conditioning system having the same configuration as the air conditioning systems of the first to third embodiments. The configuration of each of valve units of the safety system according to the fourth embodiment may be the same as that of the first to third embodiments. The same reference signs as the first to third embodiments are used to elements and steps which are substantially the same as those of the first to third embodiments, and the explanations thereof are omitted.

FIG. 10 is a schematic configuration diagram of the safety system according to the fourth embodiment.

As shown in FIG. 10, the safety system 700c of the air conditioning system 100 (see FIG. 1) according to the fourth embodiment comprises a first section 701c_1, a second section 701c_2, and a central controller 800c.

The first section 701c_1 includes the first and second valve units 200_1, 200_2, the first and second individual duct 710_1, 710_2, the first shared duct 720_1, and the first ventilator 730_1. Yet, the number of the valve units 200 in each section 701c is not limited to two, and may be one, three, or more. Similarly to the first embodiment, the first and second valve units 200_1, 200_2 are connected to each other in parallel and commonly connected to the first shared duct 720_1 via the first and second individual duct 710_1, 710_2. The unit controllers (not shown in FIG. 10, see FIG. 3) of the first and second valve units 200_1, 200_2 and the first ventilator 730_1 are connected to the central controller 800c by the communication path 801.

The second section 701c_2 includes the third and fourth valve units 200_3, 200_4, the connecting duct 740a, the second shared duct 720_2, and the second ventilator 730_2. Similarly to the second embodiment, the third and fourth valve units 200_3, 200_4 are connected to each other via the connecting duct 740a and connected to the second shared duct 720_2 in series. The unit controllers (not shown in FIG. 10, see FIG. 6) of the third and fourth valve units 200_3, 200_4 and the second ventilator 730_2 are connected to the central controller 800c by the communication path 801.

The position, the connection to the other elements, and the physical configuration of the central controller 800c may be the same as those of the central controller 800b according to the third embodiment. The central controller 800c is also configured to perform basically the same operation as the central controller 800b according to the third embodiment. The central controller 800c controls the damper or dampers 440 (not shown in FIG. 10, see FIGS. 3 and 6) of all or part of the valve units 200 to be open when the ventilator 730 operates due to an occurrence of the refrigerant leakage. The central controller 800c determines the valve unit 200 which should open its damper 440 based on the grouping table similarly to the central controller 800b of the third embodiment.

Yet, the central controller 800c uses a different type of a grouping table to further determine the ventilator which should start operating. More specifically, the central controller 800c is configured to control the ventilator of only the section in which a refrigerant leakage has occurred to start operating.

FIG. 11 is a grouping table used by the central controller 800c.

As shown in FIG. 11, the grouping table 910c associates, in addition to the destination or destinations 912b of a damper open command, a ventilator 913c which should operate with each of the valve units 200 as an originator 911b of a leakage signal. In other words, the grouping table 910c indicates the sections 701c. In each of the sections, the internal spaces 401 of the valve units 200 (not shown in FIG. 10, see FIG. 2) are connected to the same ventilator, but not connected to the ventilator of the other section. The ventilators may be defined in the grouping table 910c by their ventilator IDs.

For instance, with the unit ID "U1" of the first valve unit 200_1 as the originator 911b, the unit ID "U1" of the first valve unit 200_1 as the destination 912b and a ventilator ID "F1" of the first ventilator 730_1 as the ventilator 913c to operate are associated. With the unit ID "U2" of the second valve unit 200_2 as the originator 911b, the unit ID "U2" of the second valve unit 200_2 as the destination 912b and a ventilator ID "F1" of the first ventilator 730_1 as the ventilator 913c to operate are associated. With each of the unit ID "U3" of the third valve unit 200_3 and the unit ID "U4" of the fourth valve unit 200_4 as the originator 911b, the unit IDs "U3" and "U4" of the third and fourth valve units 200_3, 200_4 as the destination 912b and a ventilator ID "F2" of the second ventilator 730_2 as the ventilator 913c to operate are associated. The grouping table 910c is stored in the central controller 800c in advance. The central controller 800c may accept a manually setting of the grouping table 910c.

Yet, the structure of the grouping table 910c is not limited to that shown in FIG. 11. For instance, the grouping table 910c may simply define groups of the valve units 200 such that the valve units 200 connected to the same ventilator 730 in series by the connection structure form a group, and associates the group with the corresponding ventilator 730. The single valve unit 200 to which no other valve unit 200 is connected in series with respect to the ventilator 730 by the connection structure may also form a group. Each group may be defined by using identifications of the unit controllers 600.

The central controller 800c performs substantially the same steps as steps S2010 to S2050 of FIG. 5. Yet, the central controller 800c determines in step S2030 or S2040 the ventilator which should start operating based on the originator of the received leakage signal and the grouping table 910c, and determines in step S2030 or S2050 the valve unit or units 200 each of which should open its damper 440 based on the originator of the received leakage signal and the grouping table 910c.

Thus, when the refrigerant leakage has occurred in the first valve unit 200_1 for instance, the central controller 800c transmits a ventilator start command to the first ventilator 730_1 for starting its operation, and transmits a damper open command designating the first valve unit 200_1. As a result, only the first ventilator 730_1 among the ventilators operates, and the damper of only the first valve unit 200_1 among the valve units 200 opens. The ventilator start command may designate the ventilator ID of the ventilator which should start operating.

Accordingly, the air conditioning system 100 according to the fourth embodiment includes the safety system 700c which is sectioned into a plurality of sections 701c controlled by the common central controller 800c. The central controller 800c is configured to, when a refrigerant leakage in any one of the valve units 200 has occurred, control the ventilator of only the section 701c in which the refrigerant leakage has occurred to start operating, and control only the damper or dampers 440 which should be opened in order to discharge air from the valve unit 200 of refrigerant leakage. Thereby, the air discharge can be performed appropriately while reducing electricity consumption.

When the valves of the air conditioning system 100 are arranged in widely separated locations, extending ducts from all the valve units 200 to the same common ventilator would result in an increase in the total length of the ducts and static pressure capacity required of the ventilator. Moreover, there might be cases where it is difficult to draw a continuous ducting to cover all the valve units 200 due to limitations imposed by the installation place. In such a case, it is possible to dispose a plurality of the safety system. However, providing the central controller to each of the safety systems would be uneconomical. Hence, by the safety system 700c according to the fourth embodiment, it is possible to improve safety of the air conditioning system 100 regarding refrigerant leakage from valves at a low cost even if the valves are arranged in widely separated locations.

The connection route of the communication path 801 is not limited to the route shown FIG. 10. For instance, the third and fourth valve units 200_3, 200_4 and the second ventilator 730_2 of the second section 701c_2 may be connected to the central controller 800c by another communication path 801 independently from the first section 701c_1, or indirectly connected to the central controller 800c via the unit controller or controllers 600 of the first section 701c_1. All or part of the unit controllers 600 and the ventilators 730 may be directly connected to the central controller 800c via individual wired/wireless communication paths. The connection routes of the casings 400 of the valve units 200 by ducts are also not limited to the routes shown in FIG. 10.

Other Modifications of First to Fourth Embodiments

The above-mentioned configurations and operations of the safety systems 700, 700a, 700b, 700c may be modified in accordance with circumstances.

For instance, the valve unit 200 may have a configuration including the heatsource-side liquid pipe portion 310, the utilization-side liquid pipe portions 311, the low-pressure gas pipe portion 320, the low-pressure gas sub pipes 321, the high-pressure gas pipe portion 340, the high-pressure gas sub pipes 341, the utilization-side gas pipe portions 330, the low-pressure gas control valves 361, and the high-pressure gas control valves 362, but not including all or part of the sets of the bypass pipe 351, the refrigerant heat exchanger 352, and the expansion mechanism 363. All or part of the gas shut-off valves 365 may be further omitted.

Moreover, the air conditioning system 100 may have a heat pump system with a so-called two-pipe configuration. In such a case, the piping accommodated in the casing 400 would not be the multi branch selector 300. Yet, the valve unit 200 has at least a liquid refrigerant pipe portion, a gas refrigerant pipe portion, a liquid control valve disposed in the liquid refrigerant pipe portion, and a gas control valve disposed in the gas refrigerant pipe portion. Each of the liquid control valve and the gas control valve may be any type of valve for controlling flow of refrigerant in the corresponding pipe portion.

For instance, any one of the safety systems 700, 700a, 700b, 700c may include the valve unit 200d as shown in FIG. 12 instead of the valve unit 200 of FIG. 2. Compared with the configuration of FIG. 2, the valve unit 200d as a modification of the present embodiment does not necessarily have the high-pressure gas pipe portion 340, the low-pressure gas sub pipes 321, the high-pressure gas sub pipes 341, the bypass pipes 351, the refrigerant heat exchangers 352, the low-pressure gas control valves 361, the high-pressure gas control valves 362, and the expansion mechanisms 363.

Furthermore, any one of the above-mentioned valve units may have a configuration in which the heatsource-side liquid pipe portion 310 and the gas pipe portion or portions 320, 340 are not branched towards two or more of the utilization-side units 120 of the air conditioning system 100 but directed towards only one among the utilization-side units 120. Even in such configurations, each valve disposed in the refrigerant pipe portions within the casing 400 would be a leakage point of refrigerant, and thus the safety regarding refrigerant leakage should be improved.

The casing 400 of any one of the above embodiments and modifications may comprise a plurality of casing parts which are attachable to and detachable from each other. In this case, the casing parts may be structured such that each of the pipe apertures 410 is formed between two or more of the adjoining casing parts. Thereby, each extending pipe can easily be fitted into the corresponding pipe aperture 410 when the casing parts are assembled.

The method for assembling the safety system 700/700a/700b/700c may include steps of: arranging, for each of the valve units 200/200d, the corresponding casing parts around at least the liquid control valve and the gas control valve of the valve units 200/200d; fixing, for each of the valve units 200/200d, the corresponding casing parts to each other; disposing, for each of the valve units 200/200d, the refrigerant leakage detector 500; arranging the connection structure so as to connect the internal spaces 401 of the casings 400; and connecting the discharge structure to the connection structure or one of the casings 400. Thereby, the casing 400 can be retrofitted to existing valves of a heat pump system. The insulators 450 may also be applied to the gap between the adjoining casing parts.

The unit controller 600 of each valve unit 200 may have further functions. For instance, the unit controller 600 may be further configured to, when a refrigerant leakage in any of the utilization-side piping sections has occurred, control the liquid shut-off valve 364 and the gas shut-off valve 365 (see FIG. 2) defining the utilization-side piping section to close. Thereby, the utilization-side piping section can be zoned from other parts of the heat pump circuit. Alternatively, or in addition to this, when a refrigerant leakage has been detected in any one of the valve units 200, the unit controller 600 may shut-down the air conditioning system 100 by, for instance, stopping the operation of the compressor in the heatsource-side unit and the operations of the utilization-side units 120. Thereby, it is possible to prevent as much as possible the refrigerant from leaking out further.

The position, the orientation, and the number of the ventilator 730 are not limited to those according to the first to fourth embodiments. For instance, the ventilator 730 may be arranged so as to blow air towards the internal space 401 of the casing 400 in which a refrigerant leakage has occurred. Thereby, it is also possible to discharge the air containing refrigerant from the corresponding first opening 420 with the damper 440 open. In addition, an additional ventilator may be provided to the individual duct 710, the connecting duct 740a, and/or the shared duct 720, 720a between the ventilator 730 and any one of the internal spaces 401 to boost the suction force.

If refrigerant used is heavier than air and thus it is permissible to form the first opening 420 in the upper part of the casing 400, the damper 440 for the first opening 420 is not necessarily required. If the isolation of the internal space 401 of the casing 400 is sufficient without any specific insulators 450, such insulators 450 may be omitted.

All or part of the unit controller 600 may be separated from the corresponding valve unit 200. In this case, the valve unit 200 should have a communication interface such that the unit controller 600 can acquire the detection value Vs of the refrigerant leakage detector 500 and control the operation of the machineries of the valve unit 200 including the damper 440.

All or part of the unit controllers 600 may be integrated to the central controller 800/800a/800b/800c. For instance, the central controller 800/800a/800b/800c may compare the detection values Vs with the detection value threshold Vth. Conversely, all or part of the central controller 800/800a/800b/800c may be integrated to the unit controllers 600. For instance, each of the unit controller 600 may determine whether to open the damper 440 of the own valve unit 200.

If the discharge of the internal air is performed continuously or regularly, under the control of the unit controller 600 for instance, detection of the refrigerant leakage does not necessarily need to be performed, and thus the refrigerant leakage detector 500 is not required. In this case, the operations shown in FIGS. 4, 5, and 7 are not necessarily required. Moreover, if ventilation of the internal air via the connection structure is induced by natural convection or an air flow caused by an external mechanism, the ventilator 730 is not necessarily required.

(Positional Patterns of First and Second Openings)

As mentioned above, the outer shape of the casing of each valve unit is not limited to any specific shape, and the arrangement of the first and second openings in the casing is not limited to any specific arrangement. For instance, when the outer shape of the casing is a box shape and the first opening is formed in one of four lateral faces of the casing, the arrangement of the first and second openings are roughly sorted into four patterns.

FIGS. 13 to 16 are schematic configuration diagrams showing first to fourth patterns of the arrangement of the first and second openings with ducts connected thereto.

In the first pattern P1, the first opening 420 and the second opening 430 are formed in the two opposite lateral faces of the casing 400, respectively. In the second pattern P2, the first opening 420 and the second opening 430 are formed in the two adjacent lateral faces of the casing 400, respectively. In the third pattern P3, the first opening 420 is formed in one of the lateral faces of the casing 400 and the second opening 430 is formed in the top face of the casing 400. In the fourth pattern P4, the first opening 420 is formed in one of the lateral faces of the casing 400 and the second opening 430 is formed in the bottom face of the casing 400.

In the first and second patterns P1, P2, no shared duct 720a and no connecting duct 740a would protrude upward or downward from the casing 200. Thus, these patterns are advantageous to reduce height range of the arrangement space of the valve unit 200 and the ducts connected thereto. Moreover, in the first pattern P1, the connecting ducts 740a (or the connecting duct 740a and the shared duct 720a) are arranged in line. Thus, this pattern is further advantageous to reduce width of the arrangement space of the valve unit 200 and the ducts connected thereto.

Yet, it is noted that the arrangement of the first and second openings 420, 430 are not limited to the above four patterns. For instance, the first opening 420 may be formed in the top or bottom face of the casing 400.

Fifth Embodiment (Configuration of Air Conditioning System)

As a fifth embodiment of the present invention, a configuration is explained in which the first opening 420 and the second opening 430 are formed in the two opposite lateral faces of the casing 400 as the above-mentioned first pattern P1 shown in FIG. 13.

A safety system according to the fifth embodiment may be similar to the safety system 700a according to the second embodiment. Meanwhile, its piping configuration is different from that of the second embodiment. The configuration of the safety system is also slightly different from that of the second embodiment. These differences are explained hereinafter, and the other configurations are the same as the second embodiment unless otherwise indicated. The same reference signs as the second embodiment are appended to elements which are substantially the same as those of the second embodiment, and the explanations thereof are omitted.

FIG. 17 is a schematic configuration diagram of an air conditioning system according to the fifth embodiment.

As shown in FIG. 17, the air conditioning system 100e according to the fifth embodiment comprises, as with the second embodiment, the heatsource-side unit 110, the utilization-side units 120 connected to the heatsource-side unit 110 via refrigerant pipes, and first to third valve units 200e_1, 200e_2, 200e_3 for the first to third unit families 121_1, 121_2, 120_3 of the utilization-side units 120. Yet, differently from the second embodiment, pipings of the first to third valve units 200e_1, 200e_2, 200e_3 are serially connected in this order. It is noted that the number of the valve units 200e is not limited to three.

Each of the valve units 200e has a main liquid refrigerant pipe portion 381e from which the liquid refrigerant pipe portions 311 branch, a main low-pressure gas refrigerant pipe portion 382e from which the low-pressure gas sub pipe portions 321 branch, and a main high-pressure gas refrigerant pipe portion 383e from which the high-pressure gas sub pipe portions 341 branch. The main liquid refrigerant pipe portion 381e, the main low-pressure gas refrigerant pipe portion 382e, and main high-pressure gas refrigerant pipe portion 383e (hereinafter also collectively referred to as "the main pipe portions") correspond to the heatsource-side liquid pipe portion 310, the low-pressure gas sub pipe portion 320, and the high-pressure gas pipe portion 340 explained in the first embodiment, respectively. The main liquid refrigerant pipe portion 381e, the main low-pressure gas refrigerant pipe portion 382e, and the main high-pressure gas refrigerant pipe portion 383e of one of the valve units 200e (e.g. the third valve unit 200e_3) are connected to the liquid refrigerant pipe 131, the low-pressure gas refrigerant pipe 132, and the high-pressure gas refrigerant pipe 133, respectively.

The air conditioning system 100e further comprises at least one set of a liquid refrigerant connection pipe 161e, a low-pressure gas refrigerant connection pipe 162e, and a high-pressure gas connection pipe 163e (hereinafter also collectively referred to as "the connection pipes"). Between two of the valve units 200e, the liquid refrigerant connection pipe 161e connects the main liquid refrigerant pipe portions 381e, the low-pressure gas refrigerant connection pipe 162e connects the main low-pressure gas refrigerant pipe portions 382e, and the high-pressure gas connection pipe 163e connects the main high-pressure gas refrigerant pipe portions 383e. In other words, a set of the main pipe portions 381e, 382e, 383e of one of the valve units 200e and a set of the main pipe portions 381e, 382e, 383e of another one of the valve units 200e are connected by a set of the connection pipes 161e, 162e, 163e.

Such a pair of the valve units 200e directly connected by a set of the connection pipes 161e, 162e, 163e is preferably the adjacent valve units 200e which are directly connected by the connecting duct 740a, i.e. the first and second valve units 200e_1, 200e_2, or the second and third valve units 200e_2, 200e_3.

FIG. 18 is a schematic configuration diagram of the safety system 700e.

As with the second embodiment, the internal spaces 401_1, 401_2, 401_3 of first to third casings 400e_1, 400e_2, 400e_3 of the first to third valve units 200e_1, 200e_2, 200e_3 are serially connected in this order by the first and second connecting ducts 740a_1, 740a_2 via the first and second openings 420_1, 420_2, 430_2, 430_3. The shared duct 720a provided with the ventilator 730 is also connected to the second opening 430_1 of the first valve unit 200e_1. Yet, differently from the second embodiment, the first to third dampers 440_1, 440_2, 440_3 shown in FIG. 6 are not disposed. Instead, a damper unit 440e having a damper 440 is attached to the first opening 420_3 of the third valve unit 200e_3. The damper 440 of the damper unit 440e is connected to the controller 600_3 of the third valve unit 200e_3 by means of a wired and/or wireless communication.

The damper 440 may be a normally closed damper. The airs in all the casings 400e_1, 400e_2, 400e_3 become static when the damper 440 is closed and the ventilator 730 is stopped. Thus, it is possible to swiftly detect an occurrence of a refrigerant leakage in any of the casings 400e_1, 400e_2, 400e_3. The central controller 800a or the unit controller 600_3 of the third valve unit 200e_3, which is the farthest among the valve units 200e from the shared duct 720a, is configured to control the damper 440 to open when the ventilator 730 operates due to the occurrence of the refrigerant leakage in any of the casings 400e_1, 400e_2, 400e_3.

Some of the refrigerant leakage detectors 500_1, 500_2, 500_3, the unit controllers 600_1, 600_2, 600_3, and the central controller 800a may be omitted, if it is possible to detect an occurrence of a refrigerant leakage in any of the internal spaces 401_1, 401_2, 401_3, and start the ventilator 730 and open the damper 440 when the refrigerant leakage has been detected.

The first to third valve units 200e_1, 200e_2, 200e_3 may have the same configuration. Thus, in the following descriptions, the term "the valve unit 200e" means any one of the first to third valve units 200e_1, 200e_2, 200e_3.

(Configuration of Valve Unit)

FIG. 19 is a perspective view of the valve unit 200e.

As shown in FIG. 19, the casing 400e of the valve unit 200e has a substantially box shape (i.e. a cuboid shape). The casing 400e has a first lateral face 461e, a second lateral face 462e, a pipe outlet face 463e, a box-side face 464e, a top face 465e, and a bottom face 466e (not shown) that form six faces of a cuboid, respectively. The first and second lateral faces 461e, 462e face opposite directions, and substantially in parallel to each other. The pipe outlet face 463e and the box-side face 464e are also lateral faces facing opposite directions, and substantially in parallel to each other. The top face 465e and the bottom face 466e face opposite directions, and substantially in parallel to each other. Each of the pipe outlet face 463e, the box-side face 464e, the top face 465e, and the bottom face 466e is substantially perpendicular to each of the first and second lateral faces 461e, 462e.

The valve unit 200 may have four or more hanger elements 467e (partially not shown) for hanging the casing 400e to a part of a building structure, such as a bottom face of a ceiling slab of a building, by using metal hangers and bolts or the like. Preferably, two of the hanger elements 467e are fixed to the casing 400e on the first lateral face 461e and the rest of the hanger elements 467e are fixed to the casing 400e on the second lateral face 462e. The casing 400e is made of a plurality of plates including a top plate 468e forming the top face 465e and a bottom plate 469e which forms the bottom face 466e. The plurality of plates may be metal plates, carbon fibre plates, fire-retardant resin plates, or the like.

FIG. 20 is a perspective view of the valve unit 200e with the top plate 468e removed.

As shown in FIG. 20, the valve unit 200e includes a multi branch selector 300e. Although being basically the same as the multi branch selector 300 of the second embodiment (the same as the first embodiment, see FIG. 2), the multi branch selector 300e of this embodiment further includes the abovementioned main pipe portions 381e, 382e, 383e instead of the heatsource-side liquid pipe portion 310, the low-pressure gas sub pipe portion 320, and the high-pressure gas pipe portion 340.

Most part of the multi branch selector 300e is accommodated in the internal space 401 of the casing 400e. Yet, ends of some pipes protrude from the casing 400e outward. An end of the main liquid refrigerant pipe portion 381e, an end of the main low-pressure gas refrigerant pipe portion 382e, and an end of the main high-pressure gas refrigerant pipe portion 383e (partially not shown) protrude from the first lateral face 461e of the casing 400e. The other ends of these main pipe portions 381e, 382e, 383e protrude from the second lateral face 462e of the casing 400e. The ends of the utilization-side liquid pipe portions 311 and the utilization-side gas pipe portions 330 protrude from the pipe lateral face 463e of the casing 400e. It is preferable that each of these pipe ends is perpendicular to the lateral face of the casing 400e from which the pipe end protrudes.

The valve unit 200e further includes a switch box 601e accommodating the unit controller 600 therein. The switch box 601e forms the box-side face 464e of the casing 400e, and is disposed between the first lateral face 461e and the second lateral face 462e of the casing 400e. The multi branch selector 300e is disposed between the pipe lateral face 463e of the casing 400e and the switch box 601e. Hereinafter, the "internal space 401" means a space which is an internal space of the casing 400e but does not include a space occupied by the switch box 601e in use. The space occupied by the switch box 601e in use is referred to as "the box mounting space."

The first and second openings 420, 430 are positioned so as not to be blocked by the switch box 601e, and thus open to the internal space 401 of the casing 400e even when the switch box 601e is positioned at the box mounting space.

FIG. 21 is a top perspective view of the valve unit 200e with the top plate 468e removed.

The multibranch selector 300e is fixed to the casing 400e by so as to be stabilized with respect to the casing 400e. The casing 400e has a drain pan 470e beneath the multibranch selector 300e. The drain pan 470e is disposed on the bottom plate 469e of the casing 400e which forms a part of the bottom face 466e of the casing 400e. The switch box 601e has a box bottom plate 611e which forms the rest part of the bottom face 466e of the casing 400e. In other words, the bottom plate 469e and the box bottom plate 611e are flush with each other and form the bottom face 466e of the casing 400e. Yet, the box bottom plate 611e may be recessed with respect to the bottom plate 469e, or slightly protrude downward with respect to the bottom plate 469e.

The switch box 601e further has an outer side plate 612e which forms the box-side face 464e of the casing 400e, and an inner side plate 613e which is accommodated in the casing 400e. The outer side plate 612e is fixed to one of the edges of the box bottom plate 611e at a right angle and extends up to the top plate 468e (see FIGS. 19 and 20) of the casing 400e. The inner side plate 613e is fixed to another one of the edges of the box bottom plate 611e at a right angle and extends up to the top plate 468e (see FIGS. 19 and 20) of the casing 400e. The inner side plate 613e is in parallel to the outer side plate 612e, i.e. to the box-side face 464e of the casing 400e. The unit controller 600 is accommodated and fixed in a space 601e between the outer side plate 612e and the inner side plate 613e (hereinafter referred to as "the box internal space"). The inner side plate 613e sections the box internal space 602e of the switch box 601e from the internal space 401 of the casing 400e.

It is preferable that the valve unit 200e has an insulator 614e which covers most part of the inner side plate 613e on the side thereof facing the internal space 401 of the casing 400e (i.e. the side facing the multi branch selector 300e). The insulator 614e may be a heat insulating plate adhering to the inner side plate 613e. The casing 400e may have further insulators, such as heat insulating plates, which cover most part of the inner surface of the plates forming the first lateral face 461e, the second lateral face 462e, and the pipe outlet face 463e, and the top plate 468e. The drain pan 470e may also include an insulation layer such as a heat insulating plate.

When the switch box 601e is removed, the internal space 401 of the casing 400e becomes open to the outer space through the box mounting space. This box mounting space allows the monitoring/maintenance person to monitor, maintain, or repair the multi branch selector 300e. Thus, the casing 400e is configured such that the switch box 601e is detachably attached to the rest part of the valve unit 200e. More specifically, the casing 400e is configured such that the switch box 601e is slidable downward with respect to the rest part of the valve unit 200e other than the switch box 601e.

For instance, the switch box 601e has a pair of plates or bars fixed to at least one of the box bottom plate 611e, the outer side plate 612e, and the inner side plate 613e. The pair of plates or bars extend in parallel to the first and second lateral faces 461e, 462e of the casing 400e, and face the inner surface of the casing 400e. A pair of slots are formed in these pair of plates or bars, respectively. In other words, the switch box 601e have slots extending in planes parallel to the first and second lateral faces 461e, 462e of the casing 400e. The casing 400e may have a pair of rod members, such as bolts, respectively protruding inward to the box mounting space at relatively lower positions. Such rod members may be fixed to the plates forming the first lateral face 461e and the second lateral face 462e of the casing 400e.

Hence, the pair of rod members of the casing 400e engage with the pair of slots of the switch box 601e, respectively. The slots have the same elongate shape such that the rod members can slide along the slots at the same time in the same direction. Thereby, the switch box 601e can be moved along a path corresponding to the shape of the slots. The slots extend to relatively upper positions such that most part of the switch box 601e can be drawn out from the box mounting space. The upper ends of the slots are closed such that the switch box 601e can be hung to the rest part of the valve unit 200e at a lower position.

The slots may have an L-shape extending towards the bottom face 466 and then bend outward towards the box-side face 464e. Thereby, the switch box 601e can be slid outwardly and laterally, and then slid down. Moreover, with such an L-shape, the position of the switch box 601e can be stabilized at a normal position. It is preferable that the valve unit 200e has a fixing structure for fixing the switch box 601e at the normal position with respect to the rest part of the valve unit 200e, such as screw fasteners.

In the case where the multi branch selector 300e is controlled by the unit controller 600 via signal cables (not show), it is preferable that a cable aperture 615e is formed in the inner side plate 613e (and the insulator 614e) such that the box internal space 602e communicates to the internal space 401. Thereby, the signal cables can run through the cable aperture 615e. The signal cables should be long enough not to come down nor come off even when the switch box 601e is fully drawn out from the box mounting space.

The configuration of the switch box 601e is not limited to the above-mentioned structure. For instance, the inner side plate 613e and/or the insulator 614e may be omitted if the effect by heat from the multi branch selector 300e to the unit controller 600 is relatively small. The structure for sliding the switch box 601e downward with respect to the rest part of the valve unit 200e other than the switch box is not limited to the above-mentioned structure, either. For instance, a pair of rod members may be provided to switchbox 601e and a pair of slots with which the rod members engage may be provided to the casing 400e.

The refrigerant leakage detector 500 may be disposed in the internal space 401 of the casing 400e, the box internal space 602e of the switch box 601e, or an internal space of a detector box protruding from the casing 400e. Yet, it is more preferable that the refrigerant leakage detector 500 is disposed in the box internal space 602e or the internal space of the protruding detector box, which are places where the heat emitted from the multi branch selector 300e can be cut off by the plate and the insulator. Because the temperature in the internal space 401 would become very high during the air conditioning system 100e is in operation to cause malfunction of the refrigerant leakage detector 500.

When the refrigerant leakage detector 500 is disposed in the box internal space 602e, a detector aperture 510e may be formed in the inner side plate 613e (and the insulator 614e) such that a space in which detector aperture 510e is disposed communicates to the internal space 401. When the refrigerant leakage detector 500 is disposed in the detector box protruding from the casing 400e, a detector aperture 510e may be formed in the plate to which the detector box is provided (and the any insulator applied to the plate) such that the internal space the detector box communicates to the internal space 401. Such a plate may be the plate forming the first lateral face 461e or the second lateral face 462e of the casing 400e.

As mentioned above, the safety system 700e according to this embodiment includes the damper unit 440e. The damper unit 440e is configured to be attachable to the first opening 420 of the casing 400e of any of the valve units 200e. A duct connector 442e for connecting a duct may be attached to the second opening 430. If the connecting duct 740a is to be connected to the first opening 420, another duct connector 442e may be attached to the first opening 420. If the connecting duct 740a is not to be connected to the first opening 420, the damper unit 440e may be directly attached to first opening 420, or indirectly attached to the first opening 420 via a duct or the like.

FIGS. 22 to 24 are a front plan view, a rear perspective view, and a front perspective view of the damper unit 440e, respectively.

The damper unit 440e comprises the damper 440 and a damper casing 443e which has a substantially box shape. Yet, the shape of the damper casing 443e is not limited to this. The damper casing 443e has a duct-side plate 444e and a unit-side plate 445e as two opposite plates. The duct-side plate 444e is formed with a duct-side opening 446e, and the unit-side plate 445e is formed with a unit-side opening 447e. A duct connector 442e may be attached to the duct-side opening 446e.

The damper unit 440e further has the rotary plate 448e and a motor unit 449e which form the damper 440. The rotary plate 448e is configured to rotate along the unit-side plate 445e, and closes the unit-side opening 447e when it is in a first position and does not close the unit-side opening 447e when it is in a second position. In other words, the damper 440 is closed when the rotary plate 448e is in the first position and open when the rotary plate 448e is in the second position. The motor unit 449e is configured to control the rotation of the rotary plate 448e to switch between the first position and the second portion under the control of the unit controller 600 or the central controller 800a. The damper unit 440e is fixed to the casing 400e on the first lateral face 461e such that the unit-side opening 447e and the first opening 420 at least partially overlap. It is preferable that, in a state where the damper unit 440e is fixed to the casing 400e, the periphery of the first opening 420 and the periphery of the duct-side opening 446e coincide when viewed from a direction perpendicular to the first lateral face 461e.

Thus, the damper 440 of the damper unit 440e is configured to block air to pass through a terminal first opening when the damper 440 is closed, and allow air to pass through the terminal first opening when the damper 440 is open. Here, the terminal first opening means the first opening 420 which is of one of the valve units 200e connected by the at least one connecting duct 740a in series with respect to the ventilator 730 and which is not connected to any other valve unit 200e via the connecting duct 740a. It is preferable that the casing 400e and the damper unit 440e are configured such that the damper unit 440e can be detachably attached to the first opening 420 of any of the valve units 200e.

As shown in FIG. 18, the internal spaces 401_1, 401_2, 401_3 of first to third casings 400e_1, 400e_2, 400e_3 are connected in series and lead to the ventilator 730 via the shared duct 720a. The damper 440 of the damper unit 440e is controlled to open when the ventilator 730 operates due to the occurrence of the refrigerant leakage in any of the valve units 200e_1, 200e_2, 200e_3. Thus, the first opening 420 of the third valve unit 200e_3 functions as an intake port of an external air for promoting the ventilation of the air in the casings 400e_1, 400e_2, 400e_3.

As already mentioned above, the valve unit 200e has the drain pan 470e beneath the multi branch selector 300e. The drain pan 470e and the bottom plate 469e on which the drain pan 470e is disposed are is a part of the casing 400e, but detachably attached to the rest part of the casing 400e.

FIG. 25 is a perspective view of the drain pan 470e.

As shown in FIG. 25, the drain pan 470e has a drain plate 471e, a wall part 472e, and a drain outlet 473e. The drain pan 470e has a drain pan bottom face 474e which is a bottom face of the drain pan 470e and in contact with the upper face of the bottom plate 469e of the casing 400e when the drain pan 470e is disposed on the bottom plate 469e. The drain pan 470e may have a drain pan bottom plate (not shown) which forms the drain pan bottom face 474e. When viewed from a direction (hereinafter referred to as "the vertical direction") which perpendicular to the drain pan bottom face 474, the periphery of the drain plate 471e substantially coincide with the periphery of the internal space 401 of the casing 400e. Here, as mentioned above, the internal space 401 does not include the box mounting space. The wall part 472e is formed along the periphery of the drain plate 471e and extends upward so as to surround the upper face of the drain plate 471e which faces the multi branch selector 300e.

The drain outlet 473e protrudes from an edge of the drain pan 470e. More specifically, the drain outlet 473e is configured to, when liquid (including refrigerant) is accumulated on the upper face of the drain plate 471e, discharge the liquid towards the outside of the casing 400e through an opening or a groove formed in the drain plate 471e or the wall part 472e. The drain outlet 473e may be in a form of a pipe penetrating the wall part 472e. It is preferable that the drain outlet 473e is disposed on the edge which extends along the first lateral face 461e or the second lateral face 462e. It is also preferable that the upper face of the drain plate 471e slopes downward towards the drain outlet 473e.

The casing 400e is configured such that the drain pan 470e is switchable between at least two states in which the drain outlet 473e protrudes towards different directions. As mentioned above, the drain pan 470e is disposed on the bottom plate 469e of the casing 400e. The bottom plate 469e is fixed to the plates of the casing 400e which form the first and second lateral faces 461e, 462e by some screws. Thereby, it is possible to easily change the position and protrusion direction of the drain outlet 473e through 180 degrees just by removing the screws, detaching the bottom plate 469e from the plates forming the first and second lateral faces 461e, 462e together with the drain pan 470e, rotating the drain pan 470e on the upper face of the bottom plate 469e, fitting the bottom palate 469e to the plates forming the first and second lateral faces 461e together with the with the drain pan 470e, and fixing the screws. The casing 400e may be formed with notches such that the drain outlet 473e can fit into one of the notched regardless of the protrusion direction of the drain outlet 473e.

(Arrangement of Adjacent Valve Units)

The box shape of the casing 400e facilitates a compact arrangement of a plurality of the valve units 200e. In addition, the above-mentioned arrangement of the first and second openings 420, 430 to the first and second lateral faces 461e, 462e as opposite lateral faces further facilitates the compact arrangement of the adjacent valve units 200e.

FIG. 26 is a schematic diagram showing an arrangement of the adjacent valve units. Here, the first valve unit 200e_1 and the second valve unit 200e_2 are an example of the two adjacent valve units.

As shown in FIG. 26, the first valve unit 200e_1 and the second valve unit 200e_2 may be arranged next to each other such that the bottom faces 466e thereof are flush with each other. Thereby, the height range H of an arrangement space of the casings 400e of the first and second valve units 200e_1, 200e_2 can be minimized. Here, the height range H is a range in a direction perpendicular to any of the bottom faces 466e.

The first valve unit 200e_1 and the second valve unit 200e_2 may also be arranged such that a third lateral face thereof are flush with each other. The third lateral face may be the box-side faces 464e. In this case, the width range W of an arrangement space of the casings 400e of the first and second valve units 200e_1, 200e_2 can be minimized. Here, the width range W is a range in a direction perpendicular to any of the third lateral faces (e.g. a direction perpendicular to any of the box-side faces 464e).

Hereinafter, such an arrangement of the first and second valve units 200e_1, 200e_2, in which the bottom faces 466e are flush with each other, the third lateral faces are flush with each other, and the second face 462e of the first valve unit 200e_1 and the first face 461e of the second valve unit 200e_2 face each other, is referred to as "the aligned arrangement." With the aligned arrangement, the connecting duct 740a can be arranged within a space between the adjacent valve units 200e. Thus, the arrangement space of the adjacent valve units 200e and the connecting duct 740a therebetween can be kept compact.

Furthermore, the casing 400e may be configured such that the centers, the ends closer to the third lateral face (e.g. the box-side faces 464e), and/or the ends farther from the third lateral face of the first and second openings 420, 430 (hereinafter referred to as "the corresponding points") are at the same distance from the third lateral face. For instance, the distance dw1 of the center of the first opening 420 from the box-side face 464e and the distance dw2 of the center of the second opening 430 from the box-side face 464e may be substantially equal. Additionally, or alternatively, the casing 400e may be configured such that the centers, the ends closer to the bottom face 466e, and/or the ends farther from the bottom face 466e (hereinafter also referred to as "the corresponding points") are at the same distance from the bottom face 466e. For instance, the distance dh1 of the center of the first opening 420 from the bottom face 466e and the distance dh2 of the center of the second opening 430 from the bottom face 466e may be substantially equal. In any cases, it is preferable that the periphery of the first opening 420 and the periphery of the second opening 430 coincide when viewed from a direction (hereinafter referred to as "the lateral direction") perpendicular to the first and second lateral faces 461e, 462e.

This arrangement of the first and second openings 420, 430 is advantageous when the adjacent valve units 200e are in the above-mentioned aligned arrangement. If the first and second valve units 200e_1, 200e_2 are in the aligned arrangement as shown in FIG. 26, the positions (or the peripheries) of the second opening 430 of the first valve unit 200e_1 and the first opening 420 of the second valve unit 200e_2 coincide when viewed from a direction which is perpendicular to the first and second lateral faces 461e, 462e of the first and second valve units 200e_1, 200e_2 (hereinafter referred to as "the alignment direction").

When the positions (or the peripheries) of the first and second openings 420, 430 of the adjacent valve units 200e coincide when viewed from the alignment direction, the connecting duct 740a connected to the duct connectors 442e attached to the first and second openings 420, 430 can be in a simple linear shape. Thus, the distance between the adjacent valve units 200e can be minimized. In addition, the length of the connecting duct 740a and the burden of instalment can be reduced. However, the positional relationship between the first and second openings 420, 430 is not limited to the above-mentioned positional relationships. For instance, the first and second openings 420, 430 may be arranged such that the first and second openings 420, 430 of each valve unit 200e just partially overlap with each other when viewed from the lateral direction.

As for the piping, it is also preferable that, the positions of the ends of the main pipe portions 381e, 382e, 383e protruding from the first lateral face 461e and the positions of the other ends of the same main pipe portions 381e, 382e, 383e protruding from the second lateral face 462e coincide, respectively, when viewed from the lateral direction (see FIG. 20). Thereby, the connection pipes 161e, 162e, 163e connecting the main pipe portions 381e, 382e, 383e of the adjacent valve units 200e can also be in a simple linear shape (see FIG. 17).

Advantageous Effect of Fifth Embodiment

As described above, the valve units 200e according to the fifth embodiment are advantageous in making more compact the arrangement space of at least a part of the safety system 700e and reducing the cost of the safety system 700e. The compactness of the arrangement space improves freedom of instalment of the air conditioning system 100e including such a safety system 700e. For instance, the valve units 200e can be arranged in a limited space close to the location where the utilization-side units 120 are to be arranged.

Thus, at least two of the valve units 200e, the connecting duct 740a connecting them, and the utilization-side units 120 belonging to the at least two valve units 200e can be installed in the same floor of a building. In this case, it is preferable that the shared duct 720a and the ventilator 730 (i.e. the discharge structure), which are to be connected to one of the valve units 200e or the connecting duct 740a, are also be installed in the same floor.

Moreover, when the utilization-side units 120 are installed in a target space (a first space which is to be air-conditioned by the utilization-side units 120), the at least two valve units 200e and the connecting duct 740a may be installed in an adjacent space (a second space) which is adjacent to the target space. In this case, it is preferable that the shared duct 720a and the ventilator 730 are also be installed in the same adjacent space. Instead, all of the utilization-side units 120, the at least two valve units 200e, the connecting duct 740a therebetween, the shared duct 720a, and the ventilator 730 may also be installed in the target space. Here, both a room to be air-conditioned by the utilization-side units 120 and a ceiling space right above the room may be regarded as the single "target space."

Alternatively, at least two of the valve units 200e may be installed in different floors of a building. In this case, the connecting duct 740a connecting them is arranged over the different floors, and the shared duct 720a with the ventilator 730 is connected to the connecting duct 740a. The ventilator 730 may be installed in one of the different floors or another different floor of the building.

It is also noted that the configuration of the piping of the air conditioning system 100e is not limited to a specific configuration. The variations of the system arrangement and the piping configuration and other modifications are explained below.

First Modification of Fifth Embodiment

FIG. 27 is a schematic configuration diagram of an air conditioning system according to a first modification of the fifth embodiment. Broken lines in FIG. 27 indicate building structures of a building to which the air conditioning system is installed.

As shown in FIG. 27, an air conditioning system 100f including a safety system 700f according to the first modification is installed to a building 920f. The building 920f has a ground floor 921f, a first floor 922f, and a roof floor 923f. Each of the ground floor 921f and the first floor 922f has at least one target space 924f, and at least one non-target space 925f. Each of the ground floor 921f and the first floor 922f may have a first ceiling space 926f right above the target space 924f behind a ceiling, and/or a second ceiling space 927f right above the non-target space 925f behind a ceiling. Yet, the first ceiling space 926f may be regarded as a part of the target space 924f b, and the second ceiling space 927f may be regarded as a part of the non-target space 925f, especially when no ceiling exists therein.

The utilization-side units 120 are installed in each of the target spaces 924f. The utilization-side units 120 may be ceiling flush type air conditioners each of which has an air outlet on its bottom face. In this case, the utilization-side units 120 may be installed in the first ceiling space 926f along the ceiling such that their bottom surfaces are exposed to the target space 924f through openings formed in the ceiling. The utilization-side units 120 may be hung from a bottom face of a ceiling slab of a building by metal hangers or the like.

A plurality of valve units 200f of the safety system 700f are installed in each of the second ceiling spaces 927f. The valve units 200f and the connecting duct 740a connecting them, and the utilization-side units 120 connected to the valve units 200f are installed in the same floor. The shared duct 720a connected to one of the valve units 200f or the connecting duct 740a and the ventilator 730 are also installed in the second ceiling space 927f of the same floor.

Also, as shown in FIG. 27, it is preferable to configure each safety system 700f for each floor. For example, for each of the ground floor 921f and the first floor 922f, two valve units 200f, the connecting duct 740a connecting the two valve units 200f, the share duct 720a connected to one of the two valve units 200f, and the ventilator 730 disposed to the share duct 720a are installed in the same second ceiling space 927f. Alternatively, for each of the ground floor 921f and the first floor 922f, at least part of the share duct 720a and the ventilator 730 disposed to this part may be installed in another space which is different from the second ceiling space 927f but is in the same floor as the other elements of the safety system 700f. Thereby, it is possible to reduce the total length of ducts for connecting the casings 400e to the discharge structure, and thus reduce the installation cost of the system. Also, if a refrigerant leakage has occurred in any of the valve units 200f, it is possible to efficiently discharge the leaked refrigerant from the valve units 200f in a short time.

Here, the configuration of refrigerant piping 130f of the first modification is similar to that of the first to fourth embodiments (see FIG. 1). In other words, the refrigerant pipings of the valve units 200f are connected in parallel with respect to the heatsource-side unit 110. Thus, the valve unit 200f has the heatsource-side liquid pipe portion 310, the low-pressure gas sub pipe portion 320, and the high-pressure gas pipe portion 340 (hereinafter referred to as "branched main pipe portions") instead of the main pipe portions 381e, 382e, 383e. The configuration of other parts of the valve unit 200f may be the same as that of the valve unit 200e. The ends of the branched main pipe portions 310, 320, 340 preferably protrude from the first face 461e or the second face 462e of the casing 400e. These ends of the valve units 200f are connected to the liquid refrigerant pipe 131, the low-pressure gas refrigerant pipe 132, and the high-pressure gas refrigerant pipe 133 of the heatsource-side unit 110 (see FIG. 1).

Each of the valve units 200f and the utilization-side units 120 belonging thereto are connected via the utilization-side liquid refrigerant pipe 151 and the utilization-side gas refrigerant pipe 152 (hereinafter referred to as "the utilization-side pipes").

The valve unit 200f is preferably arranged in substantially the same level as the utilization-side units 120 which are connected to the valve unit 200f. It is also preferable the valve unit 200f is arranged such that the pipe outlet face 463e faces the direction in which the first ceiling space 926f is formed. Thereby, it is possible to simplify the arrangement of the utilization-side pipes 151, 152. Moreover, since the second ceiling space 927f is next to the first ceiling space 926f, it is also possible to make the utilization-side pipes 151, 152 shorter as much as possible.

Such an arrangement of the spaces is easily achieved when the arrangement space of the valve units 200f and the connecting duct 740a therebetween is small. As already explained above, such a small arrangement space is easily achieved when the corresponding points of the first opening 420 and the second opening 430 of each of the valve units 200f are at substantially the same position when viewed from the lateral direction, and/or the adjacent valve units 200f are in the aligned arrangement as shown in FIG. 26.

Although FIG. 27 shows an example where the utilization-side units 120 are installed in the first ceiling space 926f separated from the target space 924f and the valve units 200f are installed in the second ceiling space 927f separated from the non-target space 925f, the arrangement of the units are not limited to this. The valve units 200f and the connecting duct 740a connecting them may be installed in, instead of or in addition to the second ceiling space, any of the target space 924f, the first ceiling space 926f, and the non-target space 925f. For instance, the utilization-side units 120 and the valve units 200f may be installed in the same target space 924f. In any cases, it is preferable to configure each safety system 700f for each floor.

The arrangement of the first and second openings 420, 430 of the valve units 200e and the aligned arrangement of the valve units 200e as mentioned above facilitate designing and instalment of the air conditioning system 100f. It is noted that whole structure including not only the air conditioning system 100f but also at least the space or spaces in which the valve unit 200f and the utilization-side units 120 connected to the valve units 200f may be regarded as an air conditioning system. The building structures forming the space or space may also be regarded as part of an air conditioning system.

Any of the safety systems 700e, 700f according to the first embodiment and its first modification may include a plurality of the valve units 200e, 200f connected in parallel with respect to the discharge structure as with the safety system 700b of the third embodiment shown in FIG. 8.

Second Modification of Fifth Embodiment

The valve units according to the fifth embodiment may also be applied to a system configuration as shown FIGS. 3 and 8 in which the internal spaces 401 of at least two of the valve units are connected to each other in parallel.

FIG. 28 is a schematic configuration diagram of an air conditioning system according to a second modification of the fifth embodiment.

For instance, the air conditioning system 100g including a safety system 700g according to the second modification is installed in a building having the same configuration as the building 920f of the first modification. The air conditioning system 100g includes a plurality of valve units 200f each having the same configuration as the valve unit 200f of the first modification and a plurality of the utilization-side units 120. The arrangement of the valve units 200f, the utilization-side units 120, the refrigerant piping 130f, and the utilization-side pipes 151, 152 may be the same as that of the first modification. Meanwhile, the configuration of the connection structure for connecting the internal spaces of the casings 400e of the valve units 200f is different from that of the first modification.

In the second modification, the connection structure connects the valve units 200f over the ground floor 921f and the first floor 922f. More specifically, the air conditioning system 100g includes a plurality of the individual ducts 710 respectively connected to the valve units 200f in the different floors and the shared duct 720a connected to each of the individual ducts 710. Thus, at least a part of the individual duct 710 and/or the shared duct 720a extends in a vertical direction. The individual duct 710 and/or the shared duct 720a may penetrate through a ceiling slab of the building 920f, penetrate through an outer wall of the building 920f and run along the outer wall, and/or run in a shaft extending over the different floors of the of the building 920f. The shared duct 720a may extend to the roof floor 923f, and the ventilator 730 may be disposed on the roof floor 923f.

Even with this configuration, it is possible to reduce height range of an arrangement space of the valve units 200f and the ducts connected thereto, since no duct directly protrudes upward or downward from the valve units 200f. Thus, as with the first modification mentioned above, it is possible to facilitate the designing and the instalment of the air conditioning system 100g. This configuration is advantageous when the valve units 200f in the same floor are distanced away from each other. It is noted that whole structure including not only the air conditioning system 100g but also at least the space or spaces in which the valve unit 200f and the utilization-side units 120 connected to the valve units 200f may be regarded as an air conditioning system. The building structures forming the space or space may also be regarded as part of an air conditioning system.

Needless to say, the arrangement of the utilization-side units 120 and the valve unit 200f in the building 920f as shown in FIGS. 27, 28 may be applied to the air conditioning system 100e with the piping configuration as shown in FIG. 17. In other words, the piping structure of any of the air conditioning systems 100f, 100g is not limited to the above-explained piping structures.

Moreover, the configuration of the air conditioning system 100f according to the first modification and the configuration of the air conditioning system 100g according to the second modification may also be combined in a similar way to the configuration shown in FIG. 8 according to the third embodiment. For instance, the safety system 700g of the second modification may include a plurality of the valve units 200f connected in series with respect to the discharge structure as with the safety system 700b of the third embodiment shown in FIG. 8.

Third Modification of Fifth Embodiment

The relative positional relationship between the adjacent valve units are not limited to the above-mentioned relationships. For instance, the adjacent valve units may be arranged such that the pipe outlet faces 463e thereof face different directions (e.g. opposite directions). In this case, the adjacent valve units may be positioned and configured such that the main pipe portions 381e, 382e, 383e thereof are connected in straight lines. With this configuration, the casings 400e protrude towards different directions (e.g. opposite directions) with respect to the lines of the main pipe portions 381e, 382e, 383e.

Other Modifications of Fifth Embodiment

In the above descriptions of the fifth embodiment, it is premised that the casings 400e of all the valve units are the same in shape and size. Yet, the dimensions of the casings 400e may be different among the valve units. Moreover, the third lateral face from which the distances of the corresponding points of the first opening 420 and the second opening 430 are substantially equal may be the pipe outlet face 463e of the casing 400e, instead of the box-side face 464e.

Any of the air conditioning systems 100e, 100f, 100g may have a heat pump system with a so-called two-pipe configuration. In such a case, the piping accommodated in the casing 400e would not be the multi branch selector 300, as shown in FIG. 12. Moreover, the heatsource-side liquid pipe portion 310 and the gas pipe portion or portions 320, 340 are not necessarily need to be branched towards two or more of the utilization-side units 120 but directed towards only one among the utilization-side units 120. Yet, when the valve unit has at least a liquid refrigerant pipe portion, a gas refrigerant pipe portion, a liquid control valve disposed in the liquid refrigerant pipe portion, and a gas control valve disposed in the gas refrigerant pipe portion within the casing, the safety system can improve the safety regarding refrigerant leakage of the air conditioning system.

Any of the valve units 200e, 200f may have a configuration in which the first opening 420 and the second opening 430 are formed in the two adjacent lateral faces of the casing 400e, respectively, as with the second pattern P2 shown in FIG. 14.

The shapes of the first and second openings 420, 430 are not limited to their shapes depicted in the drawings. The first and second openings 420, 430 may be in a rectangular shape for instance. In any cases, it is preferable that the first and second openings 420, 430 are substantially the same in shape and size when viewed from the lateral direction.

The shape of the casing 400e is not limited to a box shape, but may have any polyhedral body which has at least two lateral faces which faces different directions. These lateral faces are preferably substantially parallel to each other so as to form opposite faces of the casing.

The positions of the corresponding points of the first and second openings 420, 430 when viewed from the lateral direction may be different. Even such a configuration is advantageous when the adjacent valve units are to be arranged such that the bottom faces thereof and/or the third lateral faces thereof are shifted by a predetermined positional difference.

The ends of the main pipe portions 381e, 382e, 383e may protrude from a face of the casing other than the first and second lateral faces 461e, 462e. Alternatively, all the ends of these main pipe portions 381e, 382e, 383e may protrude from one of the first and second lateral faces 461e, 462e. The ends of the utilization-side liquid pipe portions 311 and the utilization-side gas pipe portions 330 may also protrude from a face of the casing other than the pipe outlet face 463.

The casing does not necessarily need to have the switch box 601e slidable downward with respect to a part of the valve unit other than the switch box 601e. In this case, the position of the switch box 601e is not limited to the position shown in FIG. 21. Moreover, the valve unit 200e, 200f does not necessarily need to have the switch box 601e, and the unit controller 600 may be simply disposed within the casing 400e. In any cases, it is preferable that a heat insulating plate is disposed between the unit controller 600 and the space in which the valves are disposed.

The duct connector 442e and the duct side plate 444e of the damper unit 440e may be removed from the damper assembly in a case where a series connection of a plurality of the valve units 200e is not required, e.g when only a single valve unit 200e is used. Moreover, the duct connector 442e may be detachably attached to the casing 400e such that the duct connector 442e can be removed from the first opening 420 when the damper unit 440e is attached as an option kit to that first opening 420.

Instead of the damper unit 440e, the damper 440 may be disposed to the first opening 420 to which the connecting duct 740a is connected, as with the second embodiment as shown in FIG. 6. Alternatively, any damper may be omitted from the first opening 420 if the air flow through the terminal first opening is little and thus can be ignored at least when the ventilator is not operating.

If ventilation of the internal air via the connection structure is induced by natural convection or an air flow caused by an external mechanism, the ventilator 730 may be omitted. In this case, it is preferable that the unit controller 600 or the central controller 800a controls the damper 440 at the terminal first opening, and preferably another damper 440 disposed to the shared duct 720a, to open when a refrigerant leakage has occurred in the internal space 401 of any valve unit between the terminal first opening and the shared duct 720a.

The casing 400e need not necessarily be configured such that the drain pan 470e is switchable between at least two states in which the drain outlet 473e protrudes towards different directions. Moreover, the drain pan 470e may be a simple plate without the drain outlet 473e.

The number of the unit families 121 (i.e. the number of the valve units 200e, 200D, the number of the utilization-side units 120 belonging to each unit family 121, the number if the valve units 200e, 200f which are connected in series, the number of the target spaces 924f, and the number of floors in which the valve units 200e, 200f are installed are not limited to those explained above. The position of the refrigerant leakage detector 500 is also not limited to those explained above.

Any other variation or modification of the first to fourth embodiments stated above may also be applied to the fifth embodiment, the first modification, the second modification, and the third modification, in so far as they are not incompatible.

While only selected embodiments and modifications have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location, or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Thus, the foregoing descriptions of the embodiments according to the present invention are provided for illustration only.

REFERENCE SIGNS LIST 100, 100e, 100f, 100g: Air Conditioning System
110: Heatsource-Side Unit
120: Utilization-Side Unit
121: Unit Family
130f: Refrigerant piping
131: Liquid Refrigerant Pipe
132: Low-Pressure Gas Refrigerant Pipe
133: High-Pressure Gas Refrigerant Pipe
141: Heatsource-Side Liquid Pipe
142: Heatsource-Side Low-Pressure Gas Pipe
143: Heatsource-Side High-Pressure Gas Pipe
151: Utilization-Side Liquid Refrigerant Pipe
152: Utilization-Side Gas Refrigerant Pipe
161e: Liquid Refrigerant Connection Pipe
162e: Low-Pressure Gas Refrigerant Connection Pipe
163e: High-Pressure Gas Connection Pipe
200, 200d, 200e, 200f: Valve Unit
300, 300e: Multi Branch Selector
310: Heatsource-Side Liquid Pipe Portion
311: Utilization-Side Liquid Pipe Portion (Liquid Refrigerant Pipe Portion)
320: Low-Pressure Gas Pipe Portion (Gas Refrigerant Pipe Portion)
321: Low-Pressure Gas Sub Pipe (Gas Refrigerant Pipe Portion)
330: Utilization-Side Gas Pipe Portion (Gas Refrigerant Pipe Portion)
340: High-Pressure Gas Pipe Portion (Gas Refrigerant Pipe Portion)
341: High-Pressure Gas Sub Pipe (Gas Refrigerant Pipe Portion)
351: Bypass Pipe
352: Refrigerant Heat Exchanger
361: Low-Pressure Gas Control Valve (Gas Control Valve)

362: High-Pressure Gas Control Valve (Gas Control Valve)
363: Expansion Mechanism
364: Liquid Shut-Off Valve (Liquid Control Valve)
365: Gas Shut-Off Valve (Gas Control Valve)
370: Pipe Connection Part
381*e*: Main Liquid Refrigerant Pipe Portion
382*e*: Main Low-pressure Gas Refrigerant Pipe Portion
383*e*: Main High-pressure Gas Refrigerant Pipe Portion
400, 400*e*: Casing
401: Internal Space
410: Pipe Aperture
420: First Opening
430: Second Opening
440: Damper
440*e*: Damper Unit
441: Flap
442*e*: Duct Connector
443*e*: Damper Casing
444*e*: Duct-Side Plate
445*e*: Unit-Side Plate
446*e*: Duct-Side Opening
447*e*: Unit-Side Opening
448*e*: Rotary Plate
449*e*: Motor Unit
450: Insulator
461*e*: First Lateral Face
462*e*: Second Lateral Face
463*e*: Pipe Outlet Face (Third Lateral Face)
464*e*: Box-Side Face (Third Lateral Face, Fourth Lateral Face)
465*e*: Top Face
466*e*: Bottom Face
467*e*: Hanger Element
468*e*: Top Plate
469*e*: Bottom Plate
470*e*: Drain Pan
471*e*: Drain Plate
472*e*: Wall Plate
473*e*: Drain Outlet
474*e*: Drain Pan Bottom Face
500: Refrigerant Leakage Detector
510*e*: Detector Aperture
600: Unit Controller (Controller)
601*e*: Switch Box
602*e*: Box Internal Space
611*e*: Box Bottom Plate
612*e*: Outer Side Plate
613*e*: Inner Side Plate
614*e*: Insulator
615*e*: Cable Aperture
700, 700*a*, 700*b*, 700*c*, 700*e*, 700*f*, 700*g*: Safety System
701*c*: Section
710: Individual Ducts (Connection Structure)
720, 720*a*, 720*b*: Shared Duct (Discharge Structure)
730: Ventilator (Discharge Structure)
740*a*: Connecting Duct (Connection Structure)
800, 800*a*, 800*b*, 800*c*: Central Controller (Controller)
801: Communication Path
910*b*, 910*c*: Grouping Table
920*f*: Building
921*f*: Ground Floor
922*f*: First Floor
923*f*: Roof Floor
924*f*: Target Space
925*f*: Non-Target Space
926*f*: First Ceiling Space
927*f*: Second Ceiling Space
928*f*: Outdoor Space

CITATION LIST

Patent Literature

[PTL 1]EP 3 091 314 A1

The invention claimed is:

1. A safety system comprising:
a plurality of valve units in a heat pump system, each of the valve units having
at least one liquid refrigerant pipe portion,
at least one gas refrigerant pipe portion,
at least one liquid control valve disposed in the liquid refrigerant pipe portion,
at least one gas control valve disposed in the gas refrigerant pipe portion,
a casing accommodating at least the liquid control valve and the gas control valve and formed with at least two openings, and
a refrigerant leakage sensor configured to detect an occurrence of a refrigerant leakage in an internal space of the casing;
a connection structure comprising a plurality of individual ducts connecting the internal spaces of the casings via the openings; and
a discharge structure connected to the connection structure or one of the casings,
and configured to discharge air from the internal space of the casing in which a refrigerant leakage has occurred, wherein
the casing of each valve units has first and second lateral faces facing different directions, and
in each of the valve units, a first opening as one of the openings is formed in the first lateral face and a second opening as another one of the openings is formed in the second lateral face.

2. The safety system according to claim 1, wherein
the casing of each valve units has a substantially box shape, and
the first and second lateral faces are opposite faces of the casing.

3. The safety system according to claim 2, wherein,
when viewed from a direction substantially perpendicular to the first and second lateral faces, the first opening and the second opening at least partially overlap with each other.

4. The safety system according to claim 1, wherein:
the casing of each valve units has a bottom face perpendicular to the first and second lateral faces; and
the casing is configured such that centers, the ends closer to the bottom face, and/or ends farther from the bottom face of the first and second openings are at the same distance from the bottom face.

5. The safety system according to claim 4, wherein
at least a first valve unit and a second valve unit which are two of the valve units are arranged next to each other such that the bottom faces of the first and second valve units are flush with each other.

6. The safety system according to claim 1, wherein:
the casing of each valve unit has a third lateral face perpendicular to the first and second lateral faces; and
the casing is configured such that centers, ends closer to the third lateral face, and/or ends farther from the third lateral face of the first and second openings are at the same distance from the third lateral face.

7. The safety system according to claim 6, wherein
at least a first valve unit and a second valve unit which are two of the valve units are arranged next to each other such that the third faces of the first and second valve units are flush with each other.

8. The safety system according to claim 1, wherein:
each of the valve units further has
a main liquid refrigerant pipe portion from which the liquid refrigerant pipe portion branches, and
a main gas refrigerant pipe portion from which the gas refrigerant pipe portion branches;
in each of the valve units, an end of the main liquid refrigerant pipe portion and an end of the main gas refrigerant pipe portion protrude from the first lateral face, and another end of the main liquid refrigerant pipe portion and another end of the main gas refrigerant pipe portion protrude from the second lateral face; and
the safety system further comprises
at least one liquid refrigerant connection pipe connecting the main liquid refrigerant pipe portion of a first valve unit and the main liquid refrigerant pipe portion of a second valve unit, the first and second valve units being two of the valve units, and
at least one gas refrigerant connection pipe connecting the main gas refrigerant pipe portion of the first valve unit and the main gas refrigerant pipe portion of the second valve unit.

9. The safety system according to claim 8, wherein:
the casing of each valve unit has a pipe outlet face different from the first and second lateral faces; and
an end of the liquid refrigerant pipe portion and an end of the gas refrigerant pipe portion protrude from the pipe outlet face.

10. The safety system according to claim 1, wherein:
the casing of each valve unit has a drain pan which is provided with a drain outlet protruding from an edge of the drain pan; and
the casing is configured such that the drain pan is switchable between at least two states in which the drain outlet protrudes towards different directions.

11. A safety system comprising:
a plurality of valve units in a heat pump system, each of the valve units having
at least one liquid refrigerant pipe portion,
at least one gas refrigerant pipe portion,
at least one liquid control valve disposed in the liquid refrigerant pipe portion,
at least one gas control valve disposed in the gas refrigerant pipe portion,
a casing accommodating at least the liquid control valve and the gas control valve and formed with at least two openings, and
a refrigerant leakage sensor configured to detect an occurrence of a refrigerant leakage in an internal space of the casing;
a connection structure comprising a plurality of individual ducts connecting the internal spaces of the casings via the openings; and
a discharge structure connected to the connection structure or one of the casings,
and configured to discharge air from the internal space of the casing in which a refrigerant leakage has occurred, wherein:
the discharge structure includes
a shared duct connected to the connection structure or one of the casings, and
a ventilator disposed in or attached to the shared duct.

12. The safety system according to claim 11, wherein:
the shared duct has a first end and a second end;
the ventilator is disposed in or attached to the shared duct at or close to the second end, and configured to draw air in the shared duct towards the second end; and
the shared duct is connected to the connection structure or one of the casings on a side of the first end with respect to the ventilator.

13. The safety system according to claim 12, wherein:
the second end of the shared duct is open to an outdoor space.

14. The safety system according to claim 11, further including:
a first controller configured to control the ventilator to start operating when a refrigerant leakage in any one of the valve units has occurred.

15. The safety system according to claim 14, wherein:
each of the refrigerant leakage sensors are configured to output detection result information; and
the first controller is configured to receive the detection result information outputted from any one of the refrigerant leakage sensors, and identify in which of the valve units a refrigerant leakage has occurred based on the received detection result information.

16. The safety system according to claim 1, wherein:
the plurality of individual ducts of the connection structure are connected to the second openings of the casings, respectively, and further connected to the shared duct.

17. The safety system according to claim 14, wherein:
each of the valve units further has
a damper configured to block air to pass through the first opening when the damper is closed, and allow air to pass through the first opening when the damper is open; and
the first controller is configured to control the dampers such that, when the ventilator operates due to the occurrence of the refrigerant leakage, the damper of the valve unit in which the refrigerant leakage has occurred is open while the damper of the valve unit in which no refrigerant leakage has occurred is closed.

18. The safety system according to claim 17, wherein:
the first controller includes
a plurality of unit controllers disposed in the valve units, respectively, and
a central controller configured to communicate with the unit controllers;
each of the refrigerant leakage sensors is configured to transmit detection result information to the central controller via the corresponding unit controller; and
the central controller is configured to determine whether a refrigerant leakage in any one of the valve units has occurred based on the detection result information received from the valve unit, and, when the refrigerant leakage has occurred in any one of the valve units, transmit a damper open command to the damper of the valve unit in which the refrigerant leakage has occurred via the corresponding unit controller and control the ventilator to start operating.

19. The safety system according to claim 1, wherein:
the connection structure includes
at least one connecting duct connecting the first opening of a first valve unit and the second opening of a second valve unit, the first and second valve units being two of the valve units; and
the discharge structure is connected to the second opening of the first valve unit.

20. The safety system according to claim 12, wherein:
the first valve unit and the second valve unit are arranged such that the first lateral face of the first valve unit and the second lateral face of the second valve unit face each other.

21. The safety system according to claim 12 which comprises the shared duct, and the ventilator, further comprising:
a damper configured to block air to pass through a terminal first opening when the damper is closed, and allow air to pass through the terminal first opening when the damper is open, the terminal first opening being the first opening which is of one of the valve units connected by the at least one connecting duct in series with respect to the ventilator and connected to no connecting duct,
a second controller configured to control the damper to open when the ventilator operates due to the occurrence of the refrigerant leakage in any of the valve units connected in series.

22. The safety system according to claim 21, further comprising:
a damper unit configured to be attachable to the first opening of any of the valve units, and, in a state where the damper unit is attached to the first opening, block air to pass through the first opening when the damper is closed, and allow air to pass through the first opening when the damper is open.

23. An air conditioning system comprising:
the safety system according to claim 1;
a heatsource-side unit including a compressor and a heatsource-side heat exchanger;
a plurality of utilization-side units each including a utilization-side heat exchanger;
a liquid refrigerant piping extending between the heat-source-side unit and the utilization-side units, and including the liquid refrigerant pipe portions;
a gas refrigerant piping extending between the heat-source-side unit and the utilization-side units, and including the gas refrigerant pipe portions; and
an expansion mechanism disposed in the liquid refrigerant piping.

24. A method for constructing an air conditioning system, the air conditioning system comprising:
the safety system according to claim 1;
a heatsource-side unit including a compressor and a heatsource-side heat exchanger;
a plurality of utilization-side units each including a utilization-side heat exchanger,
a liquid refrigerant piping extending between the heat-source-side unit and the utilization-side units, and including the liquid refrigerant pipe portions;
a gas refrigerant piping extending between the heat-source-side unit and the utilization-side units, and including the gas refrigerant pipe portions; and
an expansion mechanism disposed in the liquid refrigerant piping, the method comprising:
installing the valve units, the connection structure, the discharge structure, and the utilization-side units in the same floor of a building; and
connecting the valve units by the connection structure, and connecting the discharge structure to the connection structure or one of the casings.

25. A method for constructing the air conditioning system according to claim 24, wherein
the installing includes:
installing the utilization-side units in a first space which is to be air-conditioned by the utilization-side units; and
installing the valve units, the connection structure, and the discharge of the safety system in a second space which is adjacent to the first space.

26. A method for constructing an air conditioning system, the air conditioning system comprising:
the safety system according to claim 1;
a heatsource-side unit including a compressor and a heatsource-side heat exchanger;
a plurality of utilization-side units each including a utilization-side heat exchanger;
a liquid refrigerant piping extending between the heat-source-side unit and the utilization-side units, and including the liquid refrigerant pipe portions;
a gas refrigerant piping extending between the heat-source-side unit and the utilization-side units, and including the gas refrigerant pipe portions; and
an expansion mechanism disposed in the liquid refrigerant piping, the method comprising:
installing the valve units in different floors of a building;
arranging the connection structure to connect the valve units over the different floors; and
connecting the discharge structure to the connection structure.

* * * * *